United States Patent
Isomura et al.

(10) Patent No.: US 9,086,804 B2
(45) Date of Patent: Jul. 21, 2015

(54) COMPUTER SYSTEM MANAGEMENT APPARATUS AND MANAGEMENT METHOD

(75) Inventors: Naoki Isomura, Tokyo (JP); Yoshitaka Tokusho, Tokyo (JP); Takato Kusama, Yokohama (JP)

(73) Assignee: HITACHI, LTD., Tokyo (JP)

( * ) Notice: Subject to any disclaimer, the term of this patent is extended or adjusted under 35 U.S.C. 154(b) by 580 days.

(21) Appl. No.: 13/392,025

(22) PCT Filed: Jan. 5, 2012

(86) PCT No.: PCT/JP2012/050073
§ 371 (c)(1),
(2), (4) Date: Feb. 23, 2012

(87) PCT Pub. No.: WO2013/103005
PCT Pub. Date: Jul. 11, 2013

(65) Prior Publication Data
US 2013/0179657 A1 Jul. 11, 2013

(51) Int. Cl.
*G06F 12/00* (2006.01)
*G06F 3/06* (2006.01)

(52) U.S. Cl.
CPC .............. *G06F 3/0605* (2013.01); *G06F 3/061* (2013.01); *G06F 3/0631* (2013.01); *G06F 3/0647* (2013.01); *G06F 3/0685* (2013.01); *G06F 2206/1012* (2013.01)

(58) Field of Classification Search
USPC ......................................................... 711/165
See application file for complete search history.

(56) References Cited

U.S. PATENT DOCUMENTS

| | | | |
|---|---|---|---|
| 2008/0091898 A1* | 4/2008 | Takahashi et al. | 711/162 |
| 2009/0144732 A1* | 6/2009 | Tanaka | 718/1 |
| 2010/0100604 A1* | 4/2010 | Fujiwara et al. | 709/213 |
| 2010/0100678 A1* | 4/2010 | Kobayashi | 711/114 |
| 2010/0115222 A1 | 5/2010 | Usami | |
| 2010/0125715 A1 | 5/2010 | Takamatsu et al. | |
| 2011/0072225 A1 | 3/2011 | Kawaguchi et al. | |
| 2011/0197044 A1* | 8/2011 | Sudo et al. | 711/165 |
| 2011/0252214 A1* | 10/2011 | Naganuma et al. | 711/170 |
| 2012/0102350 A1* | 4/2012 | Belluomini et al. | 713/324 |
| 2012/0221730 A1* | 8/2012 | Oba | 709/226 |

FOREIGN PATENT DOCUMENTS

| | | |
|---|---|---|
| JP | 2010-108341 A | 5/2010 |
| JP | 2010-122814 A | 6/2010 |
| JP | 2011-070628 A | 4/2011 |
| WO | 2011/092738 A1 | 8/2011 |

* cited by examiner

*Primary Examiner* — Charles Rones
*Assistant Examiner* — Nanci Wong
(74) *Attorney, Agent, or Firm* — Volpe and Koenig, P.C.

(57) ABSTRACT

An object of the present invention is to efficiently use a hierarchical pool. A management server manages performance information of multiple host computers, and based on each performance information, determines whether a prescribed host computer, which comprises a load of equal to or larger than a preconfigured prescribed threshold, exists among the multiple host computers. The management server creates a reallocation plan, which stipulates an allocation amount of a real storage area for each of multiple storage tiers, with respect to a prescribed virtual logical volume used by the prescribed host computer. Based on the reallocation plan, the management server decides a corresponding relationship between each logical storage area and each real storage area of each storage tier, and notifies a storage apparatus of this corresponding relationship.

6 Claims, 43 Drawing Sheets

| Tier performance history information | | |
|---|---|---|
| Tier ID (0601) | Response time (ms) (0602) | Number of I/Os (0603) |
| Tier1 | 0.1 | 322344 |
| Tier2 | 0.5 | 159329 |
| Tier3 | 1.0 | 110332 |

| Reallocation plan management information | | |
|---|---|---|
| Host ID (0801) | Tier 1 capacity (0802) | Tier 2 capacity (0803) |
| Host 1 | 90 pages | 300 pages |

FIG. 10

Virtual volume management information (management side) 0308

| VVOL-ID 0901 | Virtual area ID 0902 | VVOL LBA range 0903 | Real area ID 0904 | IOPS 0905 | Reallocation destination determination result 0906 | Host ID 0907 |
|---|---|---|---|---|---|---|
| VVOL1 | VSEG1 | 0-999 | SEG1 | 8 | Tier1 | Host 1 |
| | VSEG2 | 1000-1999 | SEG4 | 19 | Tier2 | |
| | VSEG3 | 2000-2999 | SEG5 | 3.6 | Tier3 | |
| VVOL2 | VSEG4 | 0-999 | SEG2 | 31 | Tier2 | Host 2 |
| VVOL3 | VSEG5 | 0-999 | SEG3 | 44 | Tier3 | Host 3 |
| ... | ... | ... | ... | ... | ... | ... |

FIG. 11

Virtual volume management information (storage side) 0206

| VVOL-ID | Virtual area ID 1002 | VVOL LBA range 1003 | Real area ID 1004 | Number of accesses 1005 | Monitoring period 1006 | Reallocation destination determination result 1007 |
|---|---|---|---|---|---|---|
| VVOL1 | VSEG1 | 0–999 | SEG1 | 28800 | 0:00–23:59 | Tier1 |
| | VSEG2 | 1000–1999 | SEG4 | 68400 | 0:00–23:59 | Tier2 |
| | VSEG3 | 2000–2999 | SEG5 | 12960 | 0:00–23:59 | Tier3 |
| VVOL2 | VSEG4 | 0–999 | SEG2 | 111600 | 0:00–23:59 | Tier2 |
| VVOL3 | VSEG5 | 0–999 | SEG3 | 158400 | 0:00–23:59 | Tier3 |
| ... | ... | ... | ... | ... | ... | ... |

| Host performance history management information ||||
| Host ID (1101) | CPU utilization ratio (1102) | Date/time (1103) | Bottleneck (1104) |
| --- | --- | --- | --- |
| Host 1 | 87 % | 2011/07/29 0:00:00 | - |
| Host 1 | 90 % | 2011/07/29 0:10:00 | CPU |
| Host 2 | 32 % | 2011/07/29 0:10:00 | - |
| ... | ... | ... | ... |

| RAID group management information (storage side) | | | |
|---|---|---|---|
| 1301 | 1302 | 1303 | 1304 |
| RAID group ID | Device type | RAID level | PDEV-ID |
| RG1 | SSD | RAID5(3D+1P) | PDEV1 |
| | | | PDEV2 |
| | | | PDEV3 |
| | | | PDEV4 |
| RG2 | FC | RAID5(3D+1P) | PDEV5 |
| | | | PDEV6 |
| | | | PDEV7 |
| | | | PDEV8 |
| RG3 | SATA | RAID0 | PDEV9 |
| | | | PDEV10 |
| ... | ... | ... | ... |

Real area management information (storage side)

| RAID group ID | Real area ID | RAID group LBA range | Allocation status |
|---|---|---|---|
| RG1 | SEG1 | 0-999 | Allocated |
| | SEG2 | 1000-1999 | Allocated |
| | SEG3 | 2000-2999 | Allocated |
| RG2 | SEG4 | 0-999 | Allocated |
| | SEG5 | 1000-1999 | Unallocated |
| RG3 | SEG6 | 0-999 | Allocated |
| | SEG7 | 1000-1999 | Unallocated |
| ... | ... | ... | ... |

| Virtual allocation destination management information | |
|---|---|
| Virtual area ID | Virtual allocation destination |
| VSEG1 | Tier1 |
| VSEG2 | Tier2 |
| VSEG3 | Tier3 |
| VSEG4 | Tier2 |
| ... | ... |

FIG. 33

Host performance information by configuration plan — 2900

Configuration plan information (target host = host 1) — 2909

| Configuration plan ID (2901) | Tier1 (2902) | Tier2 (2903) | Pool response time (ms) (2904) |
|---|---|---|---|
| Plan1 | 100 pages | 250 pages | 0.68 |
| Plan2 | 50 pages | 500 pages | 0.69 |
| ... | ... | ... | ... |

2908

Host performance information (select Plan 2) — 2910

| Host ID (2905) | Response time (ms) prior to applying configuration plan (2906) | Response time (ms) after applying configuration plan (2907) |
|---|---|---|
| Host 1 | 0.45 | 1.00 |
| Host 2 | 0.80 | 0.74 |
| ... | ... | ... |

| | | Bottleneck threshold management information | | |
|---|---|---|---|---|
| 3501 | 3502 | 3503 | 3504 | 3505 |
| Host ID | CPU utilization ratio threshold | Period | I/O response time target value (ms) | I/O response time automatic setting |
| Host 1 | 90% | One hour | - | On |
| Host 2 | 95% | One hour | 1.5 | Off |
| Host 3 | 80% | Two hours | 1.5 | Off |
| ... | ... | ... | ... | |

| Response time change index management information |||
|---|---|---|
| 3601 | 3602 | 3603 |
| Host ID | Host I/O response time decrease ratio | Pool I/O response time increase ratio |
| Host 1 | 3. 0 | 2. 0 |

FIG. 43

Response time management by Tier configuration information (0314A)

| Configuration plan ID | Tier1 | Tier2 | Number of hosts |
|---|---|---|---|
| Plan1 | 110 pages | 200 pages | NH1 |
| Plan2 | 109 pages | 205 pages | NH2 |
| Plan3 | 108 pages | 210 pages | NH3 |
| ... | ... | ... | ... |

1501  1502  1503  1505

COMPUTER SYSTEM MANAGEMENT APPARATUS AND MANAGEMENT METHOD

TECHNICAL FIELD

The present invention relates to a computer system management apparatus and management method.

BACKGROUND ART

Hierarchical storage technology heightens the utilization efficiency of a storage apparatus. In hierarchical storage technology, a hierarchical pool is formed using multiple types of storage devices having respectively different performances. A real storage area (also called a real area), which is amassed in this hierarchical pool, is allocated to a virtual logical volume.

In hierarchical storage technology, a storage destination for virtual logical volume data is changed either automatically or manually to a tier with appropriate performance based on the I/O (Input/Output) load with respect to this data. Frequently accessed data is stored in a high-performance tier, and infrequently accessed data is stored in a low-performance tier. The use of hierarchical storage technology makes it possible to allocate to the data only the needed portion of a storage device (s) having the performance required for this data.

Patent Literature 1 discloses hierarchical storage technology, which enables the I/O load to be measured for each piece of data included in a virtual storage area called a page, and to change the data storage destination in units of one page (Patent Literature 1).

Patent Literature 2 discloses technology for utilizing a priority, utilization rate, or performance requirement information of an application program to dynamically reallocate a page (Patent Literature 2).

CITATION LIST

Patent Literature

[PTL 1]
Japanese Patent Application Laid-open No. 2010-108341
[PTL 2]
Japanese Patent Application Laid-open No. 2011-70628

SUMMARY OF INVENTION

Technical Problem

The prior art reallocates data between tiers based on the size of the number of I/Os per page. In the prior art, host computer operational information, such as a CPU (Central Processing Unit) utilization rate, a network utilization rate, and a I/O distribution, is not used.

For this reason, in the prior art, even in a case where a large number of I/Os are generated by a host computer for which non-I/O performance (for example, CPU processing time) is becoming a bottleneck, a high-performance high-level tier is nevertheless allocated to the data being used by this host computer.

However, since non-I/O performance is the performance bottleneck in this case, an effect equivalent to the cost of the high-level tier cannot be expected even when efforts are made to increase the speed of I/O response time by allocating a high-level tier. There are cases in which the enhancement of a comprehensive response time, which includes other processing by the host computer besides I/O processing, cannot be expected. Even when the host computer is able to acquire data rapidly, data processing is likely to be delayed due to the high load placed on the host computer CPU.

Therefore, as a result, rather than allocating a high-level tier to the host computer in which a performance bottleneck is occurring, it is preferable that a high-level tier be allocated to another host computer in which a performance bottleneck is not occurring. In so doing, response time, to include that of non-I/O processing, can be maximized for the pool as a whole. However, in the prior art, since a host computer in which a performance bottleneck is occurring uses a high-level tier as mentioned above, the response time of the pool as a whole cannot by optimized.

An object of the present invention is to provide a computer system management apparatus and management method, which make it possible to efficiently use a real storage area of multiple storage tiers by allocating the real storage areas of the multiple storage tiers in accordance with the status of a host computer.

Solution to Problem

To solve for the above-mentioned problems, a computer system management apparatus related to the present invention is a management apparatus for managing a computer system comprising multiple host computers and at least one storage apparatus, wherein the storage apparatus comprises multiple virtual logical volumes for provision to the multiple host computers, and a pool comprising multiple storage tiers of different performances, and executes a reallocation process for associating a logical storage area comprising multiple virtual logical volumes with a real storage area of a prescribed storage tier from among the multiple storage tiers. The management apparatus comprises a performance information management part for managing performance information of the multiple host computers; a load determination part for determining, based on each performance information, whether a prescribed host computer, which has a load equal to or larger than a preconfigured prescribed threshold, exists among the multiple host computers; a reallocation planning part for creating a reallocation plan which stipulates an allocation amount for the real storage area in each of the multiple storage tiers with respect to a prescribed virtual logical volume used by the prescribed host computer from among the multiple virtual logical volumes; and a reallocation instruction part for deciding, based on the reallocation plan, the corresponding relationship between each logical storage area of the multiple virtual logical volumes and each real storage area of each storage tier, notifying the corresponding relationship to the storage apparatus, and instructing the storage apparatus to execute the reallocation process, wherein the reallocation planning part creates multiple reallocation plans via which a response time of the prescribed virtual logical volume becomes equal to or larger than a prescribed target response time, and selects any one of these multiple reallocation plans, and the reallocation instruction part decides the corresponding relationship based on the selected reallocation plan, and notifies the storage apparatus of the decided corresponding relationship.

Other characteristic features related to the present invention will become clear from the explanation of the description and the appended drawings. The aspects of the present invention are achieved and realized in accordance with an element and a combination of diverse elements, and the aspects of the claims appended to the following detailed explanation.

It is to be understood that the explanations of the description are merely quintessential illustrations, and do not limit either the scope or the examples of the present invention in any sense.

BRIEF DESCRIPTION OF DRAWINGS

FIG. 7 is an example of the configuration of information for managing a Tier performance history in the first example.

FIG. 9 is an example of the configuration of information for managing a reallocation plan in the first example.

FIG. 10 is an example of the configuration of information for the management server to manage a virtual volume in the first example.

FIG. 11 is an example of the configuration of information for the storage apparatus to manage a virtual volume in the first example.

FIG. 12 is an example of the configuration of information for managing a host performance history in the first example.

FIG. 14 is an example of the configuration of information for the storage apparatus to manage a RAID group in the first example.

FIG. 17 is an example of the configuration of information for the storage apparatus to manage a real area in the first example.

FIG. 29 is an example of the configuration of information for managing a virtual allocation destination of a reallocation plan formulation process in the first example.

FIG. 33 is an example of a screen for presenting a user with host performance information by configuration plan in the second example.

FIG. 37 is an example of the configuration of information for managing a host performance bottleneck threshold in the third example.

FIG. 38 is an example of the configuration of information for managing a response time change index in a fourth example.

FIG. 43 is an example of the configuration of information for managing a response time by Tier configuration in the fifth example.

DESCRIPTION OF EMBODIMENTS

Figure 1:
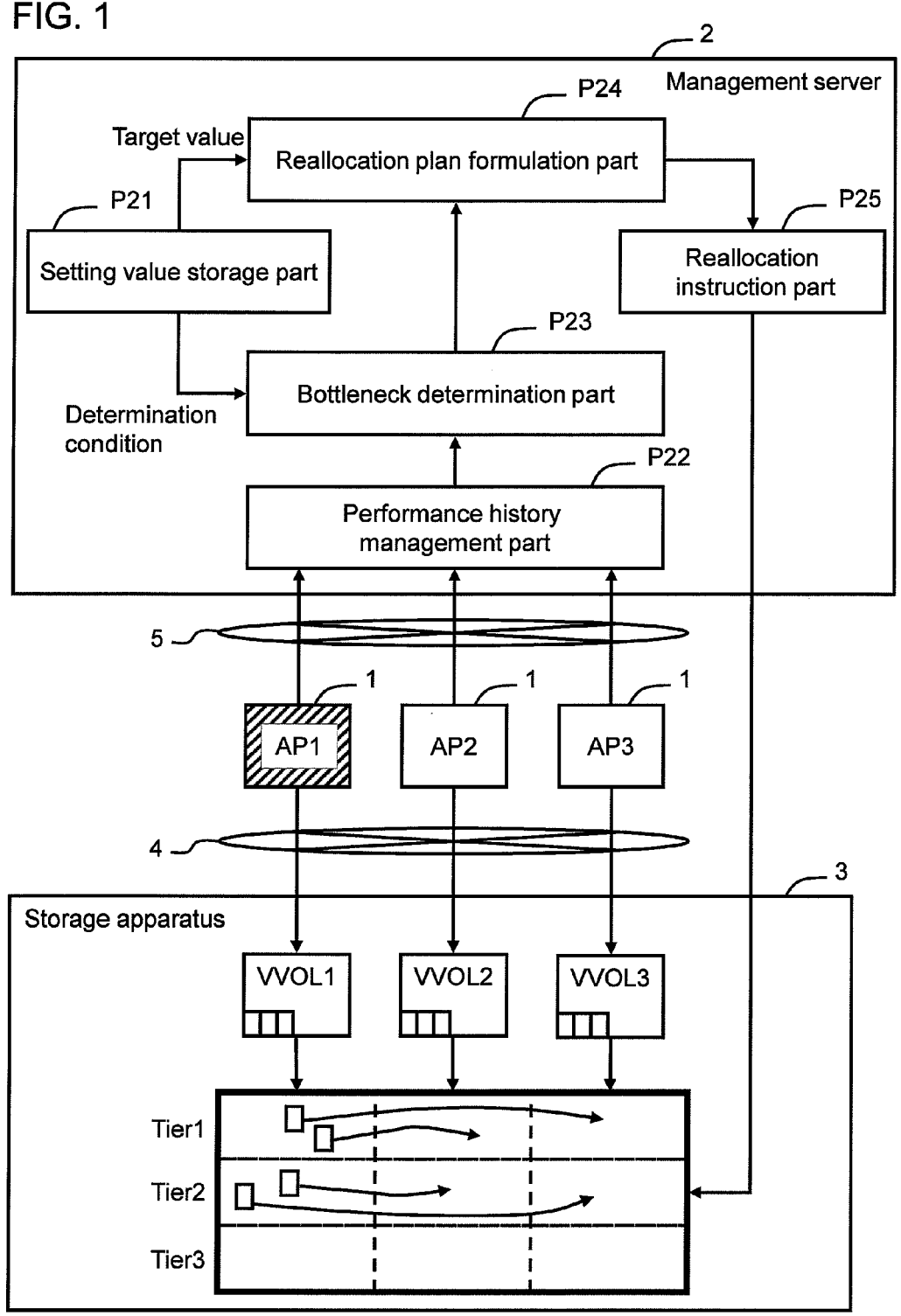
FIG. 1 is an illustration showing an overview of the entire embodiment.

An embodiment of the present invention will be explained below based on the drawings. In the embodiment, a management apparatus and a management method or management software for optimizing the utilization status of multiple storage devices of a storage apparatus will be explained. The embodiment, as will be explained hereinbelow, discloses effective technology for a system configuration that uses application performance information. The embodiment makes it possible to optimize the response time of all hosts sharing a pool.

In the appended drawings, there may be cases in which the same numeral is displayed for functionally similar elements. The attached drawings also show a specific embodiment and examples, which conform to the principle of the present invention. The embodiment and examples are for understanding the present invention, and are not used to interpret the present invention in a limited fashion.

The embodiment is described in sufficient detail for a person of ordinary skill in the art to practice the invention, but other implementations and modes are also possible. It is to be understood that the configuration and structure can be changed and various elements replaced without departing from the scope and spirit of the technical idea of the present invention. Therefore, the following description is not to be interpreted in a manner that is restrictive thereto.

In addition, the embodiment of the present invention, as will be explained hereinbelow, may be implemented using software running on a general-purpose computer, may be implemented using dedicated hardware, or may be implemented using a combination of hardware and software.

In the following explanation, various information of the present invention is explained using a "table" format, but this information does not necessarily have to be expressed in accordance with a data structure using a table, and may be expressed using a data structure such as a list, a DB, a queue, or something else. For this reason, to show that the information is not dependent on the data structure, "table", "list", "DB", "queue" and so forth may simply be called "information".

When explaining the content of the various information, an expression such as "identification information", "identifier", "name", or "ID" can be used, and these expressions are interchangeable.

Below, respective processes of the embodiment of the present invention are explained having a "program" as the subject (doer of the action), but since a stipulated process is performed in accordance with a program being executed by a processor while using a memory and a communication port (a communication control device), the explanation may also have the processor as the subject. A process, which is disclosed having the program as the subject, may be regarded as a process performed by a management server or other such computer or an information processing apparatus. Either part or all of a program may be realized using dedicated hardware, or may be modularized. Various types of programs may be installed in respective computers using either a program delivery server or a storage medium.

FIG. 1 is an illustration schematically showing the overall concept of the embodiment. The configuration shown in FIG. 1 is merely an example, and the scope of the present invention is not limited to the configuration of FIG. 1. A computer system comprises multiple host computers (hereinafter, host) 1, at least one management server 2, and at least one storage apparatus 3.

The host 1 and the storage apparatus 3, for example, are coupled via a communication network 4 for I/O use, such as a FC-SAN (Fibre Channel-Storage Area Network) or an IP-SAN (Internet Protocol-SAN). The host 1, the storage apparatus 3 and the management server 2, for example, are coupled via a communication network 5 for management use, such as a LAN (Local Area Network). The configuration may be such that the I/O communication network 4 and the management communication network 5 are combined into a single communication network.

The storage apparatus 3 comprises multiple storage tiers (hereinafter, Tier) having respectively different performances. A real storage area in a Tier is associated with a logical storage area in a virtual logical volume, and stores the virtual logical volume data. Hereinafter, a virtual logical volume may be called a virtual volume, a real storage area may be called a real page, and a logical storage area may be called a logical page, respectively. In FIG. 1, the host 1, which runs an application program (hereinafter, application) AP1, uses a virtual volume VVOL1. The host 1, which runs an application AP2, uses a virtual volume VVOL2, and the host 1, which runs an application AP3, uses a virtual volume VVOL3.

The management server 2, which serves as the "management apparatus", for example, comprises a setting value storage part P21, a performance history management part P22, a bottleneck determination part P23, a reallocation plan formulation part P24, and a reallocation instruction part P25. These functions P21 through P25 correspond to a storage/host management program 0124, which will be explained further below.

The setting value storage part P21 stores a value inputted by a user, such as the system administrator, as a setting value. The performance history management part P22, which serves as the "performance information management part", collects host 1 performance information, and manages a performance information history. The bottleneck determination part P23, which serves as the "load determination part", determines whether the host 1 load status is a high load status of equal to or higher than a prescribed threshold. The user can input the prescribed threshold, and this input value is stored in the setting value storage part P21. In FIG. 1, it is supposed that the host 1 running the application AP1 is a high load status.

The reallocation plan formulation part P24, which serves as the "reallocation planning part", computes an allocation amount of real pages for each Tier with respect to a virtual volume (VVOL1) being used by the high load status host 1 (AP1). The reallocation plan formulation part P24 creates a reallocation plan for establishing how many real pages are allocated to the high-level Tier, and how many real pages are allocated to the mid-level Tier with respect to the virtual volume (VVOL1).

The reallocation instruction part P25, based on the reallocation plan, decides the corresponding relationship between a logical page of each virtual volume and a real page of each Tier, and informs the storage apparatus 3. The storage apparatus 3, based on an instruction from the reallocation instruction part P25, allocates a real page of a prescribed Tier to a logical page of a virtual volume.

The reallocation plan formulation part P24 of the embodiment minimizes the number of real pages of either the high-level Tier or the mid-level Tier, which are allocated to the high load status host 1 (AP1). The reallocation instruction part P25 allocates a real page (s) of either the high-level Tier or the mid-level Tier, which has not been allocated to the high load status host 1 (AP1), to the other hosts 1 (AP2, AP3).

Therefore, the embodiment makes it possible to more efficiently use a real page in a pool, and to optimize the response times of all of the multiple hosts sharing the pool. The embodiment will be explained in detail hereinbelow.

Example 1

A first example will be explained by referring to FIGS. 2 through 31. In this example, a virtual volume, which is used by multiple hosts, is created based on the same pool in the storage apparatus. The pool comprises multiple storage tiers of different performances. The management server performs page reallocation on the basis of host performance information and real page access information.

Figure 2:
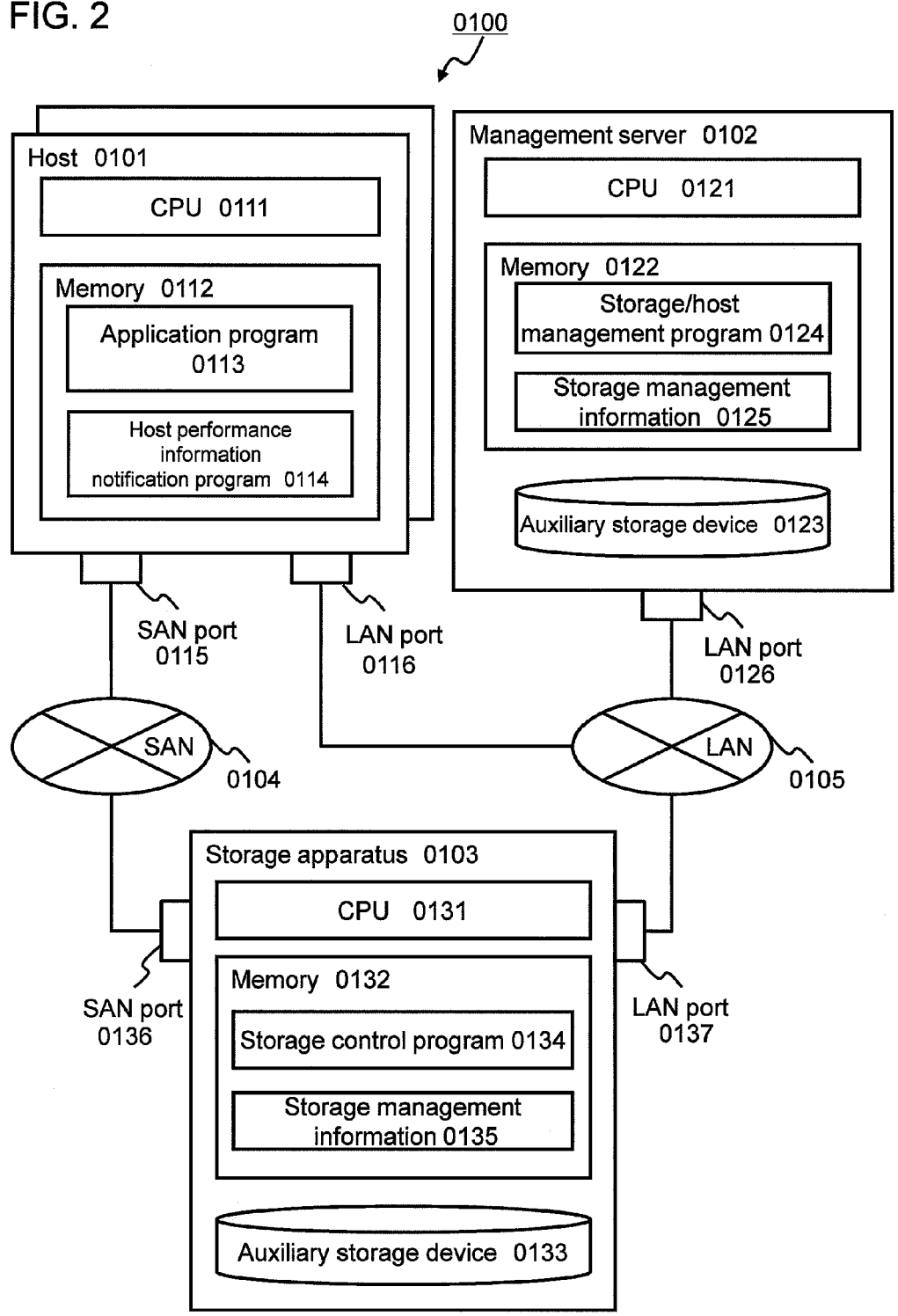
FIG. 2 is an example of a block diagram of an entire system in a first example.

FIG. 2 is a diagram showing a simplified view of a computer system according to the first example. The computer system 0100 comprises multiple hosts 0101, at least one management server 0102, and at least one storage apparatus 0103. The host 0101 and the storage apparatus 0103 are coupled via a SAN (Storage Area Network) 0104. The host 0101, the management server 0102, and the storage apparatus 0103 are coupled via a LAN (Local Area Network) 0105.

(1) Host 0101

The host 0101 comprises a CPU 0111 and a memory 0112. The host 0101 comprises a SAN port 0115, and is coupled to the SAN 0104 via the SAN port 0115. The host 0101 also comprises a LAN port 0116, and is coupled to the LAN 0105 via the LAN port 0116.

Figure 5:
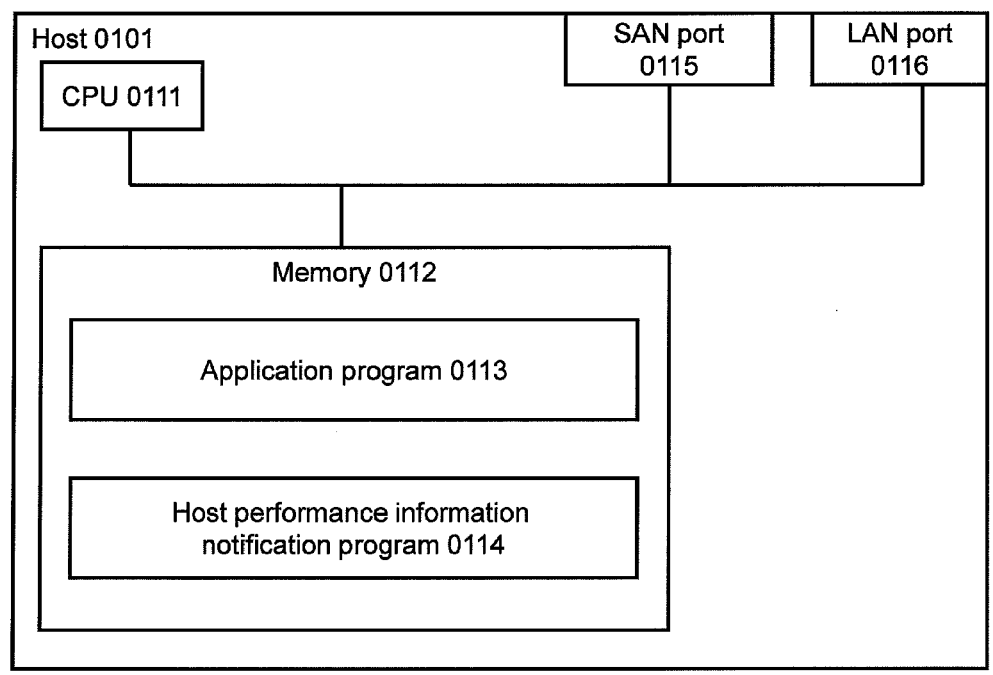
FIG. 5 is an example of a block diagram of a host in the first example.

FIG. 5 is a diagram showing the hardware configuration of the host 0101. The CPU 0111 performs various processing by executing an application 0113 and a host performance information notification program 0114, which are stored in the memory 0112.

The memory 0112 stores the application 0113, the host performance information notification program 0114, information (not shown in the drawing) required when the CPU 0111 executes the application 0113, and information (not shown in the drawing) required when the CPU 0111 executes the host performance information notification program 0114. The host performance information notification program 0114, for example, notifies the management server 0102 of performance information, such as either the host CPU utilization ratio or network utilization ratio, at a prescribed cycle (for example, once every 10 minutes).

(2) Management Server 0102

The management server 0102 comprises a CPU 0121, a memory 0122, and an auxiliary storage device 0123. The management server 0102 comprises a LAN port 0126, and is coupled to the LAN 0105 via the LAN port 0126.

Figure 4:
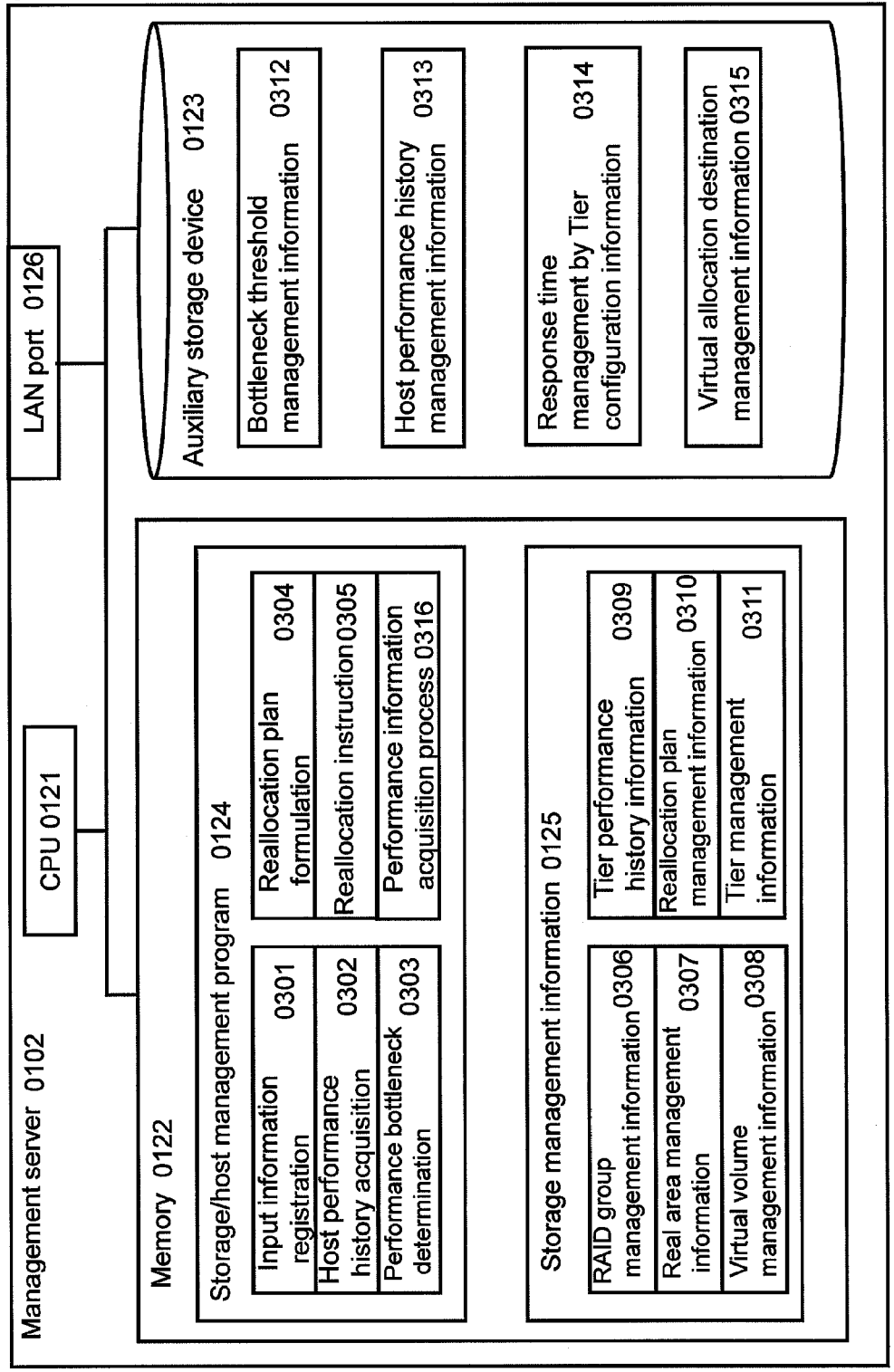
FIG. 4 is an example of a block diagram of a management server in the first example.

FIG. 4 is a diagram showing the hardware configuration of the management server 0102. The CPU 0121 performs various processing by executing a storage/host management program 0124 stored in the memory 0122.

The memory 0122 stores the storage/host management program 0124, information (not shown in the drawing) required when executing the storage/host management program 0124, and storage management information 0125.

The storage/host management program 0124, for example, creates a reallocation plan for a storage device 0133 of the storage apparatus 0103 from host performance information, which is stored in the auxiliary storage device 0123, and storage apparatus 0103 information, which is stored in the storage management information 0125.

The storage/host management program 0124, for example, comprises an input information registration program 0301, a host performance history acquisition program 0302, a performance bottleneck determination program 0303, a reallocation plan formulation program 0304, and a reallocation program 0305. Each process will be explained further below. Simply put, the storage/host management program 0124 comprises a process for collecting information from the host 0101 and the storage apparatus 0103, and, based on the collected information, creating a reallocation plan related to the auxiliary storage device 0133 of the storage apparatus 0103, and notifying the storage apparatus 0103 thereof.

The storage management information 0125, for example, comprises RAID group management information 0306, real area management information 0307, virtual volume management information 0308, Tier performance history information 0309, reallocation plan management information 0310, and Tier management information 0311. The respective information will be explained further below. Simply put, the storage management information 0125 of the management server 0102 selects and stores information required for creating a reallocation plan from the storage management information 0135 of the storage apparatus 0103.

The auxiliary storage device 0123 stores information, which is either collected or managed by the storage/host management program 0124. The auxiliary storage device 0123 is configured from one storage device in the drawing, but is not limited to one, and may be configured from multiple auxiliary storage devices. The auxiliary storage device 0123, for example, can be a SATA (Serial Advanced Technology Attachment) disk, a FC (Fibre Channel) disk, or a SSD (Solid State Drive).

The management server 0102 comprises an input device and an output device (not shown in the drawing). The output device, for example, is a display device. As an alternative to the input/output device, a serial interface or an Ethernet interface may be used as the input/output device. A computer for display use comprising a display and a keyboard (and/or a pointer device) may be coupled to this interface. The management server 0102 can carry out a display by sending display information to the display computer, and can receive information inputted by the user to the display computer from the display computer. The display computer may be configured as a mobile phone, a portable information terminal, or a personal computer. The management server 0102 may comprise multiple computers.

(3) Storage Apparatus 0103

The storage apparatus 0103 comprises a SAN port 0136 and a LAN port 0137. The storage apparatus 0103 is coupled to the SAN 0104 via the SAN port 0136, and is coupled to the LAN 0105 via the LAN port 0137. The storage apparatus 0103 also comprises a CPU 0131, a memory 0132, and at least one auxiliary storage device 0133.

Figure 3:
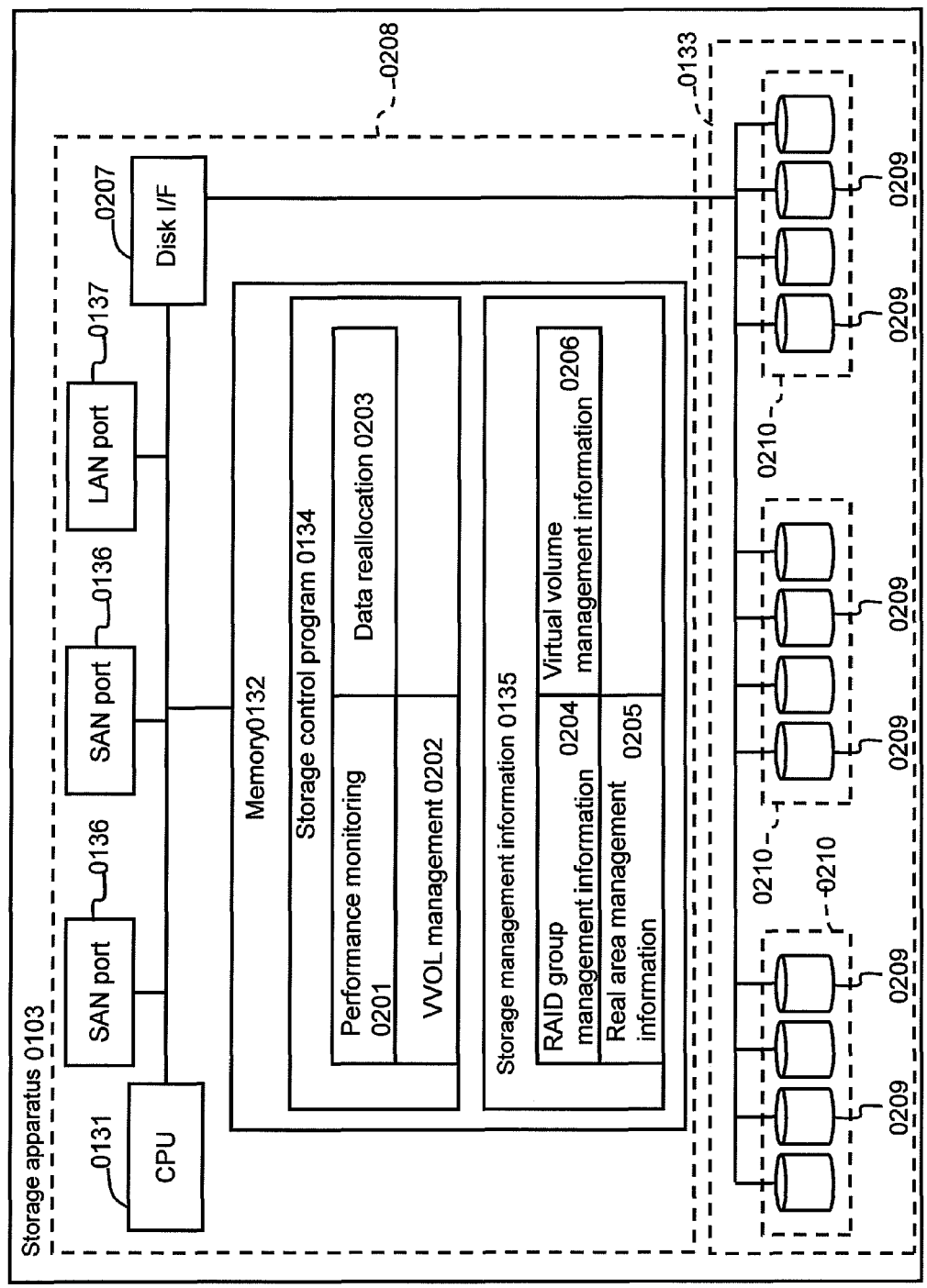
FIG. 3 is an example of a block diagram of a storage apparatus in the first example.

FIG. 3 is a diagram showing the hardware configuration of the storage apparatus 0103. The CPU 0131 performs various processing by executing a storage control program 0134 stored in the memory 0132.

The memory 0132 stores the storage control program 0134, and storage management information 0135 required when the CPU 0131 executes the storage control program 0134. The storage control program 0134, for example, can also execute processing for making it appear to the host 0101 that a logical volume logically provided from another storage apparatus is actually a logical volume unique to the storage apparatus 0103.

The auxiliary storage device 0133 provides an area, which is handled as a storage area by the storage control program 0134 as will be explained further below. The auxiliary storage device 0133 comprises multiple storage devices 0209 of different performances. The storage devices 0209, for example, comprise a SATA disk, a FC disk, and a SSD. Storage areas of the same type of storage device 0209 are grouped together as a RAID group 0210, and the grouped storage areas can be used to create a logical volume.

<Example of Logical Storage Area Configuration>

Figure 6:
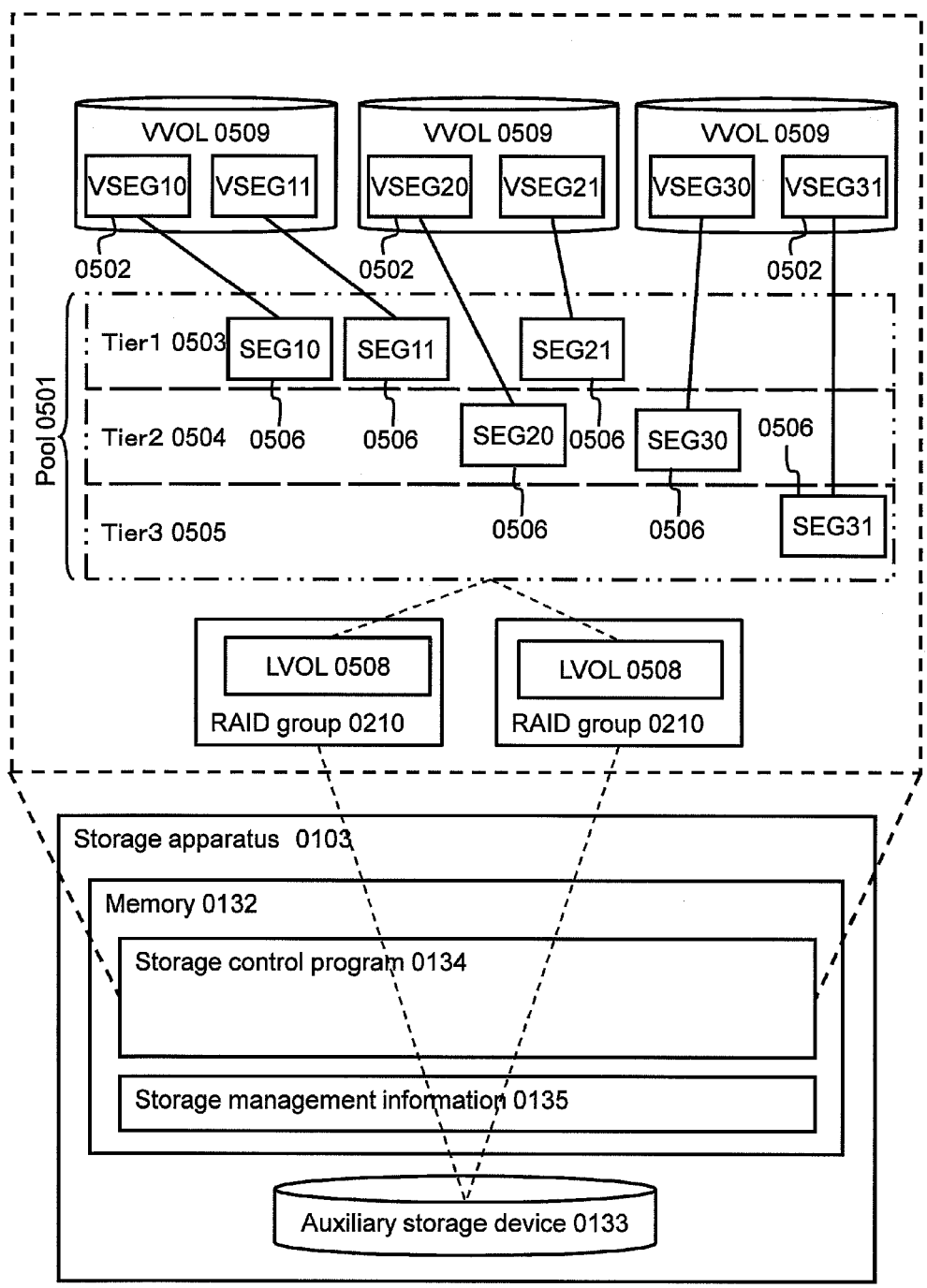
FIG. 6 is an example of a conceptual diagram of the logic of a storage control program in the first example.

FIG. 6 is a conceptual view of the logic of the storage control program 0134. The storage control program 0134 comprises functions for constructing a logical storage area from multiple auxiliary storage devices. For example, the storage control program 0134 is able to construct a logical storage area, such as a RAID group 0210, a logical volume 0508, a storage pool 0501, and a virtual logical volume 0509. Each logical storage area will be explained in detail below.

The RAID group 0210 is a logical storage area, that is, a RAID (Redundant Arrays of Inexpensive Disks), which is configured from multiple storage devices 0209, and is constructed using the storage control program 0134.

For example, the storage control program 0134 receives instructions as to which of multiple auxiliary storage devices 0133 will comprise a RAID group, and RAID level instructions from the management server 0102 as input parameters. The storage control program 0134 can construct a RAID group 0210 having the specified RAID level in the specified auxiliary storage device 0133. The storage control program 0134 can create a mixture of RAID groups 0201 of various sizes.

The logical volume 0508 is a logical storage area in the RAID group 0210, and is constructed by the storage control program 0134. For example, the storage control program 0134 receives a creation-source RAID group 0210 and the size of the logical volume 0508 to be created as input values from the management server 0102. The storage control program 0134 creates a logical volume 0508 having the specified size based on the specified RAID group 0210.

The storage pool 0501 is a logical storage area comprising multiple logical volumes 0508, and is constructed by the storage control program 0134. For example, the storage control program 0134 receives multiple logical volumes 0508 to configure the pool as input values from the management server 0102. The storage control program 0134 can construct the storage pool 0501 using the specified multiple logical volumes 0508.

The real area (SEG) 0506, which serves as the "real storage area", is either one or multiple logical storage areas, which comprise the storage pool 0501, and is constructed by the storage control program 0134. The real area (SEG) 0506 may be called either a "real page" or a SEG. Data stored in the SEG 0506 is stored in a logical volume 0508 comprising the storage pool 0501 by way of the relevant storage pool 0501 comprising this page (SEG).

The virtual volume (VVOL) 0509, which serves as the "virtual logical volume", is a logical storage area, which is constructed from multiple virtual areas (VSEGs) 0502 by the storage control program 0134. The virtual volume 0509 is disclosed to the host 0101 as a virtual volume having a capacity of equal to or larger than the real capacity. Hereinbelow, the virtual volume may be abbreviated as VVOL in the drawings. The virtual area (VSEG), which serves as the "logical storage area", is also called a logical page, and, as will be explained further below, is associated with a real page (SEG).

For example, the storage control program 0134, upon receiving the capacity of the virtual volume 0509 from the management server 0102 as an input value, uses multiple SEGs 0506 to construct a virtual volume 0509 having the specified capacity.

Each virtual volume 0509 is associated with a pool 0501. Simply stated, when the host 0101 writes data to a VSEG 0506 in the virtual volume 0509, a SEG 0506 selected from the pool 0501 is allocated to this write-destination VSEG 0506. The write data from the host 0101 is written to the allocated SEG 0506.

The pool 0501 comprises multiple storage tiers, each having different performance. The pool 0501, for example, can comprises three types of storage tiers, i.e., a first tier (Tier 1) 0503, a second tier (Tier 2) 0504, and a third tier (Tier 3) 0505.

The first tier 0503 comprises multiple real areas (SEGs) 0506 of the highest performance storage device 0209. The first tier 0503 can also be called the highest level tier. The second tier 0504 comprises multiple real areas (SEGs) 0506 of a medium performance storage device 0209. The second tier 0504 can also be called the mid-level tier. The third tier 0505 comprises multiple real areas (SEGs) 0506 of the lowest level storage device 0209. The third tier 0505 can also be called the lowest level tier. In the following explanation, the first tier 0503 and the second tier 0504 may collectively be called the high-level Tier.

In a case where the host 0101 writes data to a virtual area (VSEG) 0502 to which a real area 0506 has not been allocated, a real area 0506 belonging to any tier of the respective tiers 0503, 0504, and 0505, is selected by the storage apparatus 0103. The storage apparatus 0103 allocates the selected real area 0506 to the write-target virtual area 0502. The storage apparatus 0103 writes the write-data from the host 0101 to the real area 0506 allocated to the virtual area 0502.

The destination tier of the data of the real area 0506 allocated to the virtual area 0502 of the virtual volume 0509 changes in accordance with the utilization frequency of this data. The storage apparatus 0103, based on information related to access to the real area 0506 (or, to put it another way, information related to accesses the virtual area 0502), changes the tier to which the data of this real area 0506 belongs either regularly or irregularly.

For example, data of a frequently accessed virtual area 0502 is moved to a high-performance tier by the storage apparatus 0103. By contrast, data of an infrequently accessed virtual area 0502 is moved to a lower performance tier. The storage apparatus 0103 changes the data allocation destination by performing a data copy to the real area 0506 (copy destination) belonging to a reallocation-destination tier from the real area 0506 (copy source), which is storing the data.

Since the frequently accessed data is stored in a high-performance tier, the response time therefor is shortened. In addition, since infrequently accessed data can be moved from the high-performance tier to a low-performance tier, a high-performance tier can be prevented from being used wastefully, and can be used efficiently.

<Overview of Storage Apparatus Processing>

The storage control program 0134 provides the above-mentioned logical storage area configuration function and logical volume allocation function, a virtual volume expansion function, and a performance information collection function. The logical storage area configuration function is for configuring a logical storage area. The logical volume allocation function is for allocating a logical volume 0508 and a virtual volume 0509 to the host 0101. The virtual volume expansion function is for allocating a real area 0506 to a virtual area 0502 of the virtual volume 0509 in accordance with an I/O command from the host 0101, to which the volume is allocated. The performance information collection function is for regularly collecting storage resource performance information.

The storage control program 0134 stores and manages management information related to these functions in the storage management information 0135. The storage control program 0134 also sends management information to other storage apparatuses (not shown in the drawing) and hosts 0101 in response to a request from the management server 0102. The request from the management server 0102, for example, can be sent to the storage control program 0134 through the LAN 0105.

The storage apparatus 0103 realizes the respective functions mentioned above in accordance with the storage control program 0134. The storage control program 0134, as shown in FIG. 3, comprises a virtual volume management program 0202, a performance monitoring program 0201, and a data reallocation program 0203.

The virtual volume management program 0202 is a function for managing the configuration of the virtual volume 0509. The virtual volume management program 0202 creates a virtual volume 0509, associates this virtual volume 0509 with the host 0101, and allocates a real area 0506 in a pool 0501 to a virtual area 0502 in accordance with a write access from the host 0101. In addition, the virtual volume management program 0202 changes the reallocation destination of this data based on an instruction from the management server 0102 and/or the data access frequency.

The performance monitoring program 0201 acquires a performance value from each real area 0506. As used here, "performance", for example, is access performance. Access performance, for example, includes a response time, a data transfer speed, or IOPS (the number of access requests processed per unit of time). Access performance, for example, is computed from an access frequency acquired using either a read process 2400 or a write process 2500.

Figure 25:
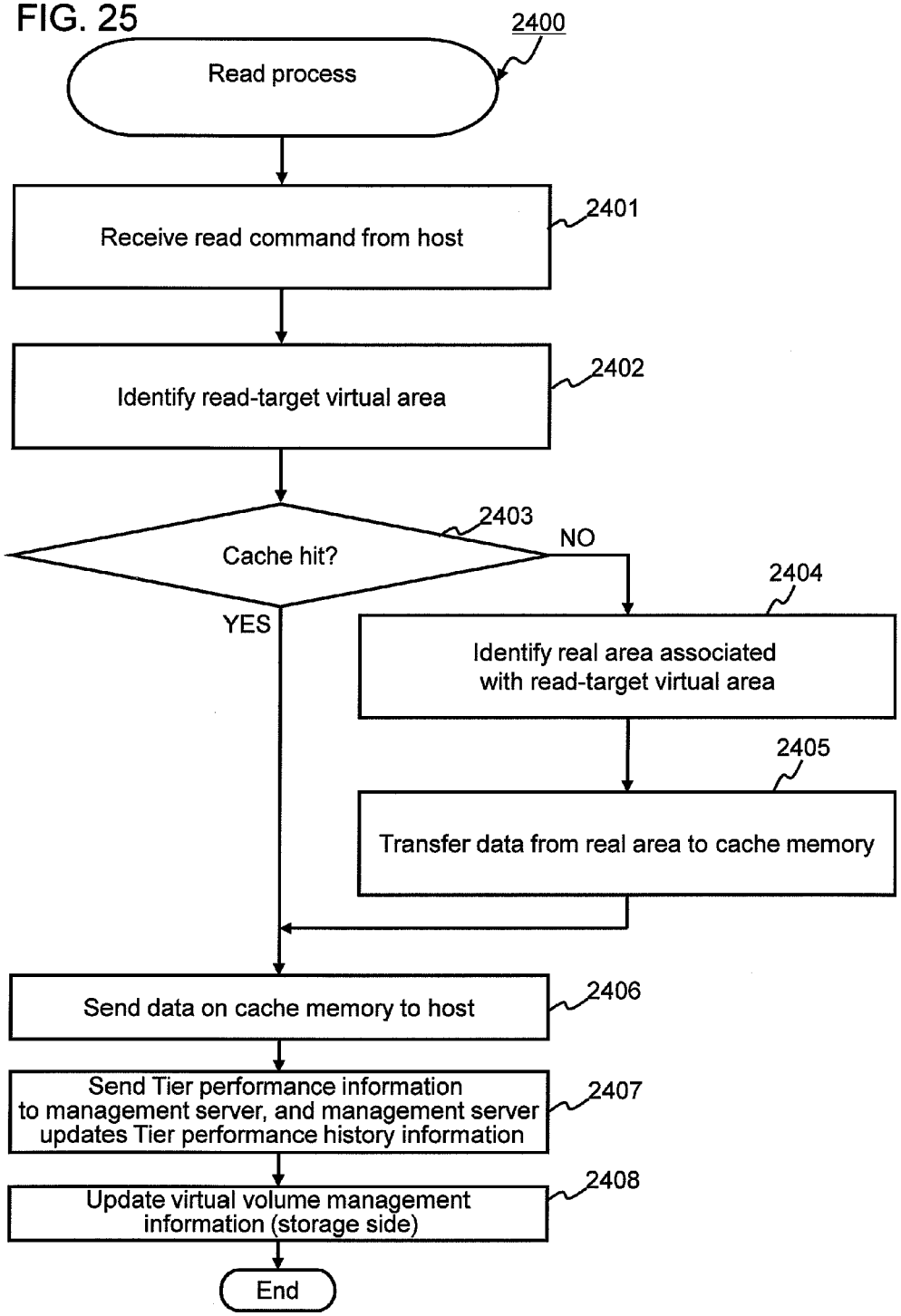
FIG. 25 is an example of a flowchart for illustrating a read process in the first example.

FIG. 25 is an example of a flowchart for illustrating a read process 2400. This process is executed by the storage control program 0134 of the storage apparatus 0103.

The storage control program 0134, upon receiving a read request (read command) from the host 0101 (Step 2401), temporarily (until Step 2407) stores a processing start time in the memory 0132, and starts the read processing.

In Step 2402, the storage control program 0134 identifies a virtual area (hereinafter, the read-target virtual area), which is the target of the data read, based on access-destination information of the read request.

In Step 2403, the storage control program 0134 determines whether or not the data of the read-target virtual area exists on the cache memory (not shown in the drawing) of the storage apparatus 0103. In a case where the read-target virtual area data is stored on the cache memory (Step 2403: YES), in Step 2406, the storage control program 0134 sends the read-target data on the cache memory to the host 0101.

In a case where the read-target virtual area data is not on the cache memory (Step 2403: NO), in Step 2404, the storage control program 0134 identifies, on the basis of virtual volume management information 0206, the real area (hereinafter, the read-target real area) allocated to the read-target virtual area identified in Step 2402.

In Step 2405, the storage control program 0134 reads the data from the read-target real area, and writes this data to the cache memory. In addition, the storage control program 0134 sends the data written to the cache memory to the host 0101 in Step 2406.

In Step 2407, the storage control program 0134 acquires a reallocation destination determination result 1007 for the read-target virtual area from the virtual volume management information 0202, and sends the difference between the processing start time stored at the start of the read process and the point in time at the execution of Step 2407 to the management server 0102. The management server 0102 uses the received information to update Tier performance history information 0309 (Step 2407). The method for updating the Tier performance history information 0309 will be explained further below.

Lastly, in Step 2408, the storage control program 0134 updates the value of the number of accesses 1005 corresponding to the read-target virtual area in the virtual volume management information 0206.

Figure 26:
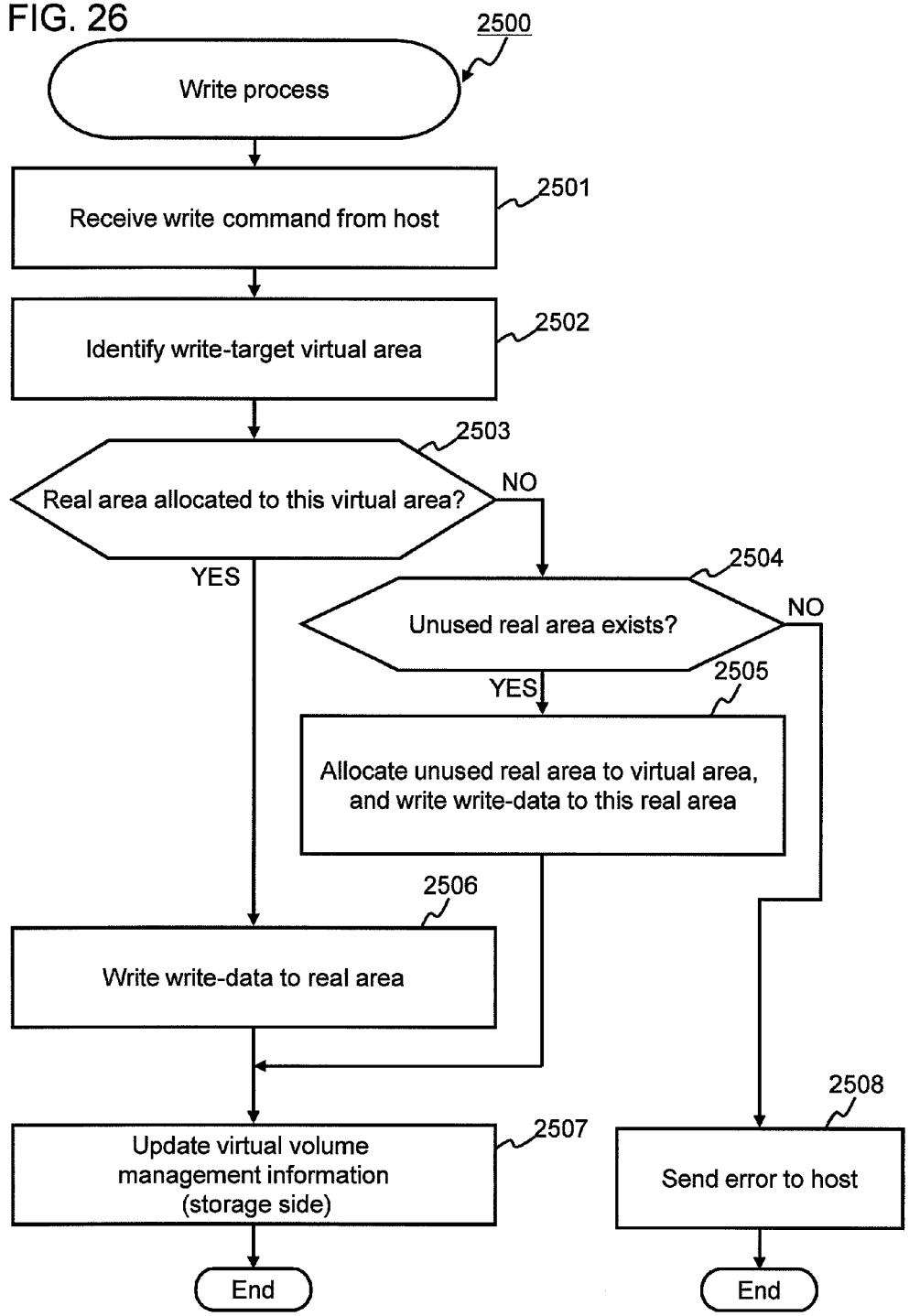
FIG. 26 is an example of a flowchart for illustrating a write process in the first example.

FIG. 26 is an example of a flowchart for illustrating a write process 2500. This process is executed by the storage control program 0134.

The storage control program 0134, upon receiving a write request from the host 0101, starts a write process (Step 2501). In Step 2502, the storage control program 0134 identifies the virtual volume, which is the destination of the data write (write-target virtual volume), based on access-destination information of the write request.

The storage control program 0134, in Step 2503, determines whether or not a real area is allocated to the write-target virtual area. Specifically, the storage control program 0134 determines whether or not the write-target virtual area is registered in the virtual volume management information 0206.

In a case where a real area is allocated to the write-target virtual area (Step 2503: YES), in Step 2506, the storage control program 0134 writes the write-target data to the real area allocated to the write-target virtual area.

In a case where a real area is not allocated to the write-target virtual area (Step 2503: NO), in Step 2504, the storage control program 0134 determines whether or not an unused real area capable of being allocated to the write-target virtual area exists. Specifically, the storage control program 0134 determines whether or not there exists a real area, for which the allocation status 1603 of the real area management information 0205 is configured to "unallocated".

In a case where there exists an unallocated real area for the write-target virtual area (Step 2504: YES), in Step 2505, the storage control program 0134 allocates the unallocated real area to the write-target virtual area and writes the write-target data to this real area.

In a case where an unallocated real area does not exist for the write-target virtual area (Step 2504: NO), in Step 2508, the storage control program 0134 sends an error to the host 0101.

Lastly, in Step 2507, the storage control program 0134 updates the value of the number of accesses 1005 corresponding to the write-target virtual area in the virtual volume management information 0206.

The data reallocation program 0203 shown in FIG. 3 updates the association between the virtual area 0502 and the real area 0506 based on the reallocation destination determination result 1007, the virtual area ID 1002, and the real area ID 1004 of the virtual volume management information 0206, which the management server 0102 computed in the reallocation process 0305.

<Examples of Configurations of Respective Management Information>

The management information stored in the storage apparatus 0103 will be explained below. The storage apparatus 0103, as shown in FIG. 3, for example, comprises RAID group management information 0204, real area management information 0205, and virtual volume management information 0206.

(1) RAID group management information (FIG. 14)

FIG. 14 is a diagram showing an example of the configuration of RAID group management information 0204 for managing the information of a RAID group 0210. The RAID group management information 0204, for example, comprises as configuration items a RAID group ID 1301, a device type 1302, a RAID level 1303, and a storage device ID 1304.

The RAID group ID 1301 is an identifier for uniquely specifying or identifying a RAID group 0210. The device type 1302 is information showing the type of a storage device 0209 comprising the RAID group 0210. The RAID level 1303 is information showing the RAID level and combination of the RAID group 0210. The storage device ID 1304 is information for identifying a storage device 0209 comprising the RAID group 0210. In the drawing, the storage device 0209 may be abbreviated as "PDEV".

A portion of the items included in the table shown in the drawing may be changed to other items, and new items may be added. The same will hold true for each of the tables (information) described hereinbelow. In addition, one table can be partitioned into multiple tables.

(2) Real Area Management Information (FIG. 17)

FIG. 17 is a diagram showing an example of the configuration of the real area management information 0205 for managing the information of a real area 0506. The real area management information 0205, for example, comprises a RAID group ID 1601, a real area ID 1602, a RAID group LBA range 1603, and an allocation status 1604 as configuration items.

The RAID group ID 1601 is an identifier for either uniquely specifying or identifying a RAID group 0210. The real area ID 1602 is information for identifying a real area 0506. The LBA range 1603 is information showing the LBA (Logical Block Addressing) range of the RAID group 0210 corresponding to the real area 0506. The allocation status 1604 is information showing whether or not the real area 0506 has been allocated to a virtual volume 0509.

(3) Virtual Volume Management Information (FIG. 11)

FIG. 11 is a diagram showing an example of the configuration of the virtual volume management information 0206 for managing a virtual volume 0509. The virtual volume management information 0206 manages information related to each virtual area 0502 in the virtual volume 0509, and the real area 0506 allocated to this virtual area 0502.

For example, the virtual volume management information 0206 correspondingly manages a virtual volume ID 1001, a virtual area ID 1002, a virtual volume LBA range 1003, a real area ID 1004, the number of accesses 1005, a monitoring period 1006, and a reallocation destination determination result 1007.

The virtual volume ID (VVOL-ID) 1001 is information for identifying a virtual volume 0509. The virtual volume ID 1001 is not an identifier specified by the host 0101, but rather is an identifier recognized inside the storage apparatus 0103. The virtual area ID 1002 is information for identifying a virtual area 0502.

The virtual volume LBA range 1003 is a value showing the LBA range corresponding to the virtual area 0502 of the virtual volume 0509. The real area ID 1004 is information for identifying the real area 0506 allocated to the virtual area 0502 of the virtual volume 0509.

The number of accesses 1005 is information showing the number of accesses (cumulative number of I/Os) from the host 0101 with respect to a virtual area 0502 in the virtual volume 0509. The number of accesses 1005 is the number of times the virtual area 0502 has been accessed. Monitoring of the number of accesses is performed by the storage apparatus 0103 within a time range configured in the monitoring period 1006.

In a case where a value denoting a specific time slot is not configured in the monitoring period 1006, the storage apparatus 0103 monitors the number of accesses at all times. The storage apparatus 0103 resets the value of the number of accesses 1005 to 0 at the start of monitoring. In a case where a monitoring result is not stored during the monitoring period 1006, the value of the number of accesses 1005 is reset to 0 at fixed intervals, for example, every 24 hours.

The monitoring period is registered in the monitoring period 1006 by the performance monitoring program 0201. The time range during which the performance monitoring program 0201 monitors the number of accesses to the virtual volume 0509 and stores the monitoring results is stored in the monitoring period 1006. The value of the monitoring period 1006 can be assigned beforehand as a fixed value, or an arbitrary value can be configured by the management server 0102.

Information showing a data reallocation-destination tier determined by a reallocation process is registered in the reallocation destination determination result 1007. One tier for providing a real area to be allocated to a virtual area in the virtual volume is decided in accordance with the reallocation process, which will be explained further below. Identification information for identifying the decided tier is stored in the reallocation destination determination result 1007.

<Logical Configuration of Management Server>

FIG. 4 is a diagram showing an example of the logical configuration of the memory 0122 and the auxiliary storage device 0123 of the management server 0102.

The storage/host management program 0124 stored in the memory 0122 comprises an input information registration program 0301, a host performance history acquisition program 0302, a performance bottleneck determination program 0303, a reallocation plan formulation program 0304, a reallocation instruction program 0305, and a performance information acquisition program 0316.

The storage management information 0125 stored in the memory 0122 comprises RAID group management information 0306, real area management information 0307, virtual volume management information 0308, Tier performance history information 0309, reallocation plan management information 0310, and Tier management information 0311.

The auxiliary storage device 0123 comprises bottleneck threshold management information 0312, host performance history management information 0313, response time management by Tier configuration information 0314, and virtual allocation destination management information 0315. The reallocation plan formulation program 0304 manages this management information 0312 through 0315.

The RAID group management information 0306, the real area management information 0307, and the virtual volume management information 0308 of the management server 0102 respectively correspond to the RAID group management information 0204, the real area management information 0205, and the virtual volume management information 0206 of the storage apparatus 0103.

The configurations of the respective management information 0306, 0307, and 0308 in the management server 0102 do not necessarily have to exactly match the configurations of the corresponding management information 0204, 0205, and 0206. The management server 0102 acquires information from the management information 0204, 0205, and 0206 of the storage apparatus 0103, and stores this information in the management information 0306, 0307, and 0308.

Figure 13:
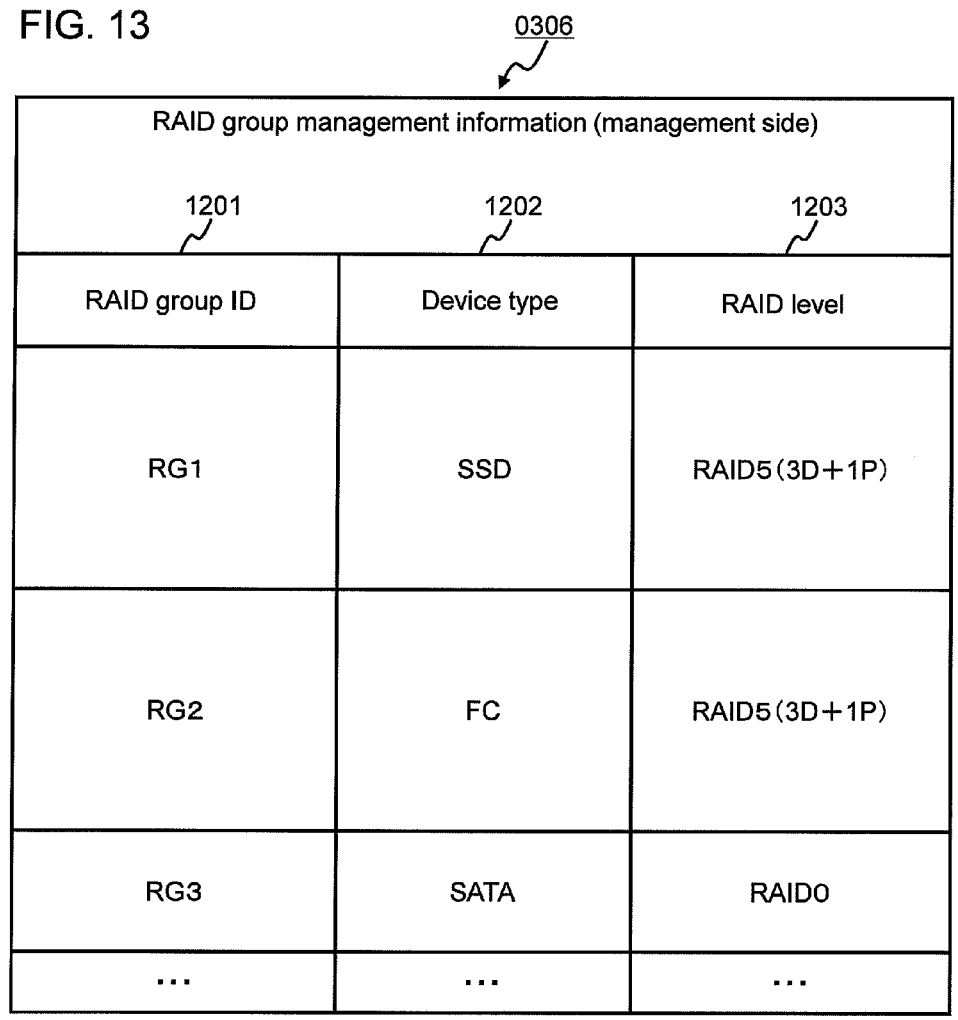
FIG. 13 is an example of the configuration of information for the management server to manage a RAID group in the first example.

(1) RAID Group Management Information (FIG. 13)

FIG. 13 is a diagram showing an example of the configuration of the RAID group management information 0306 of the management server 0102. The RAID group management information 0306 corresponds to the RAID group management information 0204 of the storage apparatus 0103, and is used for storing information of the RAID group management information 0204.

However, the information of the RAID group management information 0306 does not necessarily have to exactly match the information of the RAID group management information 0204. A portion of the information of the RAID group management information 0204 does not have to be stored in the RAID group management information 0306.

For example, the RAID group management information 0306 manages a RAID group ID 1201 denoting the identifier of a RAID group 0210, a device type 1202 denoting the type of storage device 0209 comprising the RAID group 0210, and a RAID level 1203 denoting the RAID level and combination of the RAID group 0210.

(2) Real Area Management Information

The real area management information 0307 of the management server 0102 can be the same configuration as that of the real area management information 0205 of the storage apparatus 0103 shown in FIG. 17, and as such, an explanation will be omitted. Therefore, the real area management information 0307 of the management server side may be explained hereinbelow by referring to FIG. 17.

(3) Virtual Volume Management Information (FIG. 10)

FIG. 10 is a diagram showing an example of the configuration of the virtual volume management information 0308 of the management server 0102. The virtual volume management information 0308, for example, comprises a virtual volume ID 0901, a virtual area ID 0902, a virtual volume LBA range 0903, a real area ID 0904, an IOPS 0905, an allocation destination determination result 0906, and a host ID 0907.

The items 0901, 0902, 0903, 0904, and 0906 correspond to the items 1001, 1002, 1003, 1004, and 1007 of the virtual volume management information 0206 shown in FIG. 11, and as such, explanations will be omitted.

Since the item (item 1006 of FIG. 11) with respect to the period for monitoring the performance information is not needed in the virtual volume management information 0308 of the management server 0102, this item is not included. The host ID 0907 is information showing the identifier of the host 0101, which uses the virtual volume 0509 specified in the virtual volume ID 0901.

The number of accesses to a virtual area 0502 is registered in the number of accesses 1005 in the virtual volume management information 0206 of the storage apparatus 0103. Alternatively, a value related to the number of accesses, which is used in the respective processing performed by the management server 0102, is recorded in the IOPS 0905 in the virtual volume management information 0308 of the management server 0102. For example, an average value of the number of virtual area accesses computed at the time of the previous process (the average value as of the previous process) is recorded in the IOPS 0905.

(4) Tier Performance History Information (FIG. 7)

FIG. 7 is a diagram showing an example of the configuration of the Tier performance history information 0309. A tier ID 0601 is an ID for uniquely identifying a tier. A response time 0602 stores an average value of I/O response times up until this time. The response time 0602 is information used for computing a host 0101 response time and a pool 0501 I/O response time using the reallocation plan formulation program 0304. The number of I/Os 0603 stores the total number of I/Os used in the computation of the response time 0602.

When a new I/O is executed, the performance history information is updated in accordance with Formula 1 below.

Post-update response time=(pre-update response time*number of I/Os+response time of newly executed I/O)/(number of I/O+1)   (Formula 1)

A post-update number of I/Os 0603 is a value obtained by adding 1 to the pre-update number of I/Os. That is, Formula 1 is used to manage one response time for each Tier instead of recording each response time for each I/O.

(5) Reallocation Plan Management Information (FIG. 9)

FIG. 9 is a diagram showing an example of the configuration of information 0304 for managing a reallocation plan. The reallocation plan management information 0310, for example, comprises a host ID 0801, which shows the identifier of the host 0101, a Tier 1 capacity 0802, which shows the capacity of a first tier capable of being used by the host 0101, and a Tier 2 capacity 0803, which shows the capacity of a second tier capable of being used by the host 0101.

A value computed by the reallocation plan formulation program 0304 is stored in the Tier 1 capacity 0802 and the Tier 2 capacity 0803. The Tier 1 capacity 0802 and the Tier 2 capacity 0803 are used in the reallocation instruction program 0305. The reallocation instruction program 0305 is executed to ensure that the allocation to each tier does not exceed the values established by the capacities 0802 and 0803.

Figure 15:
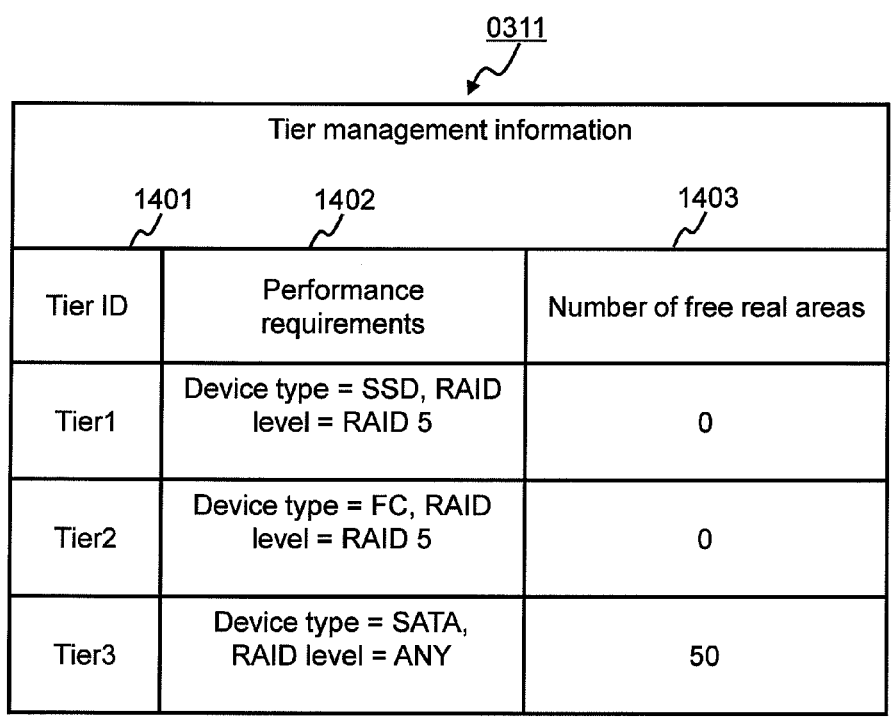
FIG. 15 is an example of the configuration of information for managing a Tier configuration in the first example.

(6) Tier Management Information (FIG. 15)

FIG. 15 is a diagram showing an example of the configuration of the Tier management information 0311 of the management server 0102. The Tier management information 0311 manages the performance requirement of a first tier (Tier 1) 0503, a second tier (Tier 2) 0504, and a third tier (Tier 3) 0505. The Tier management information 0311 can be updated in accordance with a request from the user (the system administrator).

The Tier management information 0311 comprises a tier ID 1401, a performance requirement 1402, and the number of free real areas 1403. The identifier of each tier is configured in the tier ID 1401. A value denoting the performance requirement of each tier is configured in the performance requirement 1402. A value denoting the total number of unallocated real areas from among the real areas of each tier is configured in the number of free real areas 1403.

The performance requirement 1402, for example, can be defined as a combination of the device type of the storage device 0209 and the RAID level of the RAID group 0210. In addition, the performance requirement may comprise another performance parameter, such as access speed.

Figure 8:
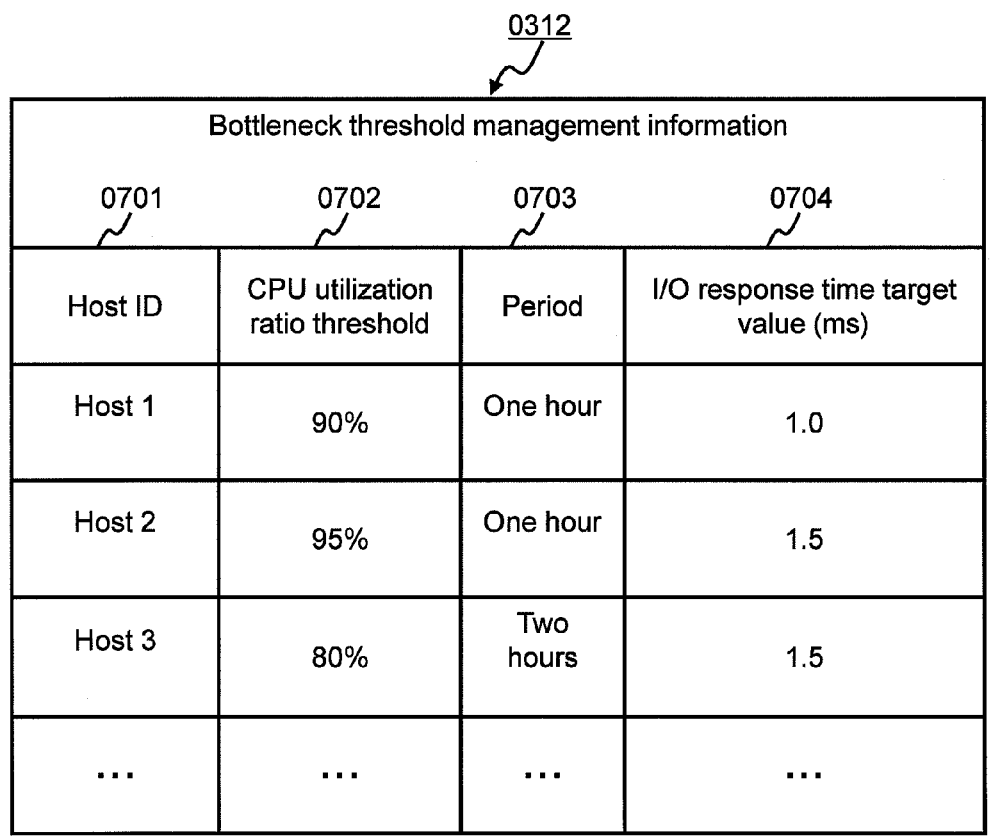
FIG. 8 is an example of the configuration of information for managing a host performance bottleneck threshold in the first example.

(7) Bottleneck Threshold Management Information (FIG. 8)

FIG. 8 is a diagram showing an example of the configuration of information 0312 for managing a host 0101 bottleneck threshold. For example, the host performance history management information 0313 comprises a host ID 0701 denoting the identifier of the host 0101, a host 0101 CPU utilization ratio threshold 0702, a host 0101 performance bottleneck condition period 0703, and a I/O response time target value 0704. The I/O response time target value 0704 is the target response time used when the host 0101 has a performance bottleneck.

The CPU utilization ratio threshold 0702 is a value used in the performance bottleneck determination program 0303 for determining a CPU bottleneck. For example, in a case where the CPU utilization ratio of the host 0101 specified in the host ID 0701 exceeds the CPU utilization ratio threshold 0702, and, in addition, the period during which the CPU utilization ratio threshold 0702 is exceeded is equal to or larger than the period specified in the period 0703, the host 0101 determines that there is a CPU bottleneck.

In FIG. 8, a performance bottleneck is stipulated from the CPU utilization ratio threshold 0702 and the period 0703. Instead, a performance bottleneck may be determined, for example, using another index, such as a network utilization ratio. Another index may also be used and a performance bottleneck may be determined by combining multiple indices.

The I/O response time target value 0704 is a target value for decreasing the I/O response time of a host 0101 for which there was determined to be a performance bottleneck. The reallocation plan formulation program 0304 determines the presence or absence of a performance bottleneck. The reallocation plan formulation program 0304 will be explained in detail further below.

The values of the respective items 0701 through 0704 of the bottleneck threshold management information 0312 are configured by the user via a host performance bottleneck setting screen 2700, which will be explained further below using FIG. 28.

(8) Host Performance History Management Information (FIG. 12)

FIG. 12 is a diagram showing an example of the configuration of information 0313 for managing the performance history of a host. For example, the host performance history management information 0313 comprises a host ID 1101, a CPU utilization ratio 1102, a performance information acquisition date/time 1103, and a bottleneck 1104.

The host ID 1101 is an identifier for uniquely identifying a host 0101. The CPU utilization ratio 1102 is information showing the CPU utilization ratio of a host 0101 at the performance information acquisition date/time 1103. The performance information acquisition date/time 1103 is information showing the date and time at which the host 0101 performance information was acquired. The bottleneck 1104 is information showing the component of the host 0101 in which the performance bottleneck is occurring.

Only the CPU utilization ratio 1102 is described in FIG. 12, but, for example, the bottleneck 1104 may be changed to another index for which a performance bottleneck is possible, such as the network utilization ratio. The configuration may also be such that multiple indices are used in combination.

The host performance history management information 0313 is updated by the management server 0102 when the management server 0102 receives host 0101 performance data. The host 0101 executes the host performance information notification program 0114 and regularly sends the host performance data to the management server 0102. The host, for example, can send the performance data to the management server every ten minutes.

Figure 16:
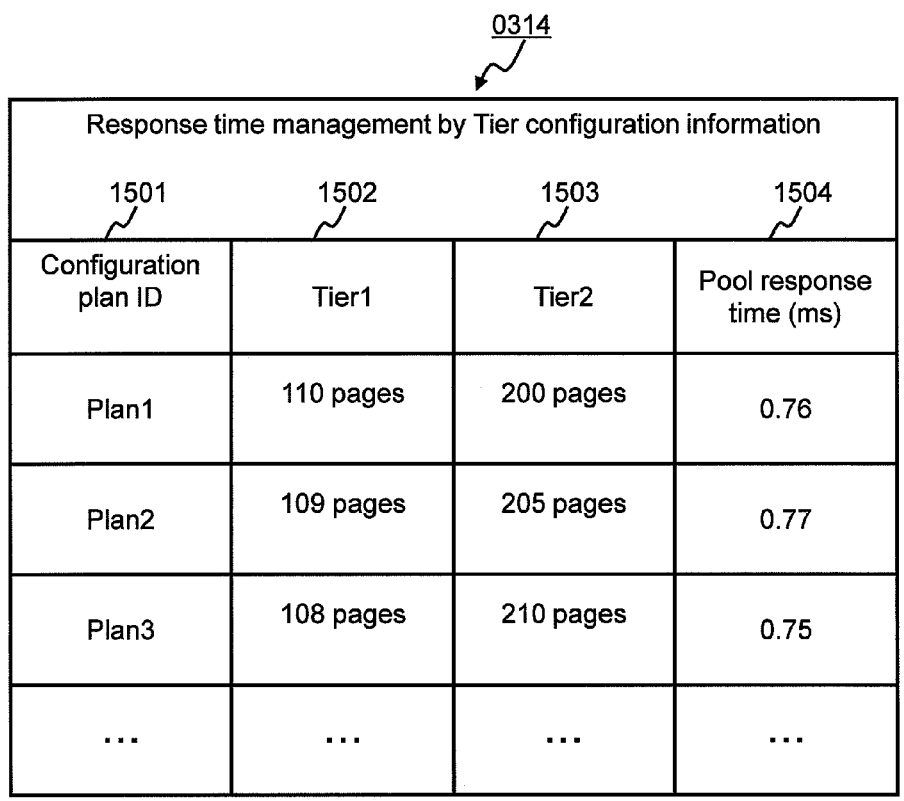
FIG. 16 is an example of the configuration of information for managing a response time by Tier configuration in the first example.

(9) Response Time Management by Tier Configuration Information (FIG. 16)

FIG. 16 is a diagram showing an example of the configuration of information 0314 for managing a response time by Tier configuration. The response time management by Tier configuration information 0314, for example, comprises a configuration plan ID 1501, a first tier (Tier 1) 1502, a second tier (Tier 2) 1503, and a pool response time 1504.

The configuration plan ID 1501 is an identifier for uniquely identifying a configuration plan, which is a combination of the Tier 1 1502 and the Tier 2 1503. The Tier 1 1502 and the Tier 2 1503 are information used by the reallocation plan formulation program 0304, and correspond to the Tier 1 capacity 0802 and the Tier 2 capacity 0803 of the reallocation plan management information 0310. The pool response time 1504 is information showing the response time of the pool 0501.

(10) Virtual Allocation Destination Management Information (FIG. 29)

FIG. 29 is a diagram showing an example of the configuration of information 0315 for managing a Tier allocation destination of a virtual area 0502. For example, the virtual allocation destination management information 0315 comprises a virtual area ID 3201 and a virtual allocation destination 3202.

The virtual area ID 3201 is an identifier for uniquely identifying a virtual area 0502. The virtual allocation destination 3202 registers information showing a data reallocation-destination tier determined by a virtual reallocation program 3300. One tier for providing a real area to be allocated to a virtual area in the virtual volume is decided in accordance with the virtual reallocation program 3300, which will be explained further below using FIG. 30. Identification information for identifying the decided tier is stored in a virtual reallocation destination 3202.

<Overview of Management Server 0102 Processing>

Figure 18:
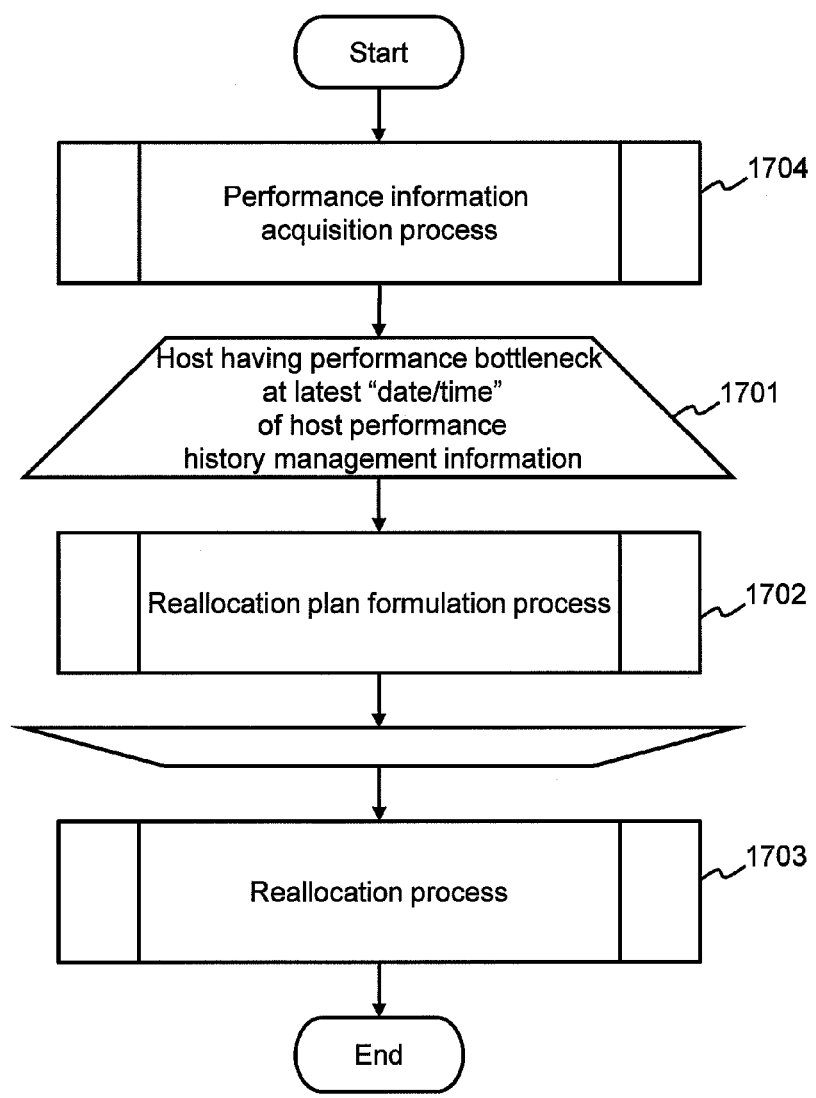
FIG. 18 is an example of a flowchart illustrating a process for creating a reallocation plan in the first example.

FIG. 18 is a flowchart for illustrating an overview of the processing executing by the management server 0102. In this processing, the management server 0102 executes the performance information acquisition program 0316, the reallocation plan formulation program 0304, and the reallocation instruction program 0305. The following explanation will be given using either the program or the management server 0102 as the doer of the processing.

The management server 0102 comprises the input information registration program 0301, the host performance history acquisition program 0302, and the performance bottleneck determination program 0303 for acquiring information to be inputted in the processing of FIG. 18.

The input information registration program 0301 is for acquiring a host bottleneck threshold from the user. The host performance history acquisition program 0302 is for acquiring performance information from the host. The performance bottleneck determination program 0303 is for determining a performance bottleneck in the host.

In Step 1704, the management server 0102 computes and stores the IOPS in the IOPS 0905 of the virtual volume management information 0308. Specifically, the management server 0102 acquires the number of accesses 1005 and the monitoring period 1006 of the virtual volume management information 0206 from the storage apparatus 0103 by way of the LAN 0105. The management server 0102 computes the IOPS from the number of accesses 1005 and the monitoring period 1006, and stores the IOPS in the IOPS 0905 of the virtual volume management information 0308.

In Step 1701, the management server 0102 selects a host in which a performance bottleneck is occurring as the host to be the target for the formulation of a reallocation plan (hereinafter, the target host). The target host is equivalent to the "prescribed host computer".

The management server 0102 selects a host to be the target of the execution of the reallocation plan formulation program 0304 based on the performance information acquired by regularly executing the host performance history acquisition program 0302 and the information of the performance bottleneck host determined by the performance bottleneck determination program 0303.

In Step 1702, the management server 0102 performs a Tier allocation simulation in accordance with the reallocation plan formulation program 0304. The management server 0102 finds a reallocation plan in which the target host I/O response time is slower than the I/O response time target value 0704 specified by the input information registration program 0301, and registers this reallocation plan in the reallocation plan management information 0310. In Step 1703, the management server 0102 executes the reallocation instruction program 0305 based on the reallocation plan management information 0310 found in Step 1702.

As described above, in the primary processing of the embodiment, the required prescribed information is collected from the respective apparatuses 0101 and 0103, and based on this information, the capacity of the high-level tier (Tier 1 and Tier 2) allocated to the host with the performance bottleneck is restricted. In addition, in the primary processing of the embodiment, a real area of the high-level tier, which has transitioned to unallocated status in accordance with the above-mentioned restriction, is allocated to another host in which a performance bottleneck is not occurring. Thus, the embodiment makes it possible to optimize the response time of an entire pool 0501 comprising multiple tiers of different performances.

In the future, the use of storage devices capable of high-speed I/O processing like the SSD (Solid State Drive) will expand, and as a result of this, bottlenecks with respect to applications are expected to switch to either CPU speeds or network communication speeds more than I/O processing speeds. The embodiment achieves an effect for performing a tier reallocation and optimizing a pool response time in conjunction with a CPU bottleneck.

(1) Performance Information Acquisition Program

Figure 23:
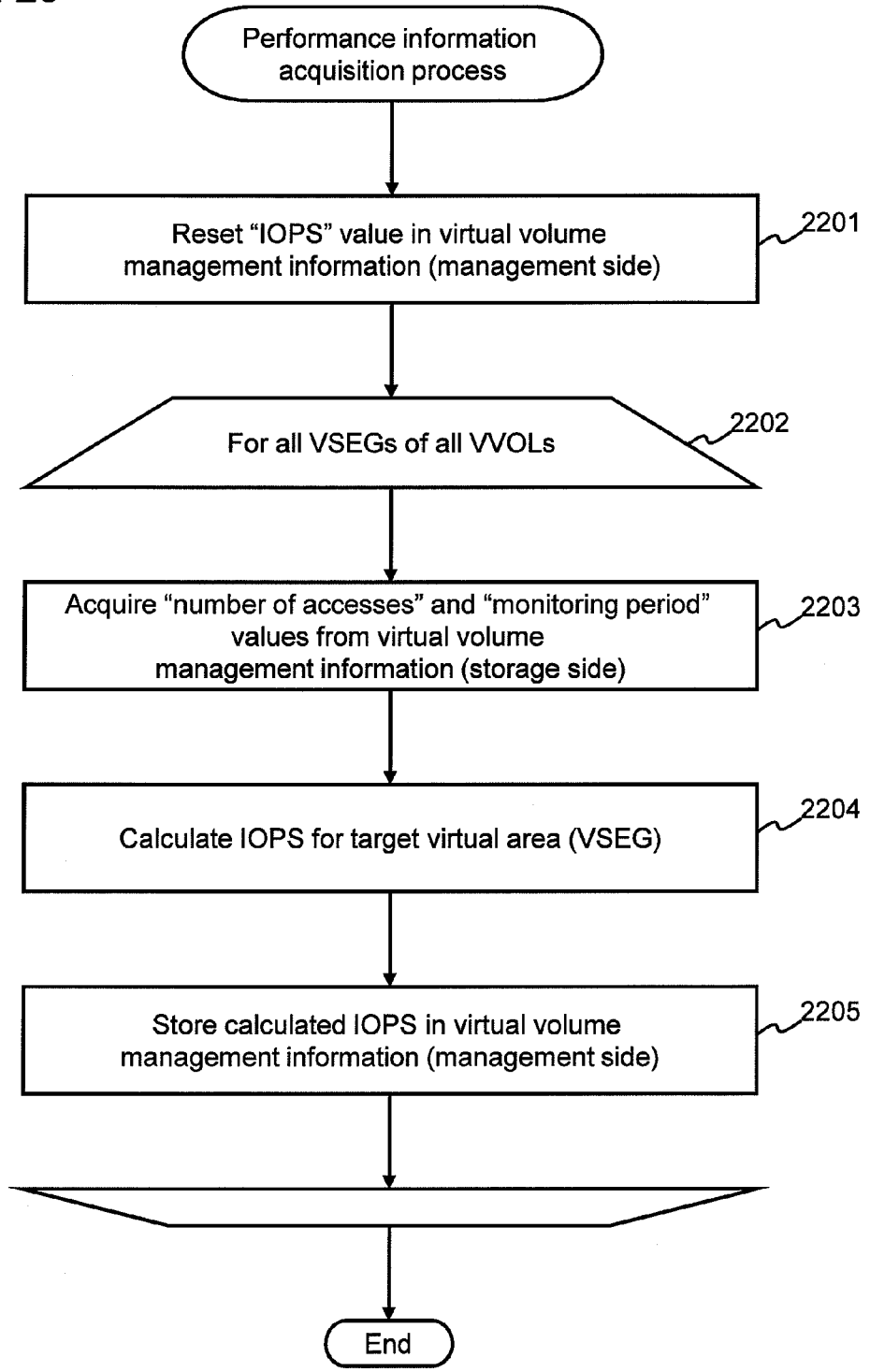
FIG. 23 is an example of a flowchart illustrating a process for acquiring virtual volume performance information in the first example.

FIG. 23 is an example of a flowchart for illustrating a process for the management server 0102 to acquire the performance information of a virtual volume (VVOL) 0509. The management server performance information acquisition program 0316, first of all, in Step 2201, performs processing for deleting the data of the IOPS 0905 of the virtual volume management information 0308.

Next, the management server 0102 (specifically, the performance information acquisition program 0316) repeats Steps 2203 through 2205 with respect to all the VSEGs 0502 of all the VVOLs 0509 (Step 2202).

In Step 2230, the management server 0102 acquires the number of accesses 1005 and the monitoring period 1006 of the virtual volume management information (storage side) 0206. In Step 2204, the management server 0102 computes the IOPS from the number of accesses 1005 and the monitoring period 1006. In Step 2205, the management server 0102 stores the IOPS computed in Step 2204 in the IOPS 0905 of the virtual volume management information (management side) 0308.

(2) Reallocation Plan Formulation Program

Figure 21:
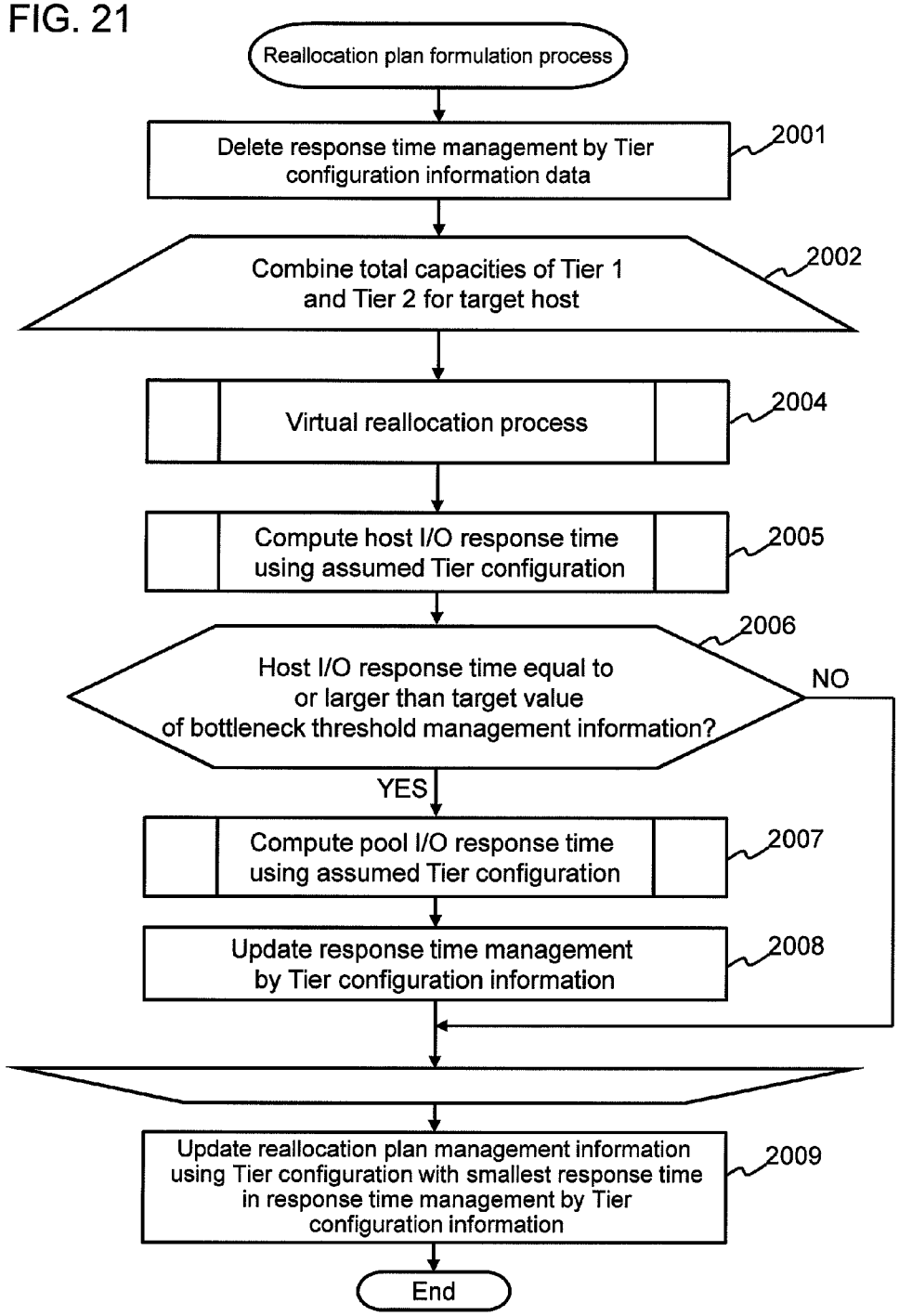
FIG. 21 is an example of a flowchart illustrating a process for formulating a reallocation plan in the first example.

FIG. 21 is an example of a flowchart for illustrating a process for the management server 0102 to formulate a reallocation plan. The reallocation plan formulation program 0304 is repeatedly executed in a loop that starts from Step 1701 of FIG. 18. In the explanation of the flowchart of the reallocation plan formulation program 0304 below, the host selected in Step 1701 of FIG. 18 will be called the target host.

The reallocation plan formulation program 0304 of the management server 0102 first of all, in Step 2001, deletes data in a response time management by Tier configuration table 0314 (refer to FIG. 16), and initializes the response time management by Tier configuration table 0314.

In Steps 2002 through 2008, the management server 0102 finds a prescribed Tier combination from among all the combinations of the number of SEGs belonging to each Tier with respect to the real area (SEG) 0506 allocated to the virtual area (VSEG) 0502 used by the target host.

The management server 0102 finds a Tier combination for which the target host response time is slower than the I/O response time target value 0704, and, in addition, the pool response time is the fastest from among all the combinations of the number of SEGs respectively belonging to Tier 1, Tier 2, and Tier 3.

All of the processing of Steps 2002 through 2008 is executed as a simulation. The Tier allocation of the virtual volume 0509 of the storage apparatus 0103 does not actually change at the point in time when the reallocation plan is created. Each step will be explained in detail below.

The management server 0102 repeatedly executes Steps 2004 through 2008 with respect to one combination of the combinations of the respective Tier capacities created in Step 2002. The process for creating a combination of the Tier capacities may be any process capable of creating a combination of the Tier 1 allocation size 1502 and the Tier 2 allocation size 1503, in which the target host I/O response time is equal to or larger than the I/O response time target value 0704, and, in addition, the pool response time is the smallest.

For example, it may be a process, which sequentially creates all the combinations of Tier 1, Tier 2, and Tier 3 such that the total number of SEGs 0506 allocated to the target host matches the total number of pages of the respective Tier 1, Tier 2, and Tier 3. The combination in which the target host I/O response time is equal to or larger than the I/O response time target value 0704, and, in addition, the pool response time 1504 is the smallest may be selected from among all of the possible combinations thereof.

In Step 2004, the management server 0102 implements the virtual reallocation program 3300 based on the Tier 1 capacity and the Tier 2 capacity specified in Step 2002, and the IOPS 0905 of the virtual volume management information 0308.

Figure 30:
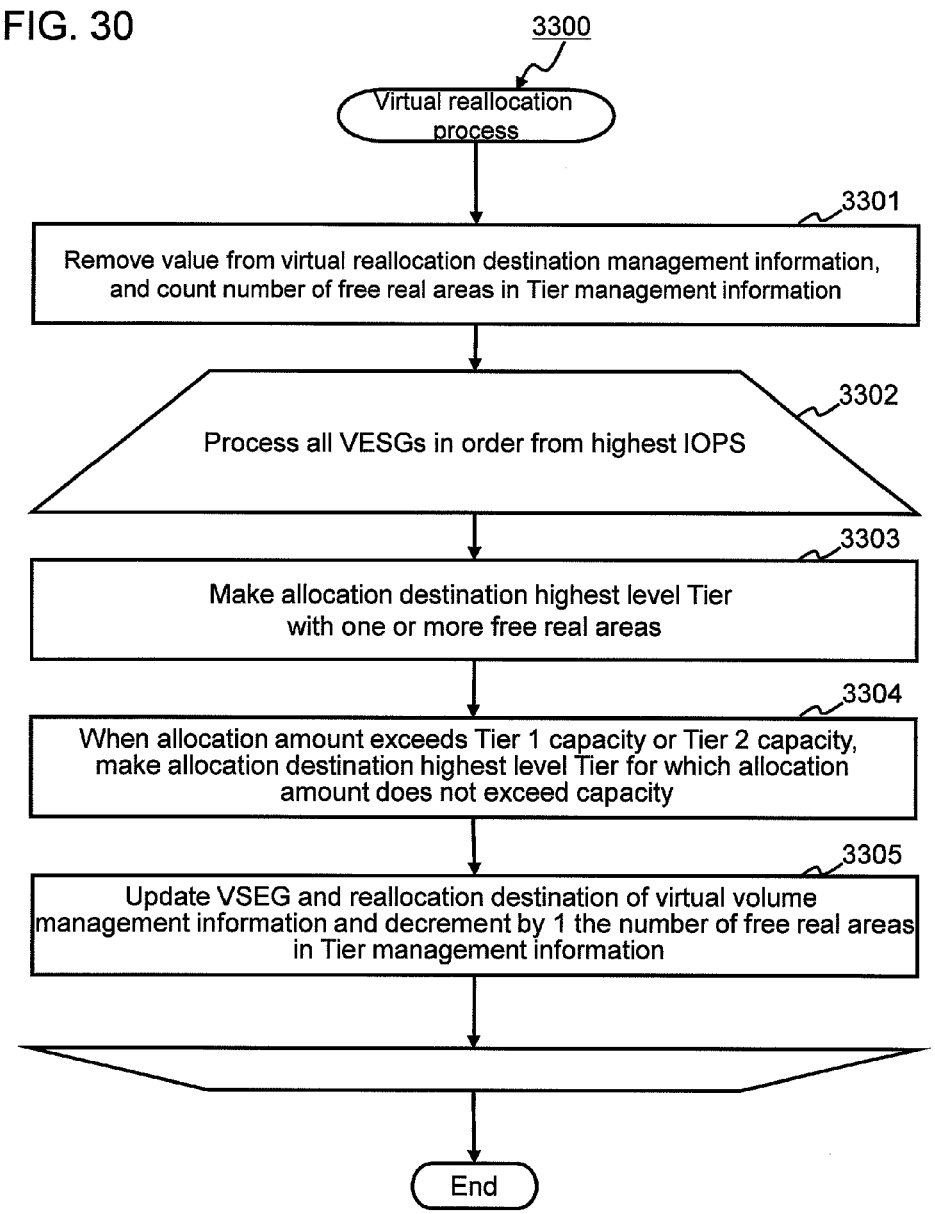
FIG. 30 is an example of a flowchart for illustrating a virtual reallocation program of the reallocation plan formulation process in the first example.

FIG. 30 is an example of a flowchart illustrating the virtual reallocation program 3300. The virtual reallocation program 3300 is processing for deciding a Tier to be allocated to a VSEG 0502. FIG. 30 will be explained in detail further below.

The virtual reallocation program 3300 virtually allocates a high-level Tier to VSEGs 0502 in order from the VSEG 0502 with a large IOPS 0905 value in the virtual volume management information 0308. The Tier to be allocated is any one of Tier 1 0503, Tier 2 0504, or Tier 3 0505. The virtual reallocation program 3300 virtually allocates Tier 1, Tier 2, and Tier 3, in that order, to a VSEG 0502, and stores the allocation result in the virtual allocation destination management information 0315 (refer to FIG. 29).

The virtual reallocation program 3300 ensures that the capacity of the Tier 1 allocated to the target host does not exceed the maximum value of the Tier 1 specified in Step 2002. Similarly, the virtual reallocation program 3300 ensures that the capacity of the Tier 2 allocated to the target host does not exceed the maximum value of the Tier 2 specified in Step 2002.

The virtual reallocation program 3300 performs processing similar to that of the reallocation instruction program 0305, which will be explained further below. The locations in which the virtual reallocation program 3300 and the reallocation instruction program 0305 store the allocation destination, which is the computation result, differ. The reallocation instruction program 0305 stores the allocation destination in the virtual volume management information (management side) 0308. Alternatively, the virtual reallocation program 3300 stores the allocation destination in the virtual allocation destination management information 0315.

In Step 2005, the management server 0102 reallocation plan formulation program 0304 computes the target host I/O response time in accordance with a I/O response time computation program 2100.

Figure 22:
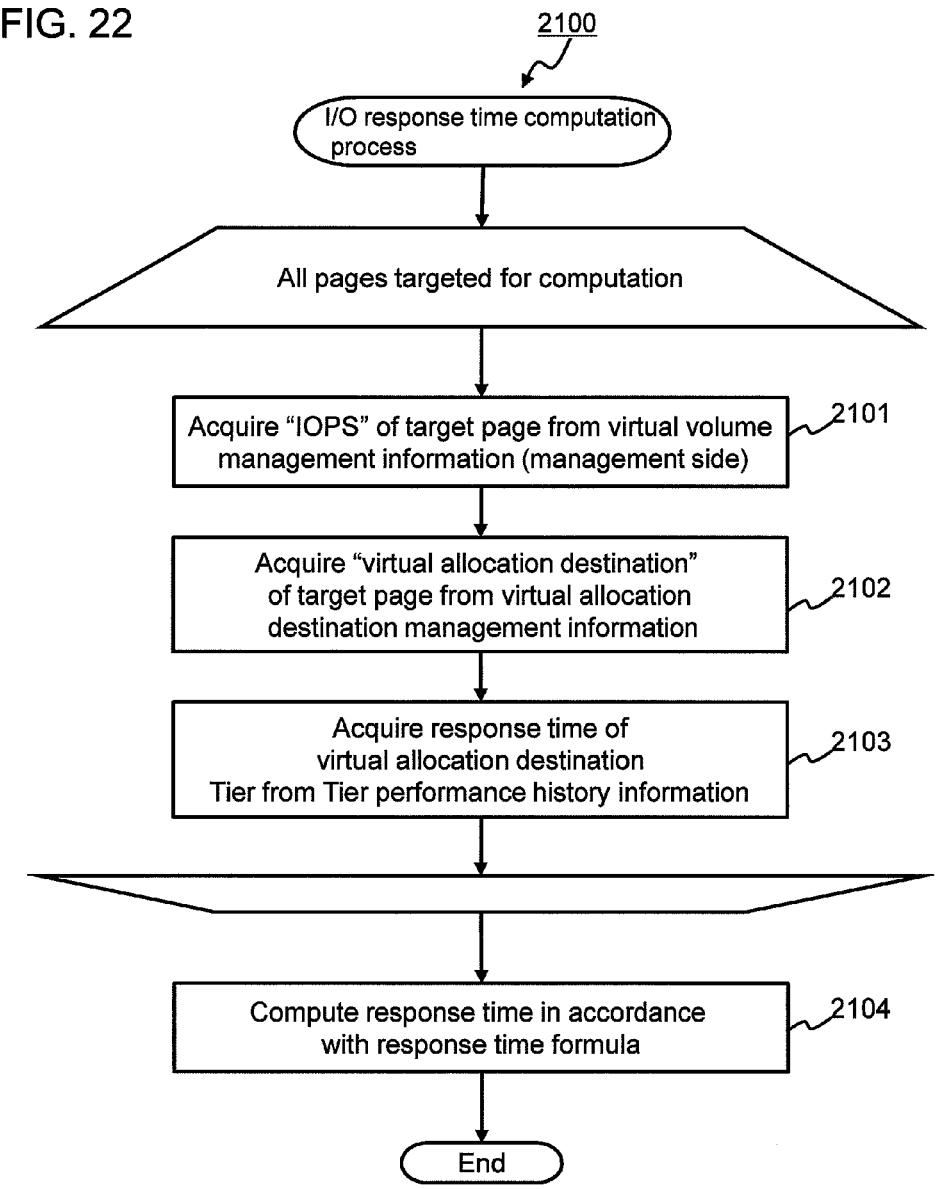
FIG. 22 is an example of a flowchart illustrating a process for computing an I/O response time in the first example.

FIG. 22 is an example of a flowchart for illustrating an I/O response time computation process. The I/O response time computation program 2100 executes the following Steps 2101 through 2103 for all computation-target pages.

The I/O response time computation program 2100 acquires the IOPS 0905 from the virtual volume management information 0308 (Step 2101), and next, acquires the virtual allocation destination 3202 from the virtual allocation destination management information 0315 (Step 2102). In addition, the I/O response time computation program 2100 acquires the response time 0602 from the Tier performance history information 0309 (Step 2103).

The I/O response time computation program 2100 computes the I/O response time based on Formula 2 below (Step 2104).

$$\text{I/O response time} = \Sigma\{\text{computation-target page}\} \\ (\text{IOPS} \ast \text{page-allocated Tier response time})/(\text{sum of IOPS of all computation-target pages}) \quad \text{(Formula 2)}$$

Here, the $\Sigma\{X\}(Y)$ of the above-mentioned Formula 2 performs the computation of Y for each element of X and shows the sum thereof.

The target host I/O response time can be found by computing the computation-target page in Formula 2 as the virtual area 0502 of the virtual volume 0509 allocated to the host. The pool I/O response time is found by computing the computation-target page in Formula 2 as the virtual areas 0502 of all the virtual volumes 0509 of the pool 0501.

In Step 2006, the management server 0102 reallocation plan formulation program 0304 determines whether or not the target host I/O response time computed in Step 2005 is equal to or larger than the I/O response time target value 0704 of the bottleneck threshold management table 0312.

In a case where the target host I/O response time is equal to or larger than the target value 0704 (Step 2006: YES), the management server 0102 computes the response time of the pool in Step 2007. The management server 0102 adds the current Tier configuration and pool response time to the response time management by Tier configuration information 0314 in Step 2008.

The management server 0102 repeats Steps 2004 through 2008, covers the Tier combination for which the host I/O response time is equal to or larger than the I/O response time target value 0704, and stores this Tier combination in the response time management by Tier configuration information 0314.

Lastly, in Step 2009, the management server 0102 retrieves the high-level Tier combination (Tier 1 1502 and Tier 2 1503) for which the pool response time 1504 is the smallest from the response time management by Tier configuration information 0314, and updates the data in which the host ID 0801 in the reallocation plan management information 0310 is the target host.

The management server 0102 stores the value of the Tier 1 1502 in the Tier 1 capacity 0802, and stores the value of the Tier 2 1503 in the Tier 2 capacity 0803.

(3) Reallocation Instruction Program

Figure 24:
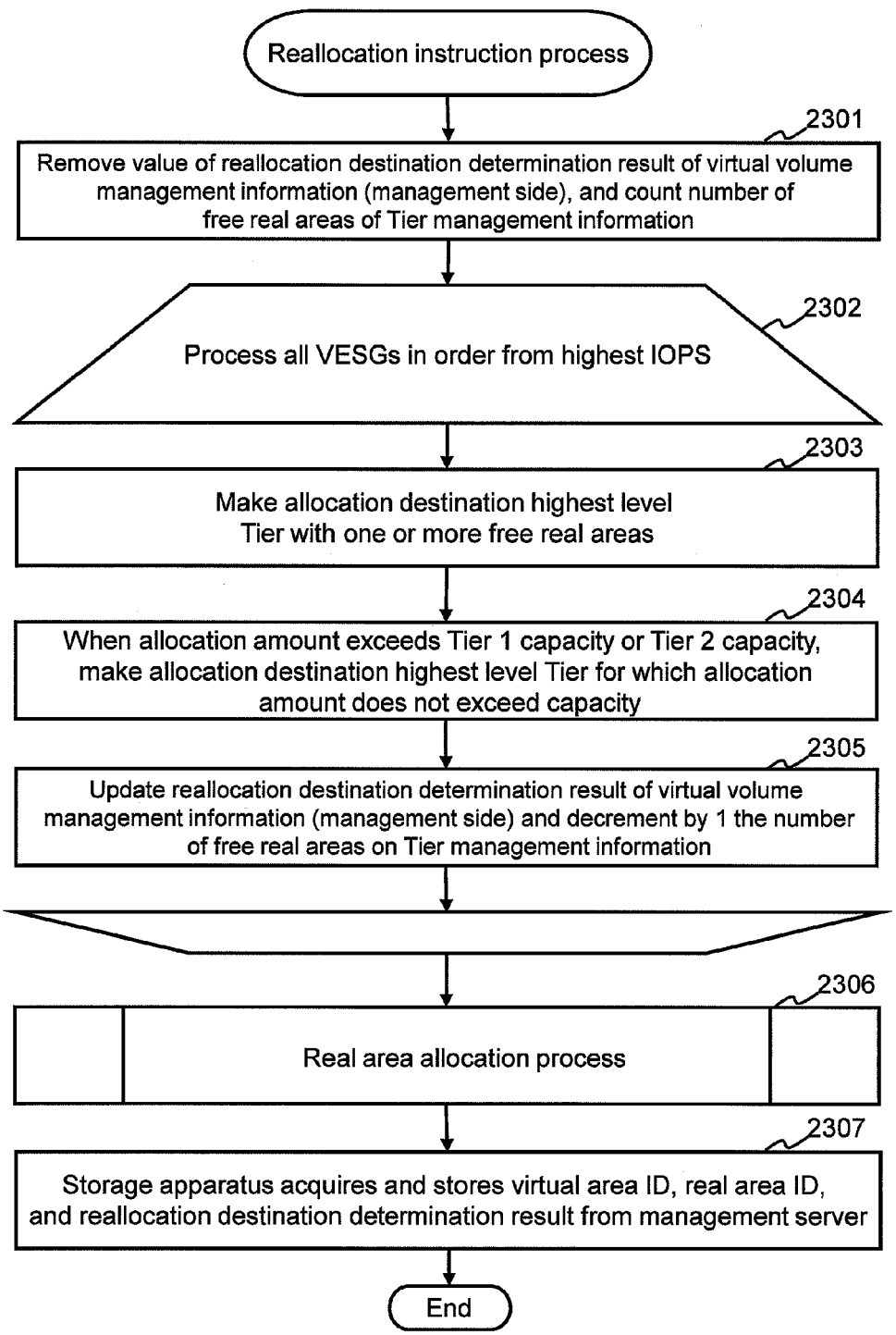
FIG. 24 is an example of a flowchart for illustrating a reallocation instruction process in the first example.

FIG. 24 is an example of a flowchart illustrating the reallocation instruction program 0305. The reallocation instruction program 0305 sends the allocation result decided by the management server 0102 (which VSEG is allocated to which Tier) to the storage apparatus 0103, and has the storage apparatus 0103 execute a reallocation process.

The storage apparatus 0103 allocates the VSEG 0502 to the SEG 0506 based on the allocation result decided by the management server 0102.

The reallocation instruction program 0305 allocates VSEGs 0502 to a Tier in order beginning with the VSEG 0502 having a large IOPS 0905 value in the virtual volume management information 0308. The Tier is any one of Tier 1 0503, Tier 2 0504, and Tier 3 0505. The management server 0102 decides the Tier to be allocated to the VSEG 0502 in the order of Tier 1, Tier 2, and Tier 3.

The reallocation instruction program 0305, in a case where the Tier 1 capacity 0802 and the Tier 2 capacity 0803 of the reallocation plan management information 0310 have been specified, on the basis of these specified values, ensures that the Tier 1 capacity and the Tier 2 capacity allocated to the host do not exceed these specified values.

In Step 2301, the management server 0102 reallocation instruction program 0305 deletes the value of the reallocation destination determination result 0906 in the virtual volume management information 0308. Then, the management server 0102 counts the total number of SEGs of each Tier from the RAID group management information 0306, the management server 0102 real area management information 0307, and the Tier management information 0311 (Step 2301). The management server 0102 stores the count value in the number of free real areas 1403 of the Tier management information 0311 (Step 2301). When counting, the data for which the allocation status 1603 is "allocated" is also counted.

The reallocation instruction program 0305 executes Steps 2303 through 2305 in order from the VSEG having a large IOPS 0905 value in the virtual volume management information 0308 (Step 2302).

In Step 2303, for example, the reallocation instruction program 0305 acquires the corresponding relationship between the VSEG 0502 and the host 0101 from the virtual area ID 0902 and the host ID 0907 of the virtual volume management information 0308. Hereinafter, the host in the corresponding relationship will be called the target host. Then, the management server 0102 uses the Tier management information 0311 to select the highest level Tier, for which the number of free real areas 1403 is equal to or larger than 1, as the allocation destination (Step 2303).

In Step 2304, the management server 0102 references the virtual volume management information 0308 in a case where the Tier 1 capacity 0802 of the reallocation plan management information 0310 is specified with respect to the target host to check that the target host Tier 1 allocation amount does not exceed the Tier 1 capacity 0802. In a case where the target host Tier 1 allocation amount exceeds the Tier 1 capacity 0802, the management server 0102 changes the VSEG allocation destination from Tier 1 to Tier 2, which is the next lower tier.

Similarly, in a case where the Tier 2 capacity 0803 of the reallocation plan management information 0310 is specified, the management server 0102 references the virtual volume management information 0308 to check that the target host Tier 2 allocation amount does not exceed the Tier 2 capacity 0803. In a case where the target host Tier 2 allocation amount exceeds the Tier 2 capacity 0803, the management server 0102 changes the VSEG allocation destination from Tier 2 to Tier 3, which is the next lower tier.

In Step 2305, the management server 0102 updates the value of the reallocation destination determination result 0906 to the allocation-destination Tier, and decrements by 1 the value of the number of free real areas 1403 of the allocation-destination Tier.

In Step 2306, the storage apparatus 0103 executes the data reallocation program 0203 on the basis of the reallocation destination determination result 1007 of the virtual volume management information 0206.

Figure 31:
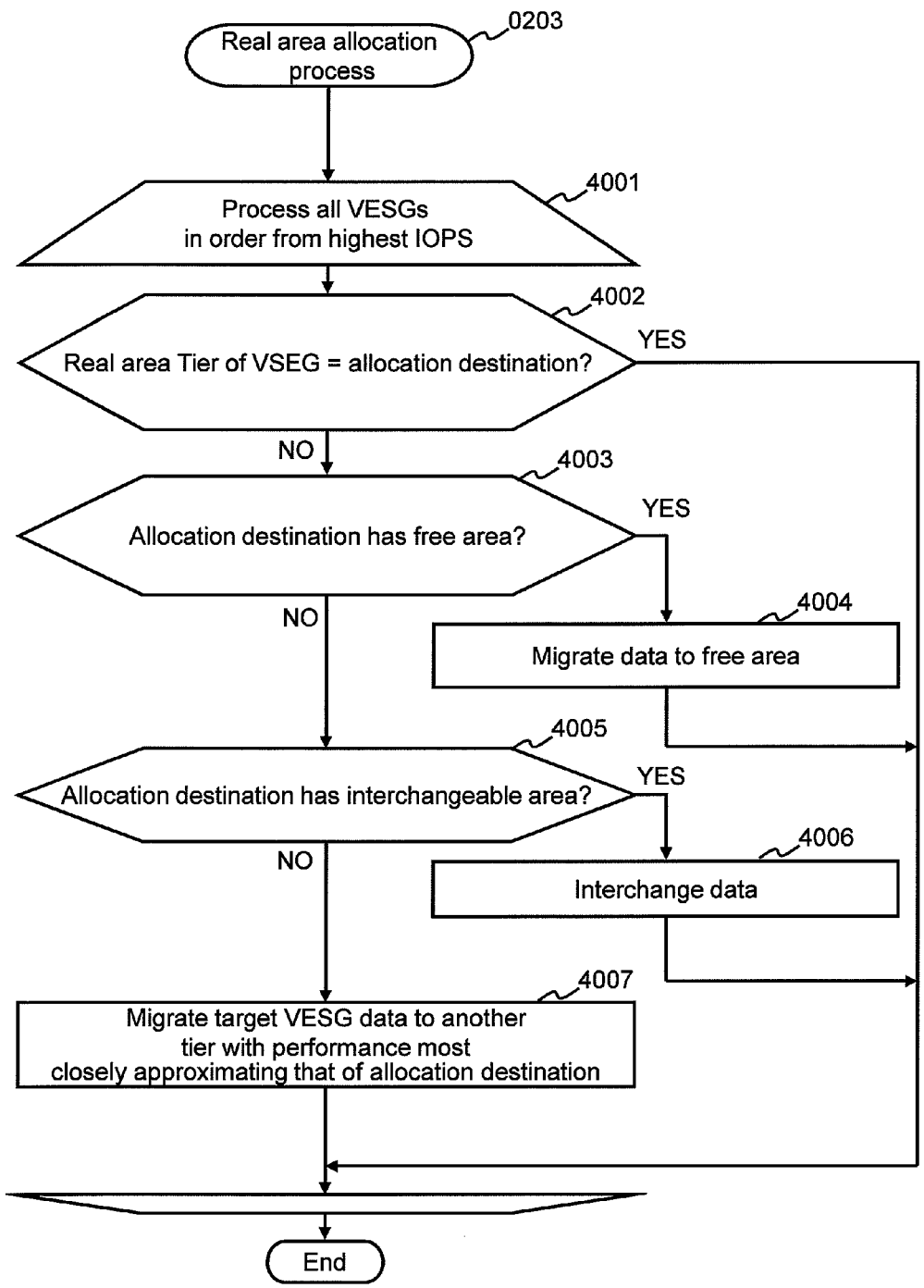
FIG. 31 is an example of a flowchart for illustrating a real area allocation process in the first example.

FIG. 31 is an example of a flowchart for illustrating the real area allocation process shown as Step 2306 in FIG. 24. The reallocation instruction program 0305 executes the following Steps 4002 through 4007 for all the VSEGs 0502 in descending order from the highest IOPS (Step 4001).

Hereinafter, the execution-target VSEG will be called the target VSEG. Also, the reallocation destination determination result 0906 of the target VSEG will be called the allocation destination.

In Step 4002, the management server 0102 acquires the Tier allocated to the target VSEG from the RAID group management information 0306, the management server 0102 real area management information 0307, and the Tier management information 0311.

The management server 0102 checks whether or not the Tier allocated to the target VSEG matches the allocation-destination Tier (Step 4002). In a case where the two match (Step 4002: YES), the management server 0102 targets the next VSEG for processing. In a case where the two do not match (Step 4002: NO), the management server 0102 executes Step 4003.

In Step 4003, the management server 0102 checks the RAID group management information 0306, the real area management information 0307, and the Tier management information 0311 to see whether an unallocated SEG 0506 exists in the Tier specified as the allocation destination.

In a case where an unallocated SEG 0506 exists (Step 4003: YES), the management server 0102, in Step 4004, selects one SEG from among the unallocated SEGs, and migrates the data of the SEG (migration source), which is allocated to the target VSEG 0502, to the selected SEG (migration destination).

In order to change the allocation destination of the data, the reallocation instruction program 0305 instructs the storage apparatus 0103 to migrate the data from the migration-source SEG to the migration-destination SEG. The storage control program 0134 of the storage apparatus 0103, upon receiving the instruction from the reallocation instruction program 0305, migrates the data from the migration-source SEG 0506 to the migration-destination SEG 0506.

In a case where there are no unallocated SEGs 0506 (Step 4003: NO), the management server 0102 executes Step 4005. In Step 4005, the management server 0102 determines from the RAID group management information 0306, the real area management information 0307, and the Tier management information 0311 whether or not an interchangeable real area (SEG) exists in the allocation-destination Tier.

Specifically, the management server 0102 determines whether or not there is a SEG for which the reallocation destination determination result 0906 corresponding to the VSEG to which a SEG is allocated from among the allocated SEGs in the Tier specified as the allocation destination, matches the Tier of the SEG specified in the real area ID 0904.

For example, the management server 0102, in a case where the VSEG 0502 is migrated from Tier 2 to Tier 1, determines whether or not a VSEG 0502, which is scheduled to be migrated to Tier 2, exists among the VSEGs 0502 corresponding to the allocated SEGs 0506 of Tier 1.

In a case where an interchangeable area exists in the allocation-destination Tier (Step 4005: YES), the management server 0102 executes Step 4006.

In a case where an interchangeable area does not exist (Step 4005: NO), the management server 0102, in Step 4007, selects an unallocated SEG in another Tier having performance that most closely approximates that of the allocation-destination Tier (Step 4007). The management server 0102 migrates the data of the SEG allocated to the target VSEG to the unallocated SEG in the performance-approximating Tier. The specific method for migrating the data is the same as that described for Step 4004.

In Step 4006, reallocation instruction program 0305 of the management server 0102 instructs the storage control program 0134 of the storage apparatus 0103 to interchange the data of the SEG of the interchangeable VSEG with that of the SEG of the target VSEG. The storage control program 0134, upon receiving the instruction from the reallocation instruction program 0305, interchanges the data between the specified real areas.

In Step 4004, Step 4006, and Step 4007, the management server 0102 updates the allocation status 1603 of the data migration-destination SEG 0506 to "allocated" subsequent to either a data migration or a data interchange.

In addition, the management server 0102 updates the real area ID 0904 of the virtual volume management information 0308 with respect to the selected SEG 0506. In Steps 4004 and 4007, the management server 0102 updates the allocation status 1603 of the data migration-source SEG 0506 to "unallocated".

Lastly, in Step 2307 of FIG. 24, the storage apparatus 0103 acquires the virtual area ID 0902, the real area ID 0904, and the reallocation destination determination result 0906 from the management server 0102. The storage apparatus 0103 stores the real area ID 1004 and the reallocation destination determination result 1007 in the data for which the virtual area ID 1002 of the virtual volume management information 0206 is associated with the virtual area ID 0902 (Step 2307).

(4) Input Information Registration Program

Figure 27:
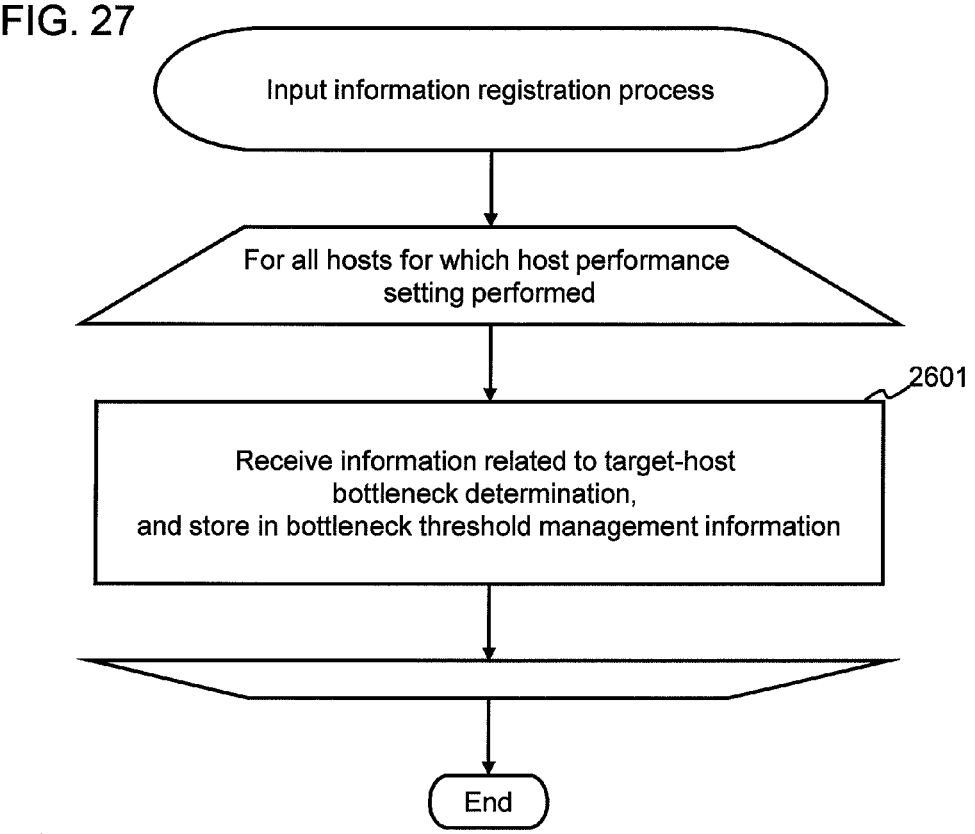
FIG. 27 is an example of a flowchart for illustrating a process for registering input information in the first example.

FIG. 27 is an example of a flowchart showing the input information registration program 0301. The input information registration program 0301 performs processing for storing information, which the user has inputted from the host performance bottleneck setting screen 2700 (refer to FIG. 28), to the bottleneck threshold management information 0312.

Figure 28:
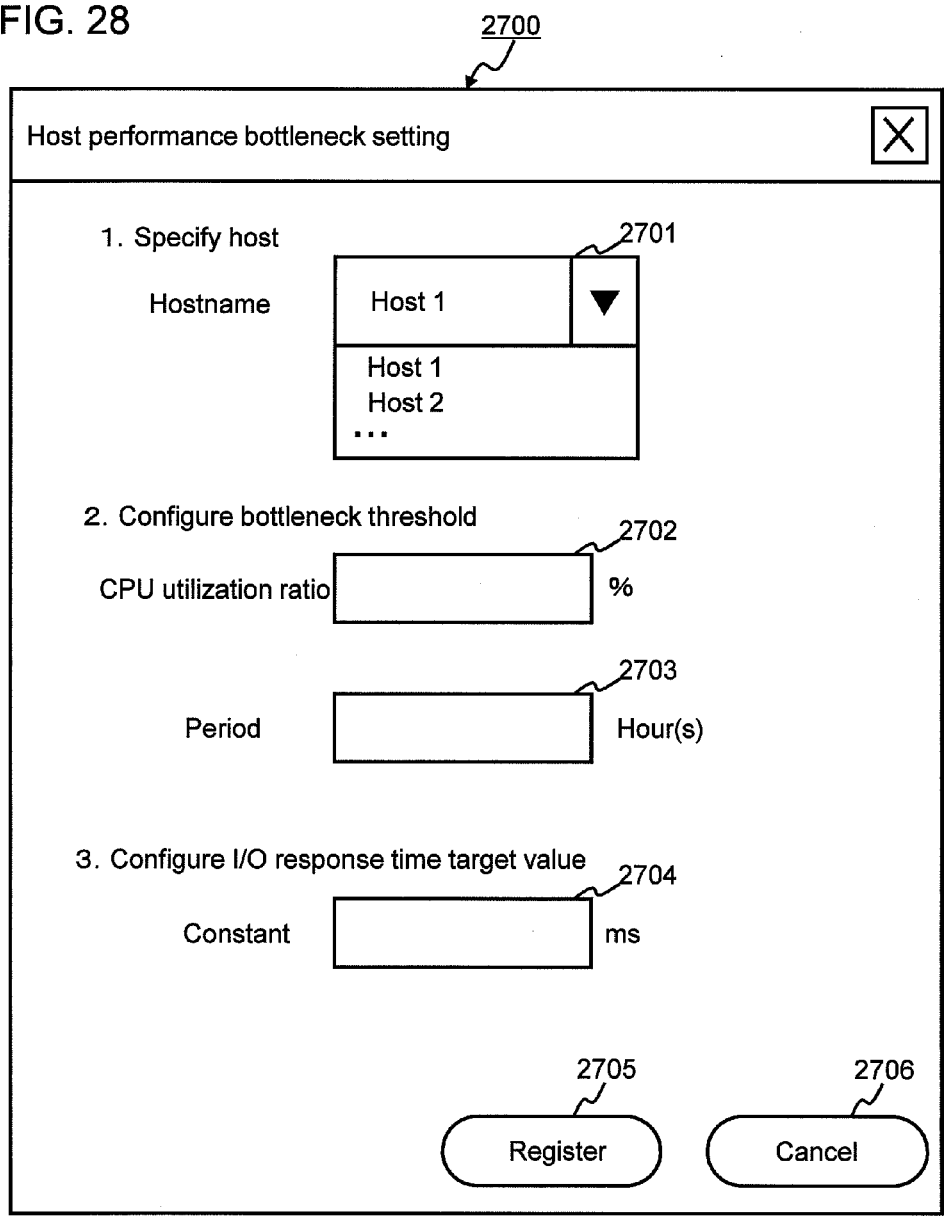
FIG. 28 is an example of a screen for configuring a threshold for a host performance bottleneck in the first example.

The screen 2700 of FIG. 28 is used by the user to configure a value related to a host performance bottleneck. The screen 2700, for example, comprises a hostname input part 2701 specifying a host, a bottleneck threshold input part 2702 specifying a bottleneck threshold, a bottleneck generation period input part 2703 specifying the period during which the bottleneck occurred, and a constant input part 2704 for inputting a constant. To configure the input contents, the user presses a register button 2705. To cancel the input contents, the user presses a cancel button 2706.

The input information registration program 0301 of the management server 0102 stores the information inputted by the user in input parts 2701 through 2704 in the bottleneck threshold management table 0312 in Step 2601.

That is, the CPU utilization ratio threshold 0702, the period 0703, and the I/O response time target value 0704 of the hostname 2701-specified host ID 0701 in the bottleneck threshold management table 0312 are respectively updated to the CPU utilization ratio 2702, the period 2703, and the I/O response time target value 2704 inputted by the user.

(5) Host Performance History Acquisition Program

Figure 19:
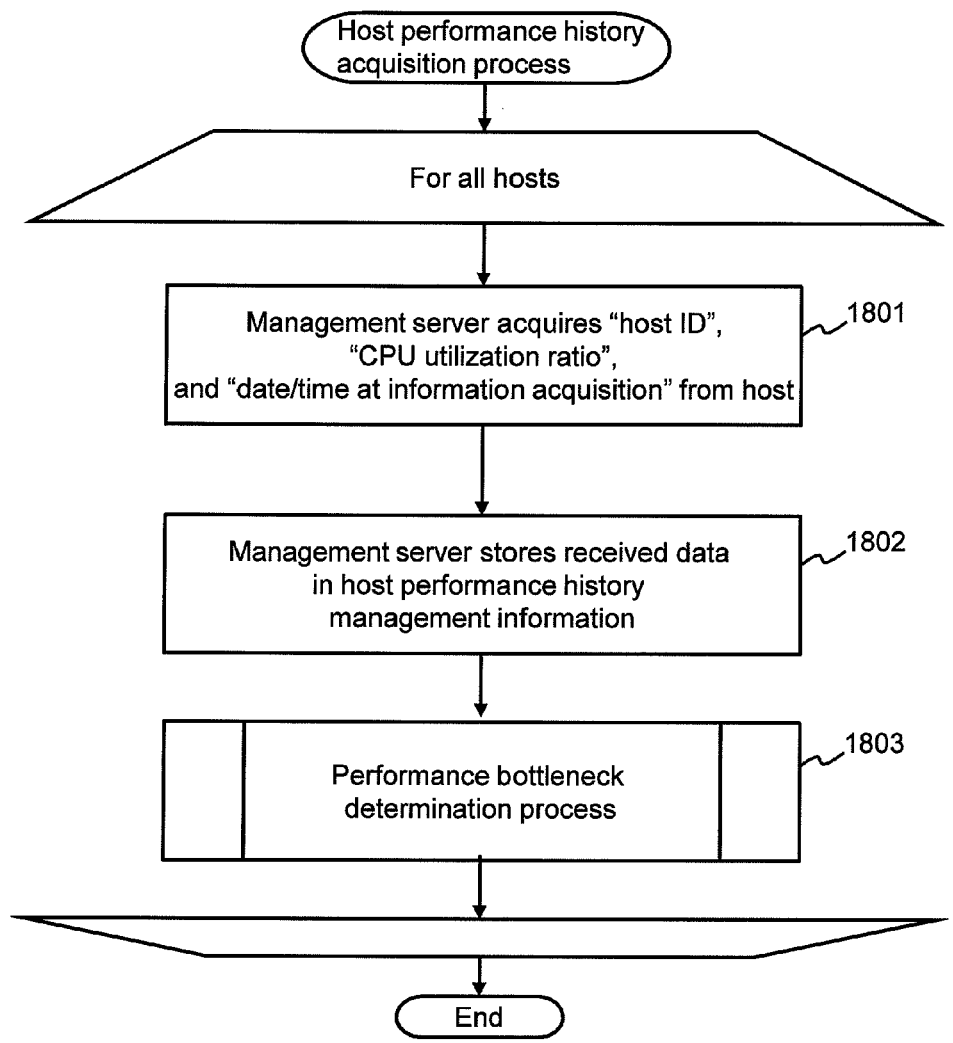
FIG. 19 is an example of a flowchart illustrating a process for acquiring a host performance history in the first example.

FIG. 19 is an example of a flowchart for illustrating the host performance history acquisition program 0302. The host performance history acquisition program 0302 performs processing for acquiring performance information from all the hosts, determining the presence or absence of a performance bottleneck, and updating the host performance history management information 0313.

In Step 1801, the host performance history acquisition program 0302 of the management server 0102 acquires a host ID, a CPU utilization ratio, and an information acquisition date/time of the host 0101 from the host performance information notification program 0114 of the host. In Step 1802, the management server 0102 registers the host ID, CPU utilization ratio, and information acquisition date/time acquired in Step 1801 in the host ID 1101, CPU utilization ratio 1102, and information acquisition date/time 1103 of the host performance history management information 0313.

In Step 1803, the management server 0102 executes a process for determining a performance bottleneck, and in a case where a performance bottleneck exists, updates the bottleneck 1104 of the host performance threshold management information 0313.

In Step 1801 of FIG. 19, only the CPU utilization ratio is described as the performance information acquired from the host, but other information capable of becoming a performance bottleneck, such as a network utilization ratio, for example, may be used instead. Also, the configuration may be such that a performance bottleneck is determined by combining multiple pieces of information. The items of the host performance history management information 0313 change in accordance with the information acquired in Step 1801.

(6) Performance Bottleneck Determination Program

Figure 20:
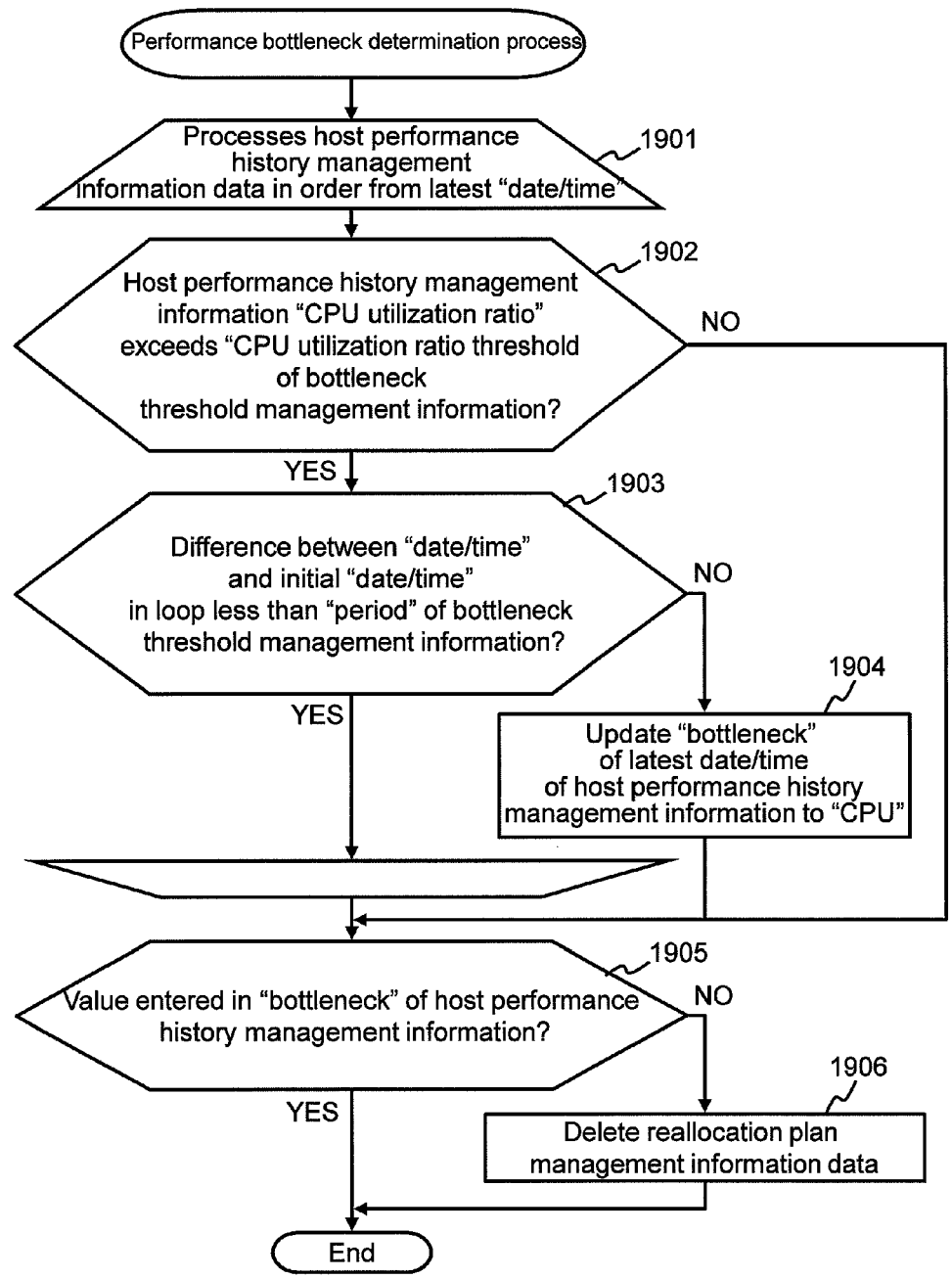
FIG. 20 is an example of a flowchart illustrating a process for determining a performance bottleneck in the first example.

FIG. 20 is an example of a flowchart for illustrating the performance bottleneck determination program 0303. The performance bottleneck determination program 0303 is invoked by specifying a processing-target host from the host performance history acquisition program 0302. Hereinafter, this host will be called the target host.

The performance bottleneck determination program 0303 determines the presence or absence of a target-host performance bottleneck based on the bottleneck threshold management information 0312 and the host performance history management information 0313, and updates the bottleneck 1104 of the host performance history management information 0313.

In Step 1901, the performance bottleneck determination program 0303 of the management server 0102 executes Steps 1902 through 1904 in order from the latest information acquisition date/time 1103 in the data for which the host ID 1101 of the host performance history management information 0313 matches the target host.

In Step 1902, the management server 0102 determines whether or not the CPU utilization ratio 1102 of the host performance history management information 0313 exceeds the CPU utilization ratio 0702 of the bottleneck threshold management information 0312. In a case where the CPU utilization ratio 1102 exceeds the CPU utilization ratio 0702 (Step 1902: YES), the management server 0102 moves to Step 1903. In a case where the CPU utilization ratio 1102 does not exceed the CPU utilization ratio 0702 (Step 1902: NO), the management server 0102 moves to Step 1905.

In Step 1903, the management server 0102 determines whether or not the target host is a performance bottleneck for equal to or longer than the period 0703. The performance bottleneck period is from a new information acquisition date/time 1103 of the host performance history management information 0313 until the information acquisition date/time 1103 of the host performance history management information 0313 seen in accordance with repeated processing.

In a case where the CPU utilization ratio 1102 exceeds the CPU utilization ratio 0702 for equal to or longer than the period 0703 (Step 1903: NO), the management server 0102 determines that the CPU is the performance bottleneck. The management server 0102, in Step 1904, updates the bottleneck 1104 at the new information acquisition date/time 1103 of the host performance history management information 0313 to "CPU" in the data for which the host ID 1101 matches the target host.

In Step 1905, the management server 0102 determines whether or not a performance information bottleneck has occurred in the target host in accordance with the presence or absence of a value stored in the bottleneck 1104 of the host performance history management information 0313.

In a case where a value is stored in the bottleneck 1104 (Step 1905: YES), this processing ends. In a case where a value is not stored in the bottleneck 1104 (Step 1905: NO), the management server 0102 moves to Step 1906.

In Step 1906, the management server 0102 deletes the value of the Tier 1 capacity 0802 and the value of the Tier 2 capacity 0803 of the data for which the target host and the host ID match in the data of the reallocation plan management information 0310. Deleting the values of the Tier 1 capacity 0802 and the Tier 2 capacity 0803 does away with the capacity restrictions of the target host in Step 2304 of the reallocation instruction process shown in FIG. 24.

According to this example, restrictions are placed on the high-level Tier allocation amount to a virtual volume used by a host in which a performance bottleneck has occurred, and a high-level Tier real area is allocated to a virtual volume used by another host in which a performance bottleneck has not occurred. Therefore, a real area of the high-level Tier can be used more efficiently, making it possible to enhance the response time of the pool as a whole.

Example 2

A second example will be explained by referring to FIGS. 32 through 34. Each of the following examples, to include this example, is equivalent to a variation of the first example. Consequently, the following explanations will focus of a configuration(s), which differs from the already explained configuration.

In the reallocation plan formulation program 0304 of the first example, the user (for example, the storage administrator) manually selects a configuration plan. In the first example, a reallocation simulation is performed in accordance with the reallocation plan formulation program 0304, and only the response time of the post-reallocation pool is evaluated.

Alternatively, in this example, for example, the user selects the appropriate configuration plan by checking the response time of each host subsequent to reallocation. This, for example, makes it possible to reflect the user's will, such as the priority of a host or a host performance requirement, in the Tier configuration plan.

For example, the user can select a configuration plan, which significantly enhances the performance of a high-priority host more than a low-priority host. As a result, in this example, it is possible to optimize the response time of a host by taking into account the host priority.

In this example, Step 2009 of the reallocation plan formulation program 0304 in the first example changes, and the user selects a configuration plan (reallocation plan). That is, in this example, Step 2009 shown in FIG. 21 is changed to read "User selects one reallocation plan from among multiple reallocation plans.".

The user checks the screen for a Tier configuration combination created in accordance with the reallocation plan formulation program 0304, and selects the optimal combination (reallocation plan). Subsequent to the user having selected the reallocation plan, the management server 0102 executes the reallocation instruction program 0305.

Figure 32:
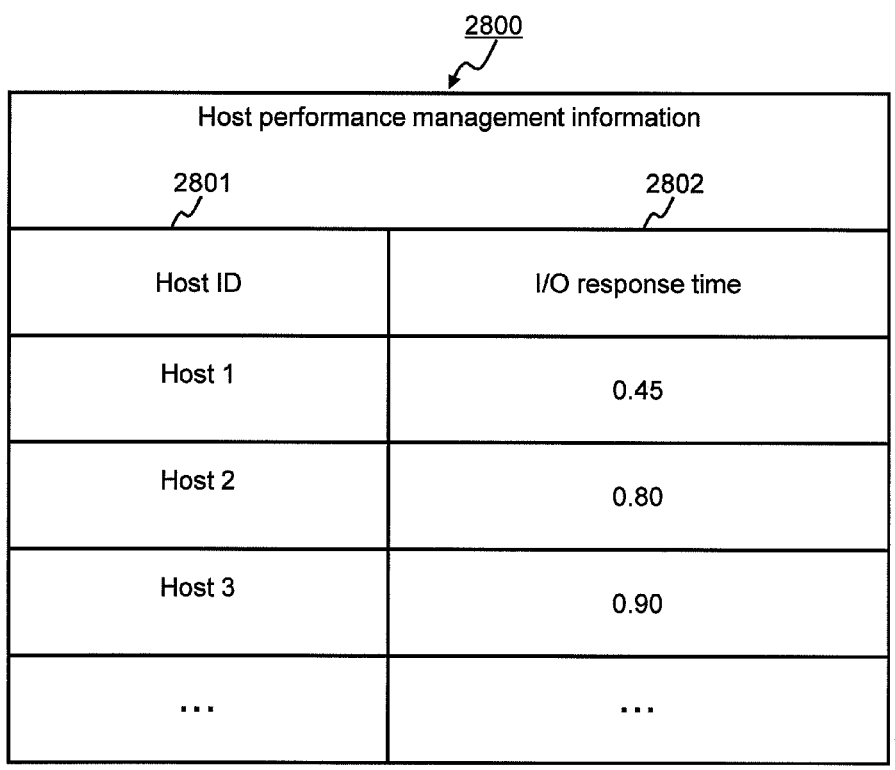
FIG. 32 is an example of the configuration of information for managing host performance in a second example.

FIG. 32 is an example of the configuration of host performance management information 2800. The auxiliary storage device 0123 of the management server 0102 comprises the host performance management information 2800. The host performance management information 2800 is used for displaying a response time 2906 of prior to the application of the configuration plan in a host performance information by configuration plan screen 2900, which will be explained further below.

FIG. 33 is a screen 2900 for presenting the user with host performance information by configuration plan in this example. FIG. 33, for example, displays an example in which the host 1 is a performance bottleneck. Hereinafter, a host, which is a performance bottleneck, will be called the target host.

The screen 2900 can display configuration plan information 2909 and host performance information 2910.

The configuration plan information 2909 comprises a configuration plan ID 2901, a Tier 1 2902, a Tier 2 2903, and a pool response time 2904. The configuration plan ID 2901 is an identifier for uniquely identifying a configuration plan. The Tier 1 2902 is a value showing the Tier 1 capacity capable of being allocated to the target host. The Tier 2 2903 is a value showing the Tier 2 capacity capable of being allocated to the target host. The pool response time 2904 shows an estimated value of the response time of a pool in a case where the capacity has been restricted. For example, the screen 2900 may display the configuration plan information 2909 by sorting the configuration plans in ascending order of response times.

The host performance information 2910 comprises a host ID 2905, a response time prior to applying configuration plan 2906, and a response time after applying configuration plan 2907. The host ID 2905 is an identifier for uniquely identifying a host.

The I/O response time 2802 of the host performance management information 2800 is displayed in the response time prior to applying configuration plan 2906. The management server 0102 computes and stores a value for the I/O response time 2802 prior to displaying the host performance information by configuration 2900. For example, the management server 0102 computes the I/O response time after executing the reallocation instruction program 0305.

The computation of the I/O response time 2802 is based on the I/O response time computation process 2100. However, this example differs in that instead of acquiring a target page virtual allocation destination 3202 from the virtual allocation destination management information 0315 in Step 2102, the reallocation destination determination result 0906 of the target page is acquired from the virtual volume management information 0308. The management server 0102 stores the I/O response time computation result in the I/O response time 2802 of the host performance management information 2800.

In this example, the management server 0102 computes a value for the response time after applying configuration plan 2906. Instead of this, a measured value of the response time for each host may be used as the response time 2906.

As for the response time after applying configuration plan 2907, when the user selects a configuration plan, the management server 0102 executes the virtual reallocation program 3300 using the selected configuration plan, and displays the value computed in accordance with the I/O response time computation process 2100 in the screen.

The user selects any one of the configuration plans displayed in the configuration plan information 2909. After a configuration plan has been selected, the host performance information 2910 corresponding to the selected configuration plan, for example, is displayed in the bottom portion of the same screen.

In FIG. 33, a host performance information 2910 display in a case where "Plan 2", which is enclosed inside the dotted line, has been selected is shown as an example. The host performance information 2910 comprises the host ID 2905, the response time prior to applying configuration plan 2906, and the response time after applying configuration plan 2907.

The user executes the virtual reallocation program 3300 using the selected configuration plan, and the I/O response time for each host is computed on the basis of the I/O response time computation process 2100. This computation result is displayed in the response time after applying configuration plan 2907 of the host performance information 2910. The user checks the values displayed in the host performance information 2910, and selects one optimal configuration plan.

Figure 34:
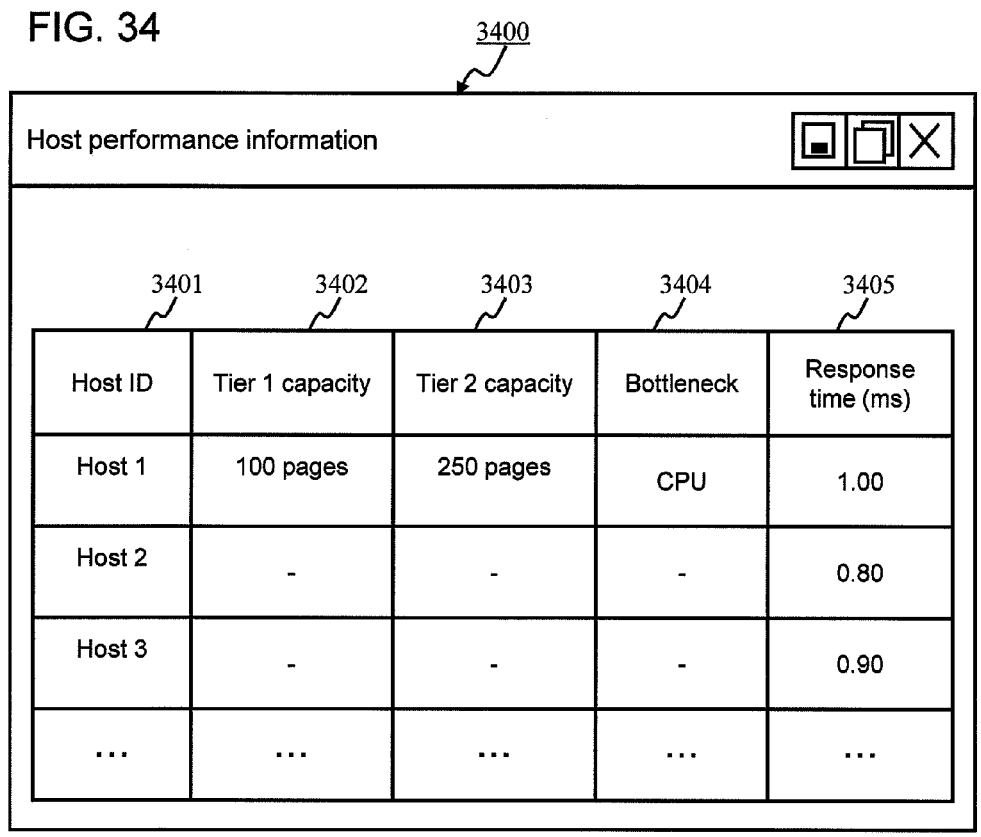
FIG. 34 is an example of a screen for presenting a user with host performance information in the second example.

FIG. 34 is an example of a screen 3400 for presenting the user with host performance information. The user can check the configuration plan, which the management server 0102 applied to the host via the host performance information screen 3400. In a case where the configuration plan is to be changed, the user selects a change-target host, opens the host performance information by configuration plan 2900 having the selected host as the target, and changes the configuration plan.

A host ID 3401 is an identifier for uniquely identifying a host. A Tier 1 capacity 3402 and a Tier 2 capacity 3403 are the values of the Tier 1 capacity 0802 and the Tier 2 capacity 0803 of data for which the values of the host ID 0801 and the host ID 3401 match in the reallocation plan management information 0310.

A bottleneck 3404 displays the value of the bottleneck 1104 of the latest information acquisition date/time 1103 in the host performance history information 0313 with respect to the host identified using the host ID 3401. A response time 3405 is the value of the I/O response time 2802 in the host performance management information 2800 with respect to data for which the values of the host ID 2801 and the host ID 3401 match.

The information presented to the user is not limited to the display sequence or display contents shown in the drawing, and there may be a function for changing the display sequence, and, in addition, there may be a function for hiding a portion of the information.

Configuring this example like this achieves the same effects as the first example. In this example, since the user himself can select a plan that he believes to be optimal, user usability is enhanced. For example, for a user, who is familiar with a computer system, the configuration of this example should prove easy to use. Alternatively, the first example automatically selects a plan for enhancing the pool response time, and as such, will probably prove convenient for the inexperienced user. The configuration may be such that the first example and the second example are combined, and the user manually changes an automatically selected plan. In addition, the configuration may be such that the first example is applied to one pool of multiple pools, and the second example is applied to the other pool.

Example 3

A third example will be explained by referring to FIGS. 35 through 37. In this example, the I/O response time target value 0704 can be configured either manually or automatically.

In this example, in a case where the I/O response time target value 0704 has been configured automatically, for example, the user gradually changes the I/O response time target value 0704 of the host 0101 to a larger value each time the management server 0102 executes a reallocation until the CPU bottleneck of the host, which is the CPU bottleneck, is resolved. According to this example, the user can omit the time and trouble of manually configuring the I/O response time target value 0704, thereby enhancing user usability. The differences with the first example and the second example will be the focus of the explanation below.

Figure 35:
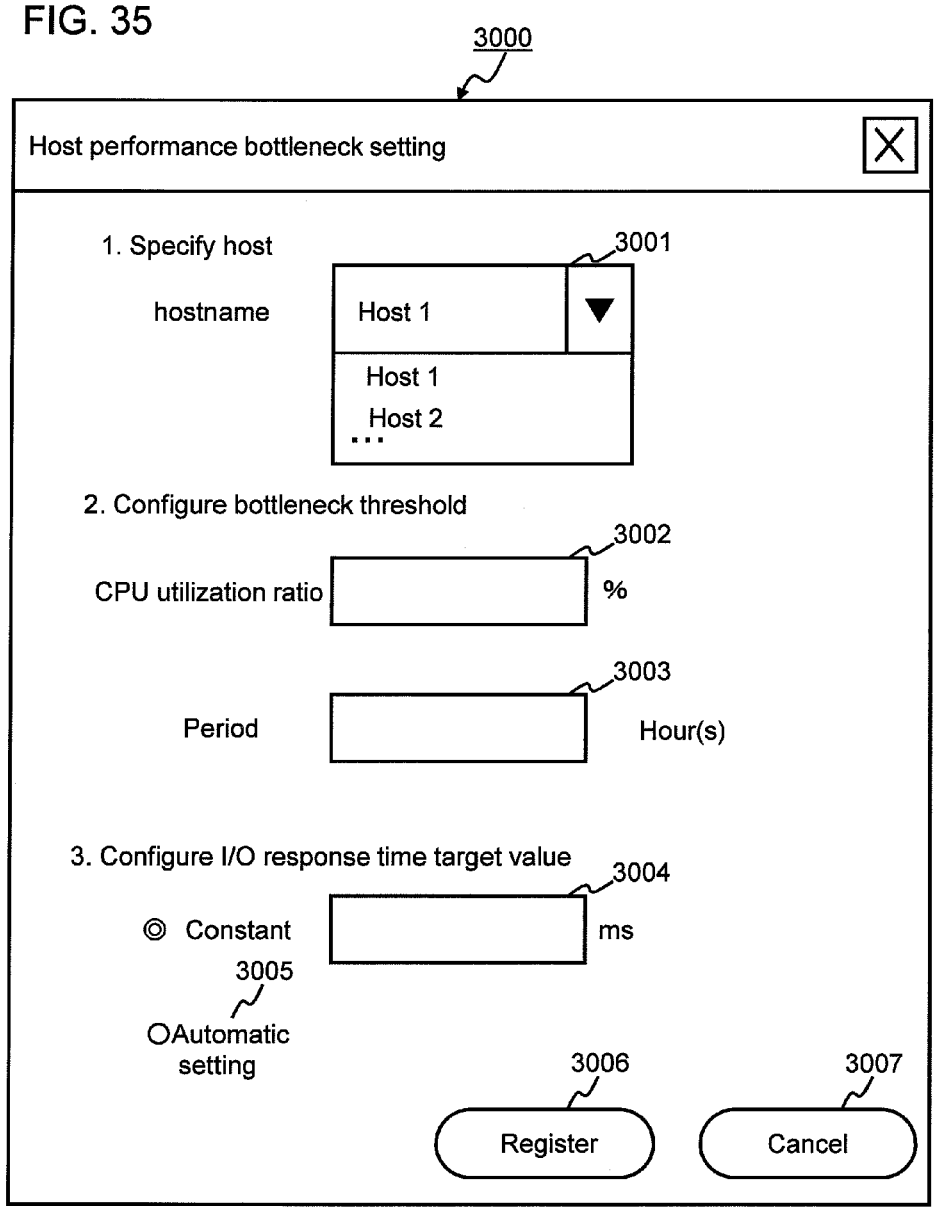
FIG. 35 is an example of a screen for configuring a host performance bottleneck threshold in a third example.

FIG. 35 is an example of a screen 3000 for configuring a performance bottleneck threshold for the host. The differences between the screen 3000 of this example and the host performance bottleneck threshold setting screen 2700 in the first example and the second example will be described. The screen 3000 of this example comprises an automatic setting 3005 for the I/O response time target value.

When the user selects the automatic setting 3005, "On" is stored in the I/O response time automatic setting 3505 of the bottleneck threshold management information 0312. In a case where the user selects the manual setting, "Off" is stored in the I/O response time automatic setting 3505 of the bottleneck threshold management information 0312. The configuration other than the automatic setting part 3005, i.e. 3001 through 3004, 3006, and 3007, is the same as that of 2701 through 2704, 2705, and 2706 of the host performance bottleneck threshold setting screen 2700, and as such, explanations will be omitted.

FIG. 37 will be explained prior to FIG. 36. FIG. 37 is an example of the configuration of the information 0312 for managing the performance bottleneck threshold of the host in this example. The difference between this example and the first example and the second example is the fact that the bottleneck threshold management information 0312 of this example comprises the I/O response time automatic setting 3505. The I/O response time automatic setting 3505 stores On in a case where the user configures the I/O response time target value to automatic setting, and stores Off in a case where the user configures the I/O response time target value to the manual setting. Since the other items 3501 through 3504 are the same as 0701 through 0704 of the bottleneck threshold management information 0312 shown in FIG. 8, explanations will be omitted.

Figure 36:
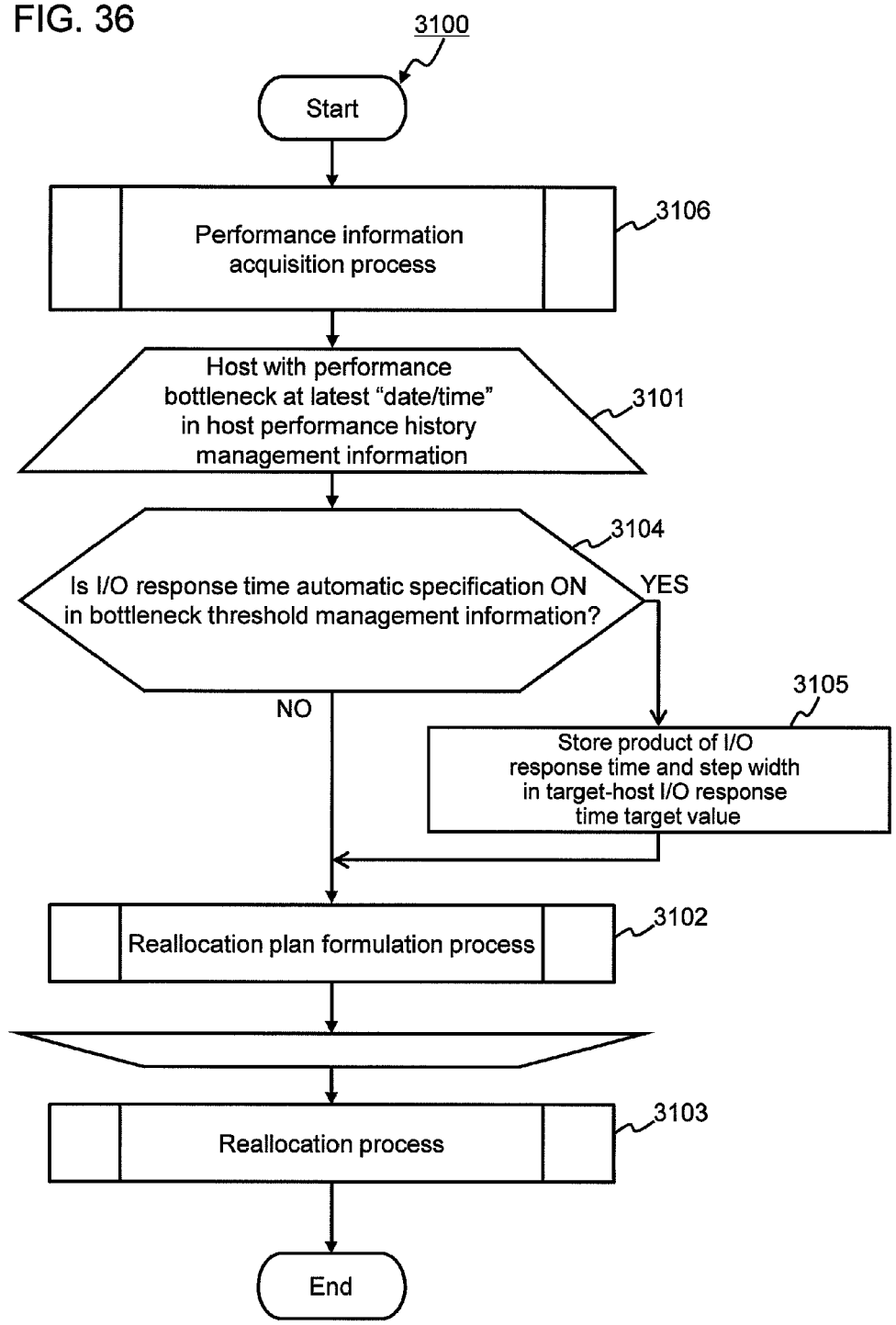
FIG. 36 is an example of a flowchart illustrating the formulation and execution of a reallocation plan in the third example.

FIG. 36 is an example of a flowchart illustrating the formulation and execution of a reallocation plan in this example. The difference between this example and the first example and the second example is the fact that the processing 3100 of this example comprises Steps 3104 and 3105. Hereinafter, a host, which is a performance bottleneck and which is targeted for a reallocation plan formulation process, will be called the target host.

The management server 0102 executes a process for acquiring performance information (Step 3106). The management server 0102 executes the following Steps 3104, 3102, 3105 with respect to a host comprising a performance bottleneck (Step 3101).

In Step 3104, the management server 0102 determines whether or not the I/O response time automatic setting 3505 of the bottleneck threshold management information 0312 is "On" with respect to the target host.

In a case where the automatic setting 3505 is "On", in Step 3105, the management server 0102 stores a value larger than the target host response time as a target value in the target host I/O response time target value 3504. The target value, for example, can be determined as the product of the I/O response time 2802 of the host performance management information 2800 related to the target host and a prescribed step width.

The prescribed step width, for example, can be configured to a small value like 1.1. Either a value defined beforehand by the management server 0102 or a value inputted by the user may be used as the step width. In a case where the user is to input the step width, the management server 0102 presents the user with a screen for inputting the step width.

Another method besides that mentioned above may be used as the method for computing the I/O response time target value as long as the computation method results in a target value, which is larger than the current I/O response time of the target host.

However, in the case of a method, which computes an I/O response time target value too much larger than the current I/O response time, the I/O response time could become too slow and cause a performance problem. In contrast to this, in the case of a method, which computes an I/O response time target value too much smaller than the current I/O response time, the number of times that the processing Step 3100 is executed for resolving the CPU bottleneck will increase.

As long as a CPU bottleneck is occurring in the target host, the I/O response time target value 3504 specified in accordance with Step 3105 will gradually become larger each time Step 3100 is repeated, resulting in the target host I/O response time becoming slower. For this reason, repeating Step 3100 shifts the target host bottleneck from the CPU to the I/O, and the CPU bottleneck is resolved.

Configuring this example like this achieves the same effects as the above-mentioned examples. Since this example comprises a mode (Step 3105) for automatically configuring the response time target value, user usability is enhanced further.

Example 4

A fourth example will be explained by referring to FIGS. 38 through 41. In the fourth example, in Step 2002 of the reallocation plan formulation process 2000, the range for searching for a combination of the Tier 1 capacity and the Tier 2 capacity is narrowed, decreasing the number of times that processing Steps 2004 through 2008 are repeated.

According to this example, it is possible to speed up a reallocation plan formulation process 2000, which takes into account each host and the I/O distribution of the pool. Therefore, this example can be rapidly applied to a large capacity pool and host. Hereinafter, a host, which is a performance bottleneck and is targeted for a reallocation plan formulation process, will be called the target host.

In this example, for example, two types of indices, i.e., a ratio for decreasing the target host I/O response time and a ratio for increasing the pool I/O response time, are used to narrow the range for searching for a combination of the Tier capacity and the Tier 2 capacity. The following explanation will focus on the difference(s) with the first example, the second example, or the third example.

FIG. 38 shows an example of the configuration of information 3600 for managing a response time change index. The response time change index management information 3600 is stored in the auxiliary storage device 0123 of the management server 0102. The response time change index management information 3600 is used for storing a characteristic feature of the amount of change in the host I/O response time and a characteristic feature of the amount of change in the pool I/O response time in a case where the reallocation plan formulation process 3900 has been executed.

For example, the response time change index management information 3600 comprises a host ID 3601 denoting the host identifier, a host I/O response time decrease ratio 3602 denoting a characteristic feature of the amount of change in the host I/O response time, and a pool I/O response time increase ratio 3603 denoting a characteristic feature of the amount of change in the pool I/O response time.

The host I/O response time decrease ratio 3602 is the ratio between the amount of change in the host I/O response time in a case where the management server 0102 has decreased the Tier 1 capacity by one page with respect to the target host and the amount of change in the host I/O response time in a case where the management server 0102 has decreased the Tier 2 capacity by one page.

A larger host I/O response time decrease ratio 3602 indicates that the Tier 1 effect on the host I/O response time is large and the Tier 2 effect is small.

For example, a case in which the host I/O response time decrease ratio is "3" will be explained. This case is the same from the standpoint that decreasing the Tier 1 being used by the host by one page, and, in addition, increasing the Tier 2 being used by the host by one page, and decreasing the Tier 2 being used by the host by three pages, and, in addition, increasing the Tier 3 being used by the host by three pages decreases the host I/O response time.

The pool I/O response time increase ratio 3603 is the ratio between the amount of change in the pool response time in a case where the Tier 1 capacity usable in the pool has been increased by one page and, in addition, the Tier 2 capacity usable in the pool has been decreased by one page, and the amount of change in the pool response time in a case where the Tier 2 capacity usable in the pool has been increased by one page and, in addition, the Tier 3 capacity usable in the pool has been decreased by one page.

A larger pool I/O response time increase ratio 3603 indicates that the Tier 1 effect on the pool I/O response time is large and the Tier 2 effect is small. For example, a case in which the pool I/O response time decrease ratio is "2" will be explained. This case is the same from the standpoint that increasing the Tier 1 capacity being used in the pool by one page, and, in addition, decreasing the Tier 2 capacity being used in the pool by one page, and increasing the Tier 2 capacity being used in the pool by two pages, and, in addition, decreasing the Tier 3 capacity being used in the pool by two pages increases the pool I/O response time.

Figure 39:
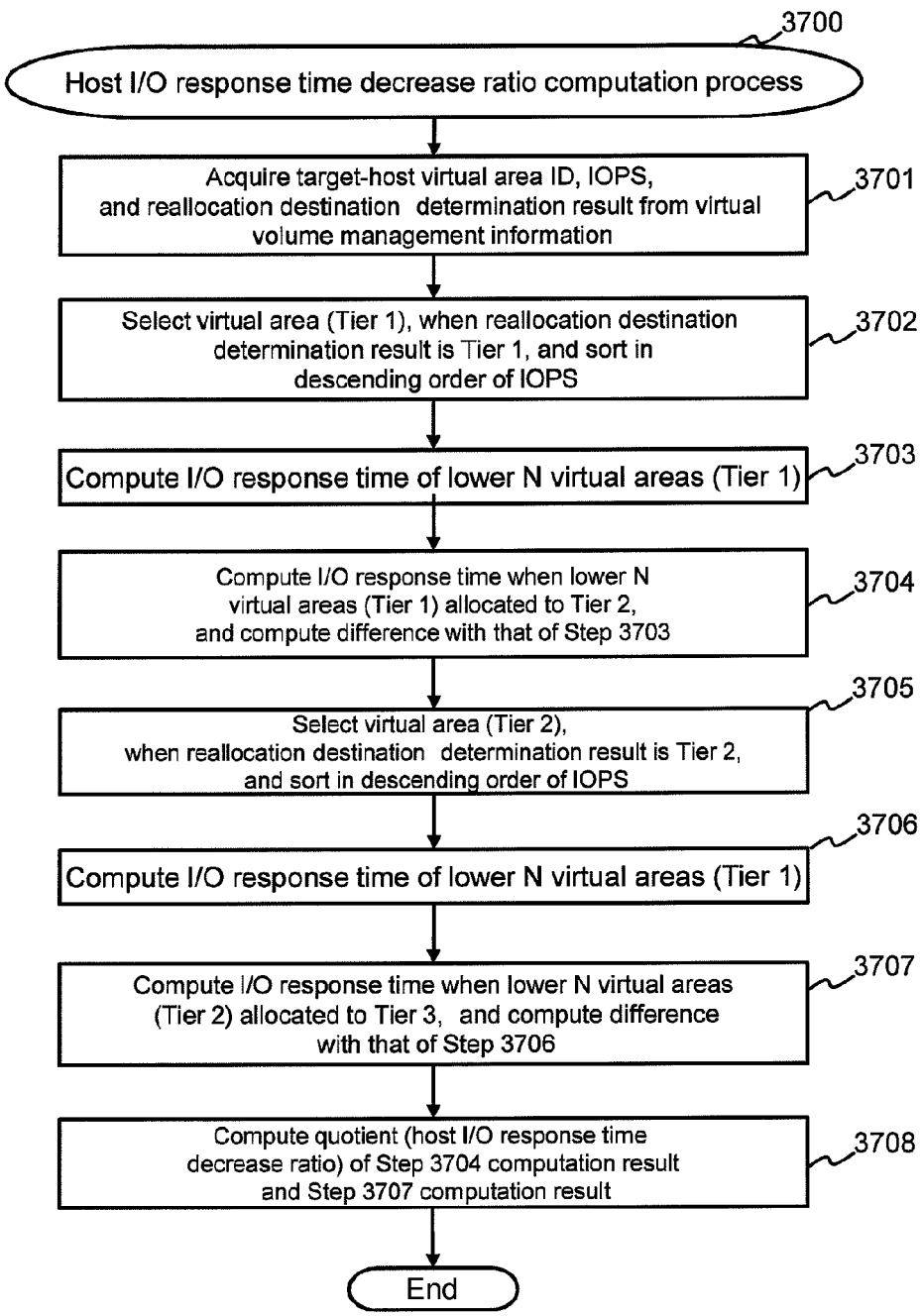
FIG. 39 is an example of a flowchart illustrating a process for computing a host I/O response time decrease ratio in the fourth example.

FIG. 39 is an example of a flowchart illustrating a process for computing the host I/O response time decrease ratio. The host I/O response time decrease ratio 3602 is computed from the ratio between the amount of change in the response time when N virtual areas 0502, which are allocated to Tier 1, are migrated from among the target host virtual areas (VSEGs) 0502 to Tier 2, and the amount of change in the response time when N virtual areas 0502, which are allocated to Tier 2, are migrated to Tier 3. For example, in this example, it is supposed that N=10.

N may use a value predefined by the management server 0102, or may use a value inputted by the user. The smaller the value of N, the larger the margin of error in the computation result for the host I/O response time decrease ratio; but processing time is short. The larger the value of N, the smaller the margin of error in the computation result for the host I/O response time decrease ratio; but processing time is long.

In Step 3701, the management server 0102 acquires the target host virtual area ID 0902, the IOPS 0905, and the reallocation destination determination result 0906 for the reallocation plan formulation process 3900 from the virtual volume management information 0308.

In Step 3702, the management server 0102 selects data in which the reallocation destination determination result 0906 is "Tier 1" from among the data acquired in Step 3701. The management server 0102 sorts these pieces of data (pages) in descending order of IOPS to specify the sequence in which the data in which the determination result is "Tier 1" is migrated to Tier 2. Since the processing in the reallocation process 0305 is carried out in descending order of IOPS, the page migrated from Tier 1 to Tier 2 is a page having a small IOPS.

In Step 3703, the management server 0102 computes the I/O response time of the migration-source page. Formula 2 described in the first example is used to compute the I/O response time. The computation-target pages are the lower N pages of Tier 1. All the Tiers to which the pages are allocated are migration-source Tier 1.

In Step 3704, the management server 0102 computes the I/O response time of the migration-destination page the same as in Step 3703. However, the Tiers to which the pages are allocated are all migration-destination Tier 2. The management server 0102 computes the value obtained by subtracting the computation result of Step 3703 from the Formula 2 computation result.

The processing of Steps 3705 through 3707 is the same as the processing of Steps 3702 through 3704. However, in the processing of Steps 3705 through 3707, the processing is performed by replacing the migration-source Tier 1 and migration-destination Tier 2 in Steps 3702 through 3704 with Tier 2 and Tier 3, respectively.

In Step 3708, the management server 0102 computes the host I/O response time decrease ratio. The host I/O response time decrease ratio is the quotient of the computation result of Step 3704 and the computation result of Step 3707 (Step 3704 computation result/Step 3707 computation result).

Figure 40:
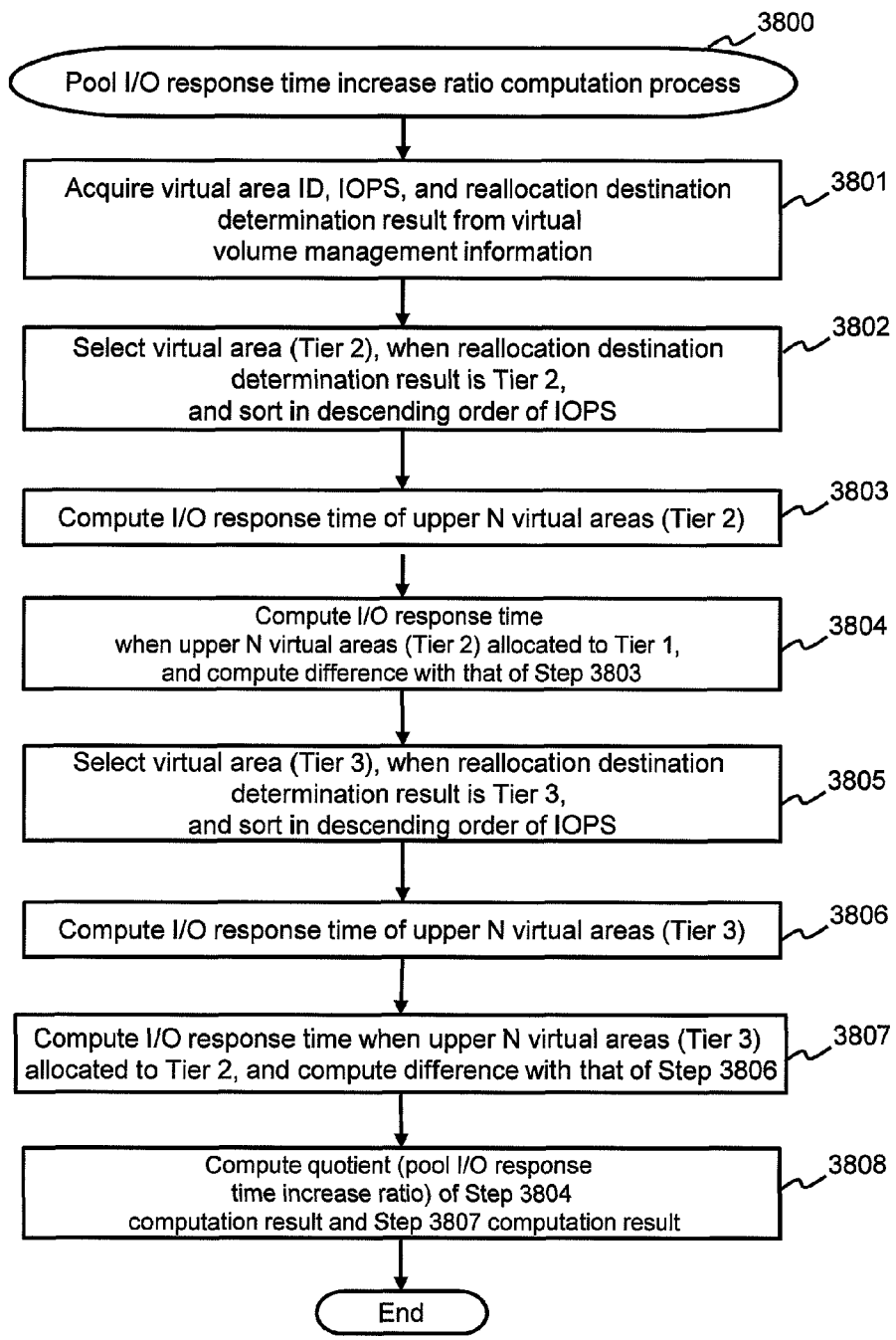
FIG. 40 is an example of a flowchart illustrating a process for computing a pool I/O response time increase ratio in the fourth example.

FIG. 40 is an example of a flowchart for illustrating the process for computing the pool I/O response time increase ratio. The pool I/O response time increase ratio 3603 is computed from the ratio between the amount of change in the response time in a case where N virtual areas 0502, which are allocated to Tier 2, are migrated from among the pool virtual areas 0502 to Tier 1, and the amount of change in the response time in a case where N virtual areas 0502, which are allocated to Tier 3, are migrated to Tier 2.

The pool I/O response time increase ratio computation process 3800 is similar to the host I/O response time decrease ratio computation process 3700. The points of difference therebetween will be described. The host I/O response time decrease ratio computation process 3700 computes the amount of change in the I/O response time when N virtual areas having lower IOPS are migrated to a Tier, which is lower than the current Tier. Alternatively, the pool I/O response time increase ratio computation process 3800 computes the amount of change in the I/O response time when N virtual areas having higher IOPS are migrated to a Tier, which is higher than the current Tier.

In Step 3801, the management server 0102 acquires the virtual area ID 0902, the IOPS 0905, and the reallocation destination determination result 0906 from the virtual volume management information 0308.

In Step 3802, the management server 0102 selects data in which the reallocation destination determination result 0906 is Tier 2 from among the data acquired in Step 3801. Then, the management server 0102 sorts the data in descending order of IOPS to specify the sequence in which the data of Tier 2 is migrated to Tier 1. Since the processing in the reallocation process 0305 is carried out in descending order of IOPS, a page migrated from Tier 2 to Tier 1 is a page having a large IOPS.

In Step 3803, the management server 0102 computes the I/O response time of the migration-source page. The I/O response time is computed using Formula 2 based on the IOPS 0905 of the virtual volume management information 0308 and the response time 0602 of the Tier performance history information 0309. The computation-target pages in Formula 2 are the upper N pages (virtual areas), and the Tier to which the pages are allocated is Tier 2.

In Step 3804, the same computation as that of Step 3803 is carried out. However, the computation of Step 3804 differs in that the Tier to which the pages are allocated in Formula 2 is the migration-destination Tier 1. The management server 0102 computes a value obtained by subtracting the computation result of Step 3803 from the computation result of Formula 2.

The processing of Steps 3805 through 3807 is the same as the processing of Steps 3802 through 3804. However, in the processing of Steps 3805 through 3807, the processing is performed by replacing the migration-source Tier 2 and migration-destination Tier 1 in Steps 3802 through 3804 with Tier 3 and Tier 2, respectively.

In Step 3808, the management server 0102 computes the pool I/O response time increase ratio. The pool I/O response time increase ratio is the quotient of the computation result of Step 3804 and the computation result of Step 3807 (Step 3804 computation result/Step 3807 computation result).

Figure 41:
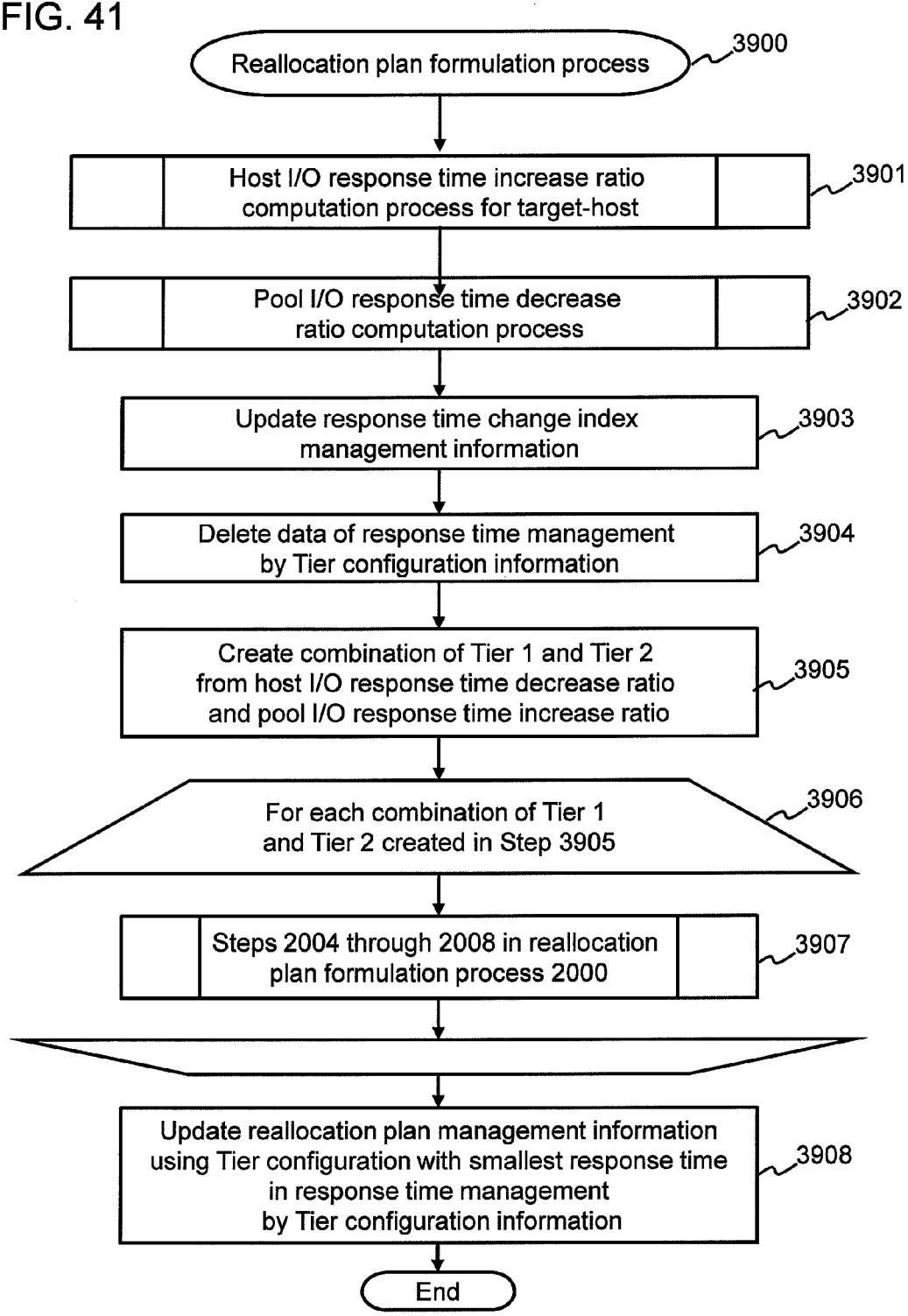
FIG. 41 is an example of a flowchart illustrating the formulation and execution of a reallocation plan in the fourth example.

FIG. 41 is an example of a flowchart illustrating the formulation and execution of a reallocation plan in this example. The reallocation plan formulation process 3900 is a process, which adds a search range narrowing process to the reallocation plan formulation process 2000 (refer to FIG. 21) of the first example. In this example, reallocation plan formulation processing is carried out using the reallocation plan formulation process 3900 rather than the reallocation plan formulation process 2000.

In Step 3901, the management server 0102 computes the host I/O response time decrease ratio of the target host using the host I/O response time decrease ratio computation process 3700. In Step 3902, the management server 0102 computes the pool I/O response time increase ratio using the pool I/O response time increase ratio computation process 3800.

In Step 3903, the management server 0102 updates the response time change index management information 3600 shown in FIG. 38 using the host I/O response time decrease ratio computed in Step 3901 and the pool I/O response time increase ratio computed in Step 3902.

Steps 3904, 3907, and 3908 of the reallocation plan formulation process 3900 correspond to Steps 2001, 2004 through 2008, and 2009 of the reallocation plan formulation process 2000, and the same processing is executed. Consequently, explanations of Steps 3904, 3907, and 3908 will be omitted.

In Step 3905, the management server 0102, based on the host I/O response time decrease ratio and the pool I/O response time increase ratio, compares the effect on the pool I/O response time in a case where the Tier 1 capacity has been decreased to the effect on the pool I/O response time in a case where the Tier 2 capacity has been decreased. The management server 0102 creates a combination of Tier 1 and Tier 2 based on the results of the comparison (Step 3905).

The management server 0102 can determine which of either the Tier 1 capacity or the Tier 2 capacity it is better to preferentially decrease based on the host I/O response time decrease ratio 3602 and the pool I/O response time increase ratio 3603.

For example, a case in which the quotient of the increase ratio 3603 and the decrease ratio 3602 (increase ratio 3603/decrease ratio 3602) is equal to or larger than 1 will be explained. In this case, the effect on the enhancement of the pool I/O response time will be greater by decreasing the Tier 1 capacity than by decreasing the Tier 2 capacity. Hereinafter, the quotient of the increase ratio 3603 and the decrease ratio 3602 will be called the increase-decrease ratio.

In a case where the increase-decrease ratio is equal to or larger than 1, in Step 3905, the management server 0102 creates a configuration plan in which the amount of decrease in the I/O response time of the target host in accordance with decreasing the Tier 1 capacity is equal to or larger than a fixed value.

For example, taking into account the fact that the larger the increase-decrease ratio, the greater the enhancement of the pool response time in a case where the Tier 1 capacity has been decreased, the management server 0102 uses a Formula 3 below to determine a lower limit for the amount of decrease in the target host response time in accordance with decreasing the Tier 1 capacity.

Lower limit for amount of decrease in target host response time in accordance with decreasing Tier 1 capacity={(increase-decrease ratio−1)/(increase-decrease ratio)}*(I/O response time target value−pre-reallocation target host I/O response time)        (Formula 3)

According to Formula 3, for example, in a case where the increase-decrease ratio is 2, one half of the I/O response time, which must be decreased, constitutes the lower limit of the amount of decrease in the target host response time in accordance with decreasing the Tier 1 capacity.

In accordance with Formula 3, it is clear that the upper limit of the Tier 1 capacity can be reduced in proportion to the increase in the increase-decrease ratio. The upper limit of the Tier 1 capacity, for example, can be computed by gradually decreasing the Tier 1 capacity one page at a time until the amount of decrease in the target host response time reaches the lower limit.

In a case where the increase-decrease ratio is equal to or smaller than 1, the management server 0102 executes the processing of Step 3905 by replacing values. The replaced values are those of the increase-decrease ratio and the Tier 1 capacity. The management server 0102 replaces the increase-decrease ratio with the reciprocal of the increase-decrease ratio, and, in addition, replaces the Tier 1 capacity with the Tier 2 capacity.

In Step 3906, the management server 0102 carries out the processing using the combination created in Step 3905. In accordance with this, the management server 0102 can narrow the search range for a combination of the Tier 1 capacity and the Tier 2 capacity.

The management server 0102 may comprise a function for presenting on a screen the host I/O response time decrease ratio 3602 and the pool I/O response time increase ratio 3603 so that the user can check these ratios.

A method for further narrowing down the combination in Step 3905 will be explained. In this method, an increase ratio 3603, a decrease ratio 3602, and a reallocation plan combination are stored as a history in addition to this example. As yet another method, it is possible to reference a historical data reallocation plan in a case where the decrease ratio 3602 computed in Step 3901, and the increase ratio 3603 computed in Step 3902 are similar to the decrease ratio and the increase ratio in the historical data. For example, the management server 0102 can shorten the processing time by only searching in the vicinity of the Tier 1 and the Tier 2 ratios in the historical data.

Configuring this example like this also achieves the same effects as the above-mentioned examples. In addition, when formulating a reallocation plan, this example uses an increase-decrease ratio, which is a characteristic determination index in this example. This example uses this characteristic index to narrow the range of a search for a combination of the Tier 1 capacity and the Tier 2 capacity. Therefore, a reallocation plan can be created faster in this example.

Example 5

A fifth example will be explained by referring to FIGS. 42 and 43. In this example, instead of selecting a combination of the Tier 1 1502 and the Tier 2 1503, which minimizes the pool I/O response time, in the reallocation plan formulation process 2000, the Tier 1 1502 and the Tier 2 1503 are selected in accordance with an evaluation index, which differs therefrom.

According to this example, for example, when the management server 0102 selects a reallocation plan, it is possible to select the reallocation plan such that the number of high-priority hosts is larger than the number of low-priority hosts among the hosts for which performance is to be enhanced in accordance with a reallocation. The following explanation will focus on the points of difference with either the first example or the second example.

Figure 42:
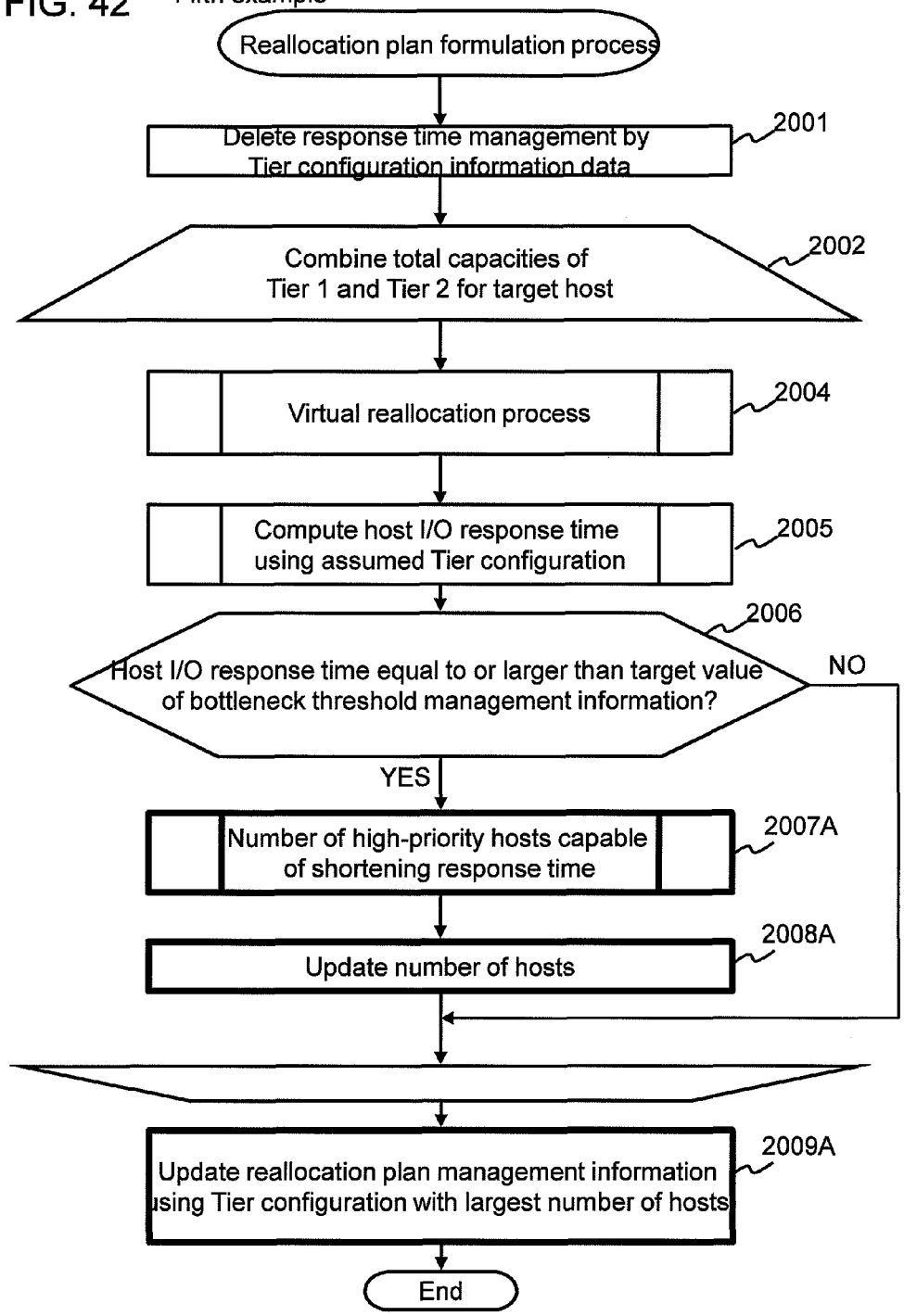
FIG. 42 is an example of a flowchart illustrating the formulation and execution of a reallocation plan in a fifth example.

FIG. 42 is a flowchart of the reallocation plan formulation process according to this example. After Step 2006, the management server 0102 counts the number of response time-enhanced hosts of the high-priority hosts (Step 2007A). The priority of a host may be configured by the user, or may be automatically configured in accordance with the type of host. For example, in the case of batch processing, the priority is lowered, and in the case of transaction processing, the priority is raised.

The management server 0102 updates the value of the number of hosts 1505 to the value computed in Step 2007A in the information 0314A for managing the response time by Tier configuration shown in FIG. 43 (Step 2008A). The management information 0314A shown in FIG. 43 comprises the number of hosts 1505 instead of the pool response time 1504 of the management information 0314 of FIG. 16.

In Step 2009A, the management server 0102 selects a combination of the Tier 1 1502 and the Tier 2 1503, which will maximize the number of hosts for which response time is improved, and updates the reallocation plan management information 0310.

A reallocation plan may be created based on the number of hosts for which the I/O response time has been enhanced without taking into account the host priority. The management server 0102 computes the amount of increase in the I/O response time for each host, and uses the number of hosts for which the amount of increase is equal to or larger than a fixed value as the evaluation index. As the fixed value referred to here, either a value defined beforehand by the management server 0102, or a value inputted by the user may be used. A large evaluation index value indicates that the I/O response times of numerous hosts have been enhanced.

The present invention is not limited to the respective examples described hereinabove. A person having ordinary skill in the art will be able to make various additions and changes without departing from the scope of the present invention. For example, the technical features of the present invention described above can be implemented by combining these features as needed.

For example, the present invention can be realized as a computer program invention as described below. This computer program can be affixed to a recording medium and distributed, or can be delivered via a communication network.

"A computer program for causing a computer to function as a management apparatus for managing a computer system, which comprises multiple host computers and at least one storage apparatus, wherein the storage apparatus comprises multiple virtual logical volumes for provision to the above-mentioned multiple host computers, and a pool comprising multiple storage tiers of different performances, and executes a reallocation process for associating a logical storage area comprising the above-mentioned multiple virtual logical volumes with a real storage area of a prescribed storage tier from among the above-mentioned multiple storage tiers, the computer program realizing on the above-mentioned computer a performance information management part for managing performance information of the above-mentioned multiple host computers; a load determination part for determining, based on each performance information, whether a prescribed host computer, which has a load equal to or larger than a preconfigured prescribed threshold, exists among the above-mentioned multiple host computers; a reallocation planning part for creating a reallocation plan stipulating an allocation amount for the above-mentioned real storage area in each of the above-mentioned multiple storage tiers with respect to a prescribed virtual logical volume used by the above-mentioned prescribed host computer from among the above-mentioned multiple virtual logical volumes, and which creates multiple reallocation plans via which a response time of the above-mentioned prescribed virtual logical volume becomes equal to or larger than a prescribed target response time, and selects any one of these multiple reallocation plans; and a reallocation instruction part, which, based on the selected above-mentioned reallocation plan, decides the corresponding relationship between the above-mentioned respective logical storage areas of the above-mentioned multiple virtual logical volumes and the above-mentioned respective real storage areas of the above-mentioned respective storage tiers, notifies the above-mentioned corresponding relationship to the above-mentioned storage apparatus, and instructs the above-mentioned storage apparatus to execute the above-mentioned reallocation process.

REFERENCE SIGNS LIST

1, 0101 Host computer
2, 0102 Management server
3, 0103 Storage apparatus

The invention claimed is:

1. A management apparatus for managing a computer system, which comprises multiple host computers and at least one storage apparatus,
   wherein the storage apparatus comprises multiple virtual logical volumes for provision to the multiple host computers, and a pool comprising multiple storage tiers of different performances, and executes a reallocation process for associating a logical storage area comprising the multiple virtual logical volumes with a real storage area of a prescribed storage tier from among the multiple storage tiers,
   the computer system management apparatus comprising:
   a performance information management part for managing performance information of the multiple host computers;
   a load determination part for determining, based on each performance information, whether a prescribed host computer, which has a load equal to or larger than a preconfigured prescribed threshold, exists among the multiple host computers;
   a reallocation planning part for creating a reallocation plan which stipulates an allocation amount for the real storage area in each of the multiple storage tiers with respect to a prescribed virtual logical volume used by the prescribed host computer from among the multiple virtual logical volumes; and
   a reallocation instruction part which, based on the reallocation plan, decides a corresponding relationship between the each logical storage area of the multiple virtual logical volumes and the each real storage area of the each storage tier, notifies the corresponding relationship to the storage apparatus, and instructs the storage apparatus to execute the reallocation process,
   wherein the reallocation planning part creates multiple reallocation plans via which a response time of the prescribed virtual logical volume becomes equal to or larger than a prescribed target response time, based on a combination within a preconfigured prescribed range from among all combinations of allocation amounts of the real storage area of each of the multiple storage tiers, wherein the multiple storage tiers comprise a highest performance first storage tier, a next highest performance second storage tier, and a lowest performance third storage tier, and selects one reallocation plan via which the pool response time becomes minimal, and the reallocation instruction part decides the corresponding relationship based on the selected reallocation plan, and notifies the storage apparatus of the decided corresponding relationship, wherein a value inputted by a user is configured as the target response time wherein the reallocation planning part configures the prescribed range based on a volume response time index for denoting the extent to which the response time of the prescribed virtual logical volume increases, and a pool response time index for denoting the extent to which the pool response time decreases, wherein the volume response time index is computed as a ratio of a response time in a case where a real storage area of the first storage tier allocated to the prescribed virtual logical volume is decreased by a prescribed amount, and a response time in a case where a real storage area of the second storage tier allocated to the prescribed virtual logical volume is decreased by the prescribed amount, and the pool response time index is computed as a ratio of a response time in a case where a real storage area of the first storage tier usable in the pool is increased by the prescribed amount, and a response time in a case where a real storage area of the second storage tier usable in the pool is increased by the prescribed amount.

2. The computer system management apparatus according to claim 1, wherein a priority is configured in the multiple host computers, and the reallocation planning part computes the number of host computers for which the response time of the virtual logical volume used by a host computer, which has a priority of equal to or higher than a prescribed priority, is shortened, and selects a reallocation plan for which the computed number is the largest from among the multiple reallocation plans.

3. The computer system management apparatus according to claim 1, wherein the reallocation planning part selects one reallocation plan specified by a user from among the multiple reallocation plans.

4. The computer system management apparatus according to claim 1, wherein the target response time is configured in accordance with a preselected mode of either a manual mode or an automatic mode, wherein, in a case where the manual mode is selected, a value inputted by a user is configured as the target response time, and in a case where the automatic mode is selected, the target response time is configured by gradually lowering the response time from an initial value configured longer than a current response time of the prescribed host computer until the load of the prescribed host computer becomes less than the prescribed threshold.

5. The computer system management apparatus according to claim 1, wherein the reallocation planning part creates the multiple reallocation plans with respect to the prescribed virtual logical volume based on a combination within a preconfigured prescribed range from among all combinations of allocation amounts of the real storage area of each of the multiple storage tiers.

6. A management apparatus for managing a computer system, which comprises multiple host computers and at least one storage apparatus, wherein the storage apparatus comprises multiple virtual logical volumes for provision to the multiple host computers, and a pool comprising multiple storage tiers of different performances, and executes a reallocation process for associating a logical storage area comprising the multiple virtual logical volumes with a real storage area of a prescribed storage tier from among the multiple storage tiers, the computer system management apparatus comprising:

a performance information management part for managing performance information of the multiple host computers;

a load determination part for determining, based on each performance information, whether a prescribed host computer, which has a load equal to or larger than a preconfigured prescribed threshold, exists among the multiple host computers;

a reallocation planning part for creating a reallocation plan which stipulates an allocation amount for the real storage area in each of the multiple storage tiers with respect to a prescribed virtual logical volume used by the prescribed host computer from among the multiple virtual logical volumes, wherein the multiple storage tiers comprise a highest performance first storage tier, a next highest performance second storage tier, and a lowest performance third storage tier, and the reallocation planning part configures the prescribed range based on a volume response time index for denoting the extent to which the response time of the prescribed virtual logical volume increases, and a pool response time index for denoting the extent to which the pool response time decreases, wherein the volume response time index is computed as a ratio of a response time in a case where a real storage area of the first storage tier allocated to the prescribed virtual logical volume is decreased by a prescribed amount, and a response time in a case where a real storage area of the second storage tier allocated to the prescribed virtual logical volume is decreased by the prescribed amount, and the pool response time index is computed as a ratio of a response time in a case where a real storage area of the first storage tier usable in the pool is increased by the prescribed amount, and a response time in a case where a real storage area of the second storage tier usable in the pool is increased by the prescribed amount, and a reallocation instruction part which, based on the reallocation plan, decides a corresponding relationship between the each logical storage area of the multiple virtual logical volumes and each real storage area of the each storage tier, notifies the corresponding relationship to the storage apparatus, and instructs the storage apparatus to execute the reallocation process, wherein the reallocation planning part creates multiple reallocation plans via which a response time of the prescribed virtual logical volume becomes equal to or larger than a prescribed target response time, and selects any one of these multiple reallocation plans, and the reallocation instruction part decides the corresponding relationship based on the selected reallocation plan, and notifies the storage apparatus of the decided corresponding relationship, wherein the reallocation planning part creates the multiple reallocation plans with respect to the prescribed virtual logical volume based on a combination within a preconfigured prescribed range from among all combinations of allocation amounts of the real storage area of each of the multiple storage tiers.

\* \* \* \* \*